(12) United States Patent
Marty et al.

(10) Patent No.: US 12,285,653 B2
(45) Date of Patent: Apr. 29, 2025

(54) PLAYER MONITORING SYSTEMS AND METHODS FOR COMPENSATING FOR NETWORK DELAY

(71) Applicant: Pillar Vision, Inc., Menlo Park, CA (US)

(72) Inventors: Alan W. Marty, Menlo Park, CA (US); John Carter, Elkmont, AL (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 18/411,744

(22) Filed: Jan. 12, 2024

(65) Prior Publication Data

US 2024/0252886 A1    Aug. 1, 2024

Related U.S. Application Data

(60) Provisional application No. 63/471,664, filed on Jun. 7, 2023, provisional application No. 63/479,855, filed on Jan. 13, 2023.

(51) Int. Cl.
*A63B 71/06* (2006.01)
*A63B 24/00* (2006.01)
(Continued)

(52) U.S. Cl.
CPC ...... *A63B 24/0062* (2013.01); *A63B 71/0622* (2013.01); *A63F 13/213* (2014.09);
(Continued)

(58) Field of Classification Search
CPC .............. G06F 3/011; G06F 3/0481; A63B 2243/0025; A63B 2243/0037;
(Continued)

(56) References Cited

U.S. PATENT DOCUMENTS 7,094,164 B2   8/2006  Marty et al.
7,850,552 B2   12/2010 Marty et al.
(Continued)

FOREIGN PATENT DOCUMENTS

CN      111773680 A     10/2020
WO      2005087323 A2   9/2005

OTHER PUBLICATIONS

Pending U.S. Appl. No. 17/177,935, "Systems and Methods for Determining Reduced Player Performance in Sporting Events," filed Feb. 17, 2021.
(Continued)

*Primary Examiner* — Lawrence S Galka
(74) *Attorney, Agent, or Firm* — Butler Snow LLP; Jon E. Holland

(57) ABSTRACT

A player monitoring system for compensating for network delays comprises a server that is configured to receive sensor data from multiple sensors at dispersed locations. In some embodiments, a server is configured to determine a delay associated with one network path carrying sensor data to the server and a delay associated with another network path carrying sensor data to the server. Based on the delays, the server is configured to synchronize events detected by the sensors at the dispersed location, thereby permitting more precise and accurate gameplay decisions for a dispersed sporting event.

12 Claims, 26 Drawing Sheets

(51) Int. Cl.
*A63F 13/213* (2014.01)
*A63F 13/42* (2014.01)
*G06K 9/00* (2022.01)
*G09B 5/04* (2006.01)
*G09B 19/00* (2006.01)
*A63B 69/00* (2006.01)

(52) U.S. Cl.
CPC .......... *A63F 13/42* (2014.09); *A63B 69/0071* (2013.01); *A63B 71/0605* (2013.01); *A63B 2220/05* (2013.01); *A63B 2220/62* (2013.01); *A63B 2220/806* (2013.01); *A63B 2225/20* (2013.01)

(58) Field of Classification Search
CPC ...... A63B 2243/007; A63B 2243/0066; A63B 69/0002; A63B 69/002; A63B 69/0024; A63B 69/0071; A63B 71/0622; A63F 13/211–213; A63F 13/26; A63F 13/31; A63F 13/42; A63F 13/812; A63F 2300/10; A63F 2300/1087; A63F 2300/69; A63F 2300/8023; A63F 2300/8082; G06V 20/20; G06V 40/23
See application file for complete search history.

(56) References Cited

U.S. PATENT DOCUMENTS

| | | |
|---|---|---|
| 7,854,669 B2 | 12/2010 | Marty et al. |
| 8,408,982 B2 | 4/2013 | Marty et al. |
| 8,409,024 B2 | 4/2013 | Marty et al. |
| 8,617,008 B2 | 12/2013 | Marty et al. |
| 8,622,832 B2 | 1/2014 | Marty et al. |
| 8,908,922 B2 | 12/2014 | Marty et al. |
| 8,948,457 B2 | 2/2015 | Marty et al. |
| 9,238,165 B2 | 1/2016 | Marty et al. |
| 9,283,431 B2 | 3/2016 | Marty et al. |
| 9,283,432 B2 | 3/2016 | Marty et al. |
| 9,345,929 B2 | 5/2016 | Marty et al. |
| 9,358,455 B2 | 6/2016 | Marty et al. |
| 9,390,501 B2 | 7/2016 | Marty et al. |
| 9,694,238 B2 | 7/2017 | Marty et al. |
| 9,697,617 B2 | 7/2017 | Marty et al. |
| 9,734,405 B2 | 8/2017 | Marty et al. |
| 9,886,624 B1 | 2/2018 | Marty et al. |
| 10,010,778 B2 | 7/2018 | Marty et al. |
| 10,092,793 B1 | 10/2018 | Marty et al. |
| 10,343,015 B2 | 7/2019 | Marty et al. |
| 10,360,685 B2 | 7/2019 | Marty et al. |
| 10,471,325 B2 | 11/2019 | Marty et al. |
| 10,610,757 B1 | 4/2020 | Marty |
| 10,762,642 B2 | 9/2020 | Marty et al. |
| 10,956,723 B2 | 3/2021 | Marty et al. |
| 11,049,258 B2 | 6/2021 | Marty et al. |
| 11,123,605 B1 | 9/2021 | Marty |
| 11,263,461 B2 | 3/2022 | Marty et al. |
| 11,413,514 B2 | 8/2022 | Marty et al. |
| 11,450,106 B2 | 9/2022 | Marty et al. |
| 11,715,214 B1 | 8/2023 | Marty et al. |
| 11,836,929 B2 | 12/2023 | Marty et al. |
| 2007/0265043 A1* | 11/2007 | Wang ...................... A63F 13/12 463/2 |
| 2013/0178257 A1* | 7/2013 | Langseth ................ A63F 13/23 345/419 |
| 2014/0200692 A1 | 7/2014 | Thurman et al. |
| 2019/0392729 A1* | 12/2019 | Lee .................... G09B 19/0038 |
| 2020/0258419 A1 | 8/2020 | Lee et al. |

OTHER PUBLICATIONS

Pending U.S. Appl. No. 18/387,743, "Systems and Methods for Evaluating Player Performance in Sporting Events," filed Nov. 7, 2023.

Pending U.S. Appl. No. 17/899,378, "Systems and Methods for Monitoring Objects at Sporting Events," filed Aug. 30, 2022.

* cited by examiner

PLAYER MONITORING SYSTEMS AND METHODS FOR COMPENSATING FOR NETWORK DELAY

CROSS REFERENCE TO RELATED APPLICATIONS

This application claims priority to U.S. Provisional Patent Application No. 63/479,855, entitled "Systems and Methods for Dispersed Athletic Games" and filed on Jan. 13, 2023, which is incorporated herein by reference. This application also claims priority to U.S. Provisional Patent Application No. 63/471,664, entitled "Systems and Methods for Dispersed Athletic Games" and filed on Jun. 7, 2023, which is incorporated herein by reference.

FIELD OF THE DISCLOSURE

This disclosure generally relates to player monitoring systems and methods for compensating for network delay. In some embodiments of the disclosure, a server determines delays associated with different network paths carrying sensor data and uses the delays to synchronize events detected by sensors at dispersed locations.

RELATED ART

Athletes often spend countless hours training in order to improve their skill level so that they can become more competitive in sporting events, such as basketball games, soccer games, hockey games, and games of other sports. In an effort to assist athletes in improving their skill levels, systems have been developed that track an athlete's performance while training or playing a game and then provide feedback indicative of the performance. Such feedback can then be evaluated for helping the athlete to improve his skill level. As an example, commonly-assigned U.S. Pat. Nos. 7,094,164; 8,948,457; 10,360,685; and 10,010,778, which are incorporated herein by reference, generally describe systems that track various performance metrics of athletes, such as the trajectory of a basketball during a basketball shot, dribble, or pass, to provide information that can be used to evaluate and improve player performance.

People around the world have played sporting games against each other on a single court. Basketball type games played on a single court can include around the world, horse, ghost, knockout, etc. It is a challenge to provide the same experience for basketball shooting games over dispersed courts. For example, in the basketball shooting game of knockout, two or more shooters shoot free throws on a single court, with a second shooter attempting to make a basket before the first shooter in order to "knock out" the first shooter. When the first shooter makes a basket, the second shooter becomes the first shooter, and a third shooter, if participating, becomes the second shooter. In the absence of a third shooter, the first shooter becomes the second shooter and attempts to "knock out" the first shooter by making a basket before the first shooter. In a dispersed game, it is difficult to consistently and accurately track the position of each shooter and to determine the sequence in which the shooters make baskets. Additionally, in dispersed basketball shooting games such as horse, in which a second shooter must emulate a shot made by a first shooter, it is difficult to track the shot criteria of the first shot and verify whether the second shooter has successfully emulated the shot criteria. Due to these and other challenges, very few attempts have been made to develop systems that enable playing sporting games, such as knockout, horse, and others, over dispersed courts.

The embodiments disclosed herein are directed to these and other considerations.

BRIEF DESCRIPTION OF THE DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIGS. 7A-7E also illustrate exemplary player sequences for the basketball shooting game of knockout.

DETAILED DESCRIPTION

Systems and methods are provided for enabling dispersed game tracking. In one embodiment, the system is configured to enable dispersed basketball shooting games, such as the basketball game of knockout. The system can be configured to identify players on dispersed courts and to track the motion of a basketball on the court to determine when a shot is made. In some embodiments, the system is configured to track the body position of the shooter and the trajectory of the ball in order to identify the type of shot. In the basketball game of horse, the system can determine not only whether a shot was made, but also what type of shot was made according to identified shot criteria (e.g., hook shot, lay-up, dunk, overhand, underhand, etc.). The system can then determine whether a second person playing on a dispersed court makes a second shot using the identified shot criteria.

In other embodiments, the system can be configured to track games such as baseball, soccer, golf, tennis, etc. on dispersed courts, allowing players to play remotely. In some embodiments, the system can be configured to track player performance, and provide training feedback to the players. Players can train by themselves, with the system providing real-time feedback, or in other embodiments, the system can facilitate training multiple players simultaneously over dispersed courts.

The system can use one or more sensors, including depth sensors, audio sensors, cameras, light sensors that are enabled to capture data indicative of a person's movements around a game area and, in some embodiments, the motion of a game ball (e.g., basketball, soccer ball, golf ball, tennis ball, etc.) to track movements of the player and the game ball. The system can include at least one processor to analyze the sensor data to determine and evaluate the movements of players and the trajectory of the game ball, including whether the game ball is successfully put through the goal, hoop, etc., depending on the game being tracked. Characteristics of player movements and ball movements can be identified and tracked in order to provide real-time feedback to one or more players on how to improve their shot posture, dribbling, racket swing, kick, throw, etc., based on the game being played.

Figure 1:
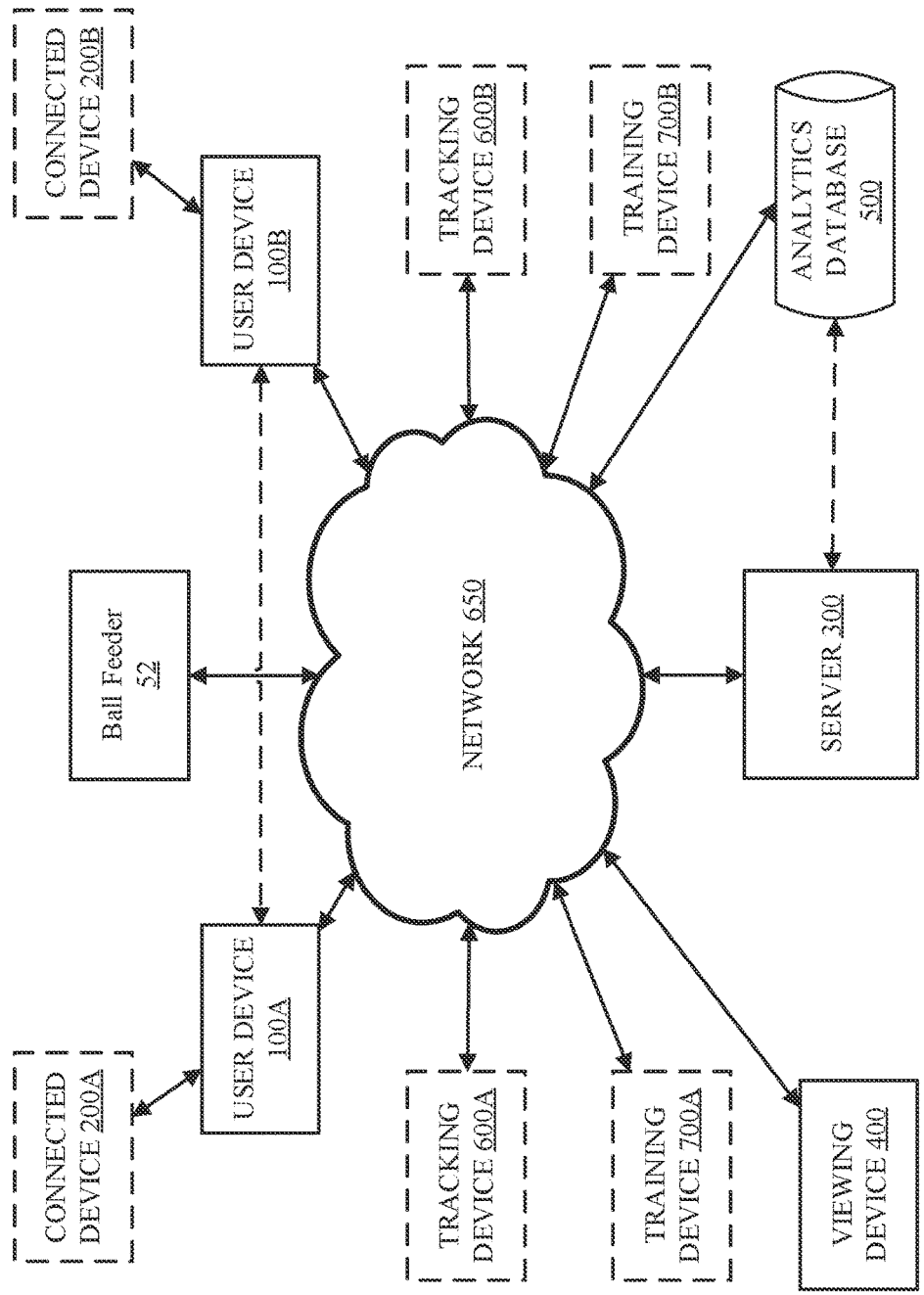
FIG. 1 is a block diagram of an embodiment of a dispersed game tracking system.

FIG. 1 shows an embodiment of a system 10 for dispersed game tracking. For illustrative purposes, the system 10 will be described in the context of the basketball shooting game of knockout. However, system 10 can be used to track dispersed games of other basketball games, such as around the world, traditional basketball, and horse, and non-basketball games such as tennis, football, soccer, golf, hockey, field hockey, etc., as well as games of other sports. The system may enable players to play a game across dispersed locations in real-time. As shown, system 10 can include user device(s) 100A, 100B, connected device(s) 200A, 200B, server 300, viewing device 400, analytics database 500, and training device(s) 700A, 700B communicating over network 650.

According to some embodiments, the system 10 may include additional sensor systems for different types of competitions or training sessions. For example, a football passing, kicking, or punting competition would likely require a larger field of view than a basketball-oriented system. Thus, the football competition might use depth sensor(s) mounted on a drone while the basketball competition might use a 2D image sensor from a mobile phone (although a basketball competition could include the use of other types of sensors or sensor configurations, including depth sensors mounted on a drone as described for embodiments using larger playing spaces). Other types of competitions requiring a larger field of view may include soccer kicking, golf shots, and tennis strokes, although any of the games described herein may use larger fields of view or fields of view of different sizes, as may be desired. Exemplary techniques for monitoring sporting events with drone mounted depth sensors are disclosed in commonly-assigned U.S. Pat. No. 11,450,106 entitled "Systems and Methods for Monitoring Objects at Sporting Events" and filed on Feb. 28, 2022, which is incorporated herein by reference.

The system 10 can include user device(s) 100A, 100B associated with a respective user. Although system 10 is illustrated with two user devices 100A and user device 100B, it should be understood that there can be any number of user devices within system 10 (e.g., the system can include user device 100A, user device 100B, . . . user device 100n). Reference number 100 may be used herein to refer to any of the user devices 100A, 100B of the system 10. Each user device 100A, 100B can be correlated to a user participating within a dispersed game being enabled by system 10. User device 100A, 100B can be a smart phone, laptop, tablet, or other computing device enabled to communicate with other elements of system 10 over network 650.

In some embodiments, each player can use a user device 100A, 100B to interact with system 10 and likewise, to receive messages and alerts from system 10 and/or from other players using system 10. Each user device 100A, 100B, can optionally be in operative communication with a device 200A, 200B, referred to herein as "connected device" indicating that the device 200A, 200B is connected to another device (e.g., user device 100A, 100B) for communication (with wires or wirelessly). Although system 10 is illustrated with two connected devices 200A, 200B, it should be understood that there can be any number of connected devices within system 10 (e.g., the system can include connected device 200A, connected device 200B, . . . connected device 200n). Reference number 200 may be used herein to refer to any of the connected devices 200A, 200B of the system 10. Each connected device 200A, 200B can be a wearable smart device (e.g., as a smart watch), display device, speaker (e.g., earbud), a wireless headset, a virtual reality headset, an augmented reality headset, etc.

Each connected device 200A, 200B can be configured to allow the player to receive information from system 10 and other players using system 10 as well as provide input to system 10 or send messages to other players using system 10 without the interruption of the dispersed game associated with having to refer to a user device 100 during an active dispersed game being tracked by system 10. In some embodiments, as will be described in more detail with respect to FIG. 2, user device(s) 100 can include a camera that can provide camera data (e.g., captured images) to system 10 that can be used to track the player's motions, including movement about the court and dribbling, and the motions of the basketball, including shooting trajectory of shots taken by a player using system 10 and trajectory of passes made by a player user system 10. System 10 can instruct the player associated with user device 100 (e.g., user device 100A) to place the respective user device 100 in a location at which the camera associated with user device 100 can track the player, the basketball, and the basketball hoop, so that the system 10 can determine the position of the player on the court, the trajectory of the basketball during a dispersed game, and when and whether the basketball successfully passes through the basketball hoop. In some embodiments, multiple players can play on a single court while playing a dispersed game with other players that are located on one or more courts dispersed from the single court. In such a scenario, a single user device (e.g., user device 100A) may be sufficient to track the multiple players as well as the trajectories of basketball shots taken by the multiple players. The user device 100 (e.g., user device 100A) may use data collected from one or more sensors to distinguish the multiple players from one another to enable the tracking of individual player performance of the multiple players. Each dispersed court can support one or more individual players as described herein.

Figure 16:
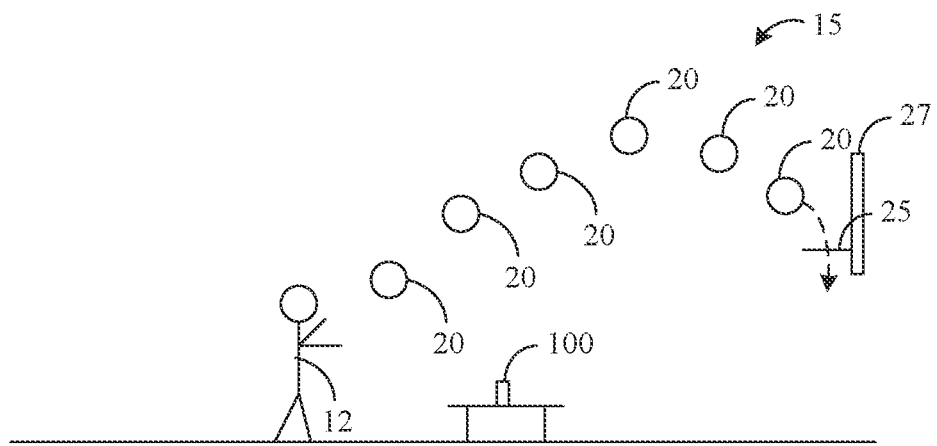
FIG. 16 is a side view of a user taking a basketball shot on a basketball court.

FIG. 16 depicts a player 12 on a basketball court 15 shooting a basketball 20 to a basketball hoop 25. In the embodiment shown by FIG. 16, the player has positioned a user device 100 on the side of the court 15, such as on a bench or other structure or on the ground or floor. The user device 100 may have a camera or other type of sensor, and the player 12, basketball 20, and hoop 25 may all be within the field of view of the camera or other sensor. In some embodiments, the camera of the user device 100 captures a video stream defined by a plurality of frames where each frame shows a respective location of the basketball 20 as it travels to and through the hoop 25. The video images can be evaluated by the user device 100 (or a component in communication with the user device 100, such as the server 300) to determine the ball's trajectory as it travels during the basketball shot. As discussed in more detail herein, various characteristics of the shot, including the trajectory, can be determined and tracked by the system 10. In other embodiments, the user device 100 may be at other locations and other devices, such as tracking devices 600, may be used to capture information about the basketball shots, as will be described in more detail below. As an example, it is possible to mount a tracking device 600 above the hoop 25 (e.g., above, behind, or within a backboard 27) or at other locations as may be desired.

Referring to FIG. 1, the server 300 can be in operative communication with other components of system 10. The server 300 is at a remote location capable of communicating with other devices of the system 10 through one or more networks 650.

In some embodiments, the server 300 can evaluate one or more characteristics of a shot and/or pass executed by a player using system 10, for example, whether a shot was made into the basket or goal and the trajectory of the ball including shot angle, shot velocity, ball spin, etc. The server 300 can also track characteristics of the player, including a player's posture during a shot, while blocking a shot of another player, while moving about the court, and while passing a ball, etc. The server 300 can evaluate a player's body motion and stance by receiving real-time data over network 650 received from the one or more sensors. In other embodiments, these characteristics can be evaluated directly by user device(s) 100 locally without the use of server 300. In other embodiments, as will be described in more detail below, tracking device(s) 600 can both capture (using integrated sensors) and evaluate characteristics associated with a player's and a ball's motion during a dispersed game without the use of user device(s) 100 or server 300. In some embodiments, the server 300 can be in operative communication with analytics database 500, either directly connected or communicating over network 650. Analytics database 500 can be configured to store data received from the one or more sensors associated with user device(s) 100, tracking device(s) 600, and/or training device(s) 700. Analytics database 500 can be configured to also store data generated by the computer vision logic included in user device(s) 100, server 300, and/or tracking device 600, as described in further detail with respect to FIG. 2, FIG. 3, and FIG. 5, respectively. From time to time, user device(s) 100, server 300, and tracking device 600 may update the analytics database 500 with new data and/or access existing data stored on analytics database 500.

Viewing device 400 is configured to receive image data and/or a video stream from other components of system 10, including but not limited to user device(s) 100, tracking device(s) 600 and/or training device(s) 700. Reference number 600 may be used herein to refer to any of the tracking devices 600A, 600B of the system 10, and reference number 700 may be used herein to refer to any of the training devices 700A, 700B of the system 10. Viewing device 400 can include many of the same components as described with respect to FIG. 2 associated with user device(s) 100. In some embodiments, viewing device 400 can be used by spectators to view a game monitored by system 10, or to view a training session implemented on system 10. As will be described in further detail with respect to FIGS. 10-11, viewing device 400 can receive a video stream in substantially real-time from other components of system 10. In other embodiments, viewing device 400 can receive the video stream delayed by a delay factor that allows the system 10 to adjust for variable latency between players utilizing system 10 on dispersed courts. For example, a first player utilizing system 10 from a first location may have a network connection suffering from higher latency than a second player utilizing system 10 from a second location. Accordingly, viewing device 400 can be configured to delay the video stream received from the second player in order to synchronize the video feed received from both the first location and the second location. In other embodiments, the video feed can be received asynchronously without adjusting for latency differences between the first location and the second location. In other embodiments, rather than receiving a video feed, still images can be transmitted to the viewing device 400. Although the system 10 is described with respect to a single viewing device 400, there can be any number of viewing devices 400A, 400B, . . . 400$_n$ connected to system 10 that are configured to receive image and/or image data from other components of system 10. In some embodiments, users of viewing devices 400 can be human coaches that use viewing devices 400 to analyze player performance and provide real-time training feedback to players utilizing system 10.

Note that there are various techniques that can be performed to assess latency between networked devices, such as between the server 300 and any of the user devices 100, tracking devices 600, training devices 700, and viewing devices 400. As an example, the server 300 may perform a handshake process, whereby the roundtrip delay between the server 300 and a user device 100 is measured. In this regard, the server 300 may transmit a ping to the user device 100, which is configured to immediately transmit a reply to the server 300. The server 300 may determine the time taken to receive the reply from the transmission of the ping and calculate the latency between the server 300 and the user device 100 to be about half of the roundtrip delay. This process may be repeated, and the server 300 may determine an average latency that is used to account for latency, as will be described in more detail below. Similar processes may be performed with other devices 400, 600, 700 to estimate the associated network latencies.

Tracking device 600 can have components similar to user device(s) 100 and server 300. In some embodiments, each dispersed court can have one or more tracking devices 600 located thereon that is configured to both capture data using one or more sensors (described in more detail with respect to FIG. 5, below) and analyze the data received to track player and ball movements around the dispersed court. Tracking device 600 can also be configured to evaluate characteristics associated with a player's and a ball's motion during a dispersed game without the use of user device(s) 100 or server 300. In some embodiments, tracking device 600 can be implemented as a basketball hoop with integrated sensors, processors, and computer logic configured to enable the functionalities of tracking device 600. The tracking device 600 can also be implemented with one or more sensors that are worn by a player to detect parameters associated with the player, such as player position or motion, or that are imbedded in the ball. In some embodiments, tracking device 600 may comprise one or more cameras that capture images of the playing spaces so that players and balls may be tracked. In various other embodiments, tracking device 600 can be implemented as a football goal post, soccer goal, hockey goal, etc. with integrated sensors, processors, and computer logic as described above. Although system 10 is illustrated with two tracking devices 600, tracking device 600A and tracking device 600B, it should be understood that there can be any number of tracking devices within system 10 (e.g., the system can include tracking device 600A, tracking device 600B, . . . tracking device 600N).

Training device 700 can be a device configured to assist with training exercises for players utilizing system 10. Training device 700 can include the same or similar components described with respect to tracking device 600. In some embodiments, training device 700 can be a basketball passing machine that is configured to automatically return a basketball to a player utilizing system 10. In some embodiments, the training device 700 can be configured to be used in other sports games. For example, training device 700 can be a baseball pitching machine, a tennis ball machine, a hockey puck machine, etc. In any case, training device can either receive data indicative of a dispersed player from other components of system 10 (e.g., from one of user device(s) 100, server 300, and/or tracking device(s) 600) or be configured to identify a player on a dispersed court using its own sensors and computer logic. Subsequent to identifying a dispersed player and his or her position, training device 700 can be configured to enhance the training of the dispersed player by returning a basketball to the player subsequent to a shot attempt and/or set up more complex training plays by passing the basketball to a predetermined location on the dispersed court depending on the parameters of the selected training exercise.

Network 650 can be of any type, for example, network 650 can be a local area network (LAN) or wide area network (WAN), to permit user device(s) 100, connected device 200, server 300, viewing device 400, analytics database 500, tracking device 600, and/or training device 700 to communicate with one another. In one embodiment, network 650 can be the Internet. In one embodiment, network 650 can be a mobile device network, for example but not limited to an EDGE network, a 3G network, a 4G network, and/or a 5G network. The network 650 may also include any combination of networks as may be desired. As an example, the network 650 may include a cellular network and the Internet, where the components of the system 10 (e.g., a user device 100) includes a cellular transceiver that can be used to access the Internet through the cellular network. In some embodiments, components of system 10 can communicate over a conductive medium (e.g., a wire), fiber, or otherwise. In some embodiments, one or more components of the system can communicate directly with one another over a wireless or wired connection.

Figure 2:
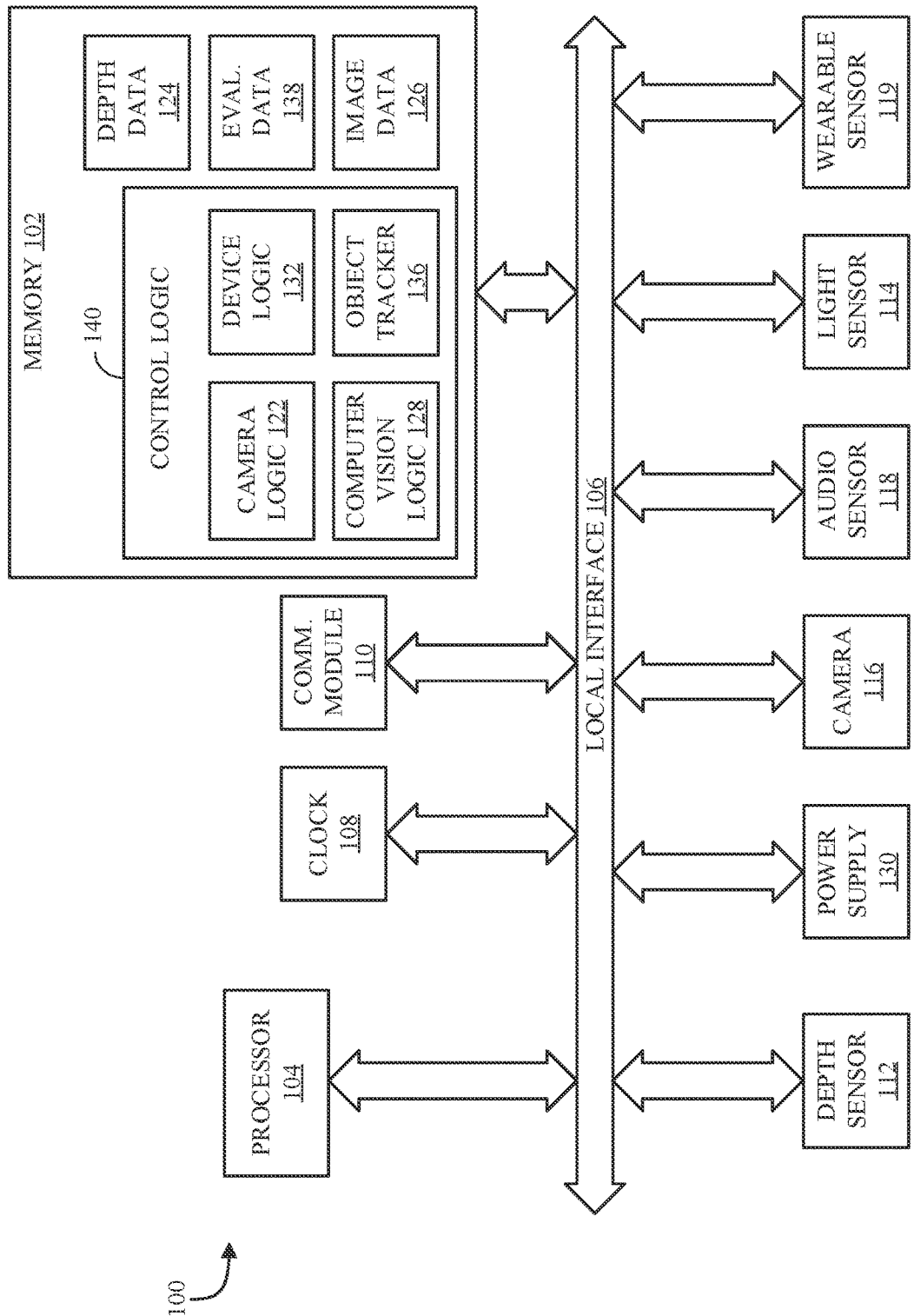
FIG. 2 is a block diagram of an embodiment of a user device used in the tracking system of FIG. 1.

As shown by FIG. 2, user device 100 can include at least one processor 104, which can incorporate processing hardware for executing instructions stored in the memory 102. As an example, the processor 104 may include a central processing unit (CPU) a digital signal processor (DSP), a graphic processing unit (GPU) and/or a quantum processing unit (QPU). The processor 104 can communicate to and drive the other elements within the user device 100 via a local interface 106, which can include at least one bus. The user device 100 can have a clock 108, which can be used to track time and synchronize operations with other components of system 10, including connected devices 200, server 300, viewing devices 400, tracking devices 600, and/or training devices 700.

The user device 100 can have a communication module 110. The communication module 110 can include a radio frequency radio (RF) radio or other device for communicating wirelessly with other components of system 10. The power supply 130 can be an internal battery, such as a lithium-ion battery or nickel cadmium battery. In some embodiments, power supply 130 can have an interface that allows it to plug into or otherwise interface with an external component, such as a wall outlet or battery, and receive electrical power from the external component.

As shown in FIG. 2, the user device 100 can also include various sensors, such as a camera 116, a depth sensor 112, an audio sensor 118, a light sensor 114, and a wearable sensor 119 (e.g., an accelerometer). In other embodiments, other types of sensors may be used, such as sensors (e.g., accelerometers or other types of sensors) embedded in the ball or worn by a player. The camera 116 can be used to record, capture, or obtain images or videos the area surrounding or in proximity to the user device 100. In one embodiment, the camera 116 is configured to capture two-dimensional (2-D) video images of the dispersed court including images of the object (basketball) being dribbled, passed, or shot, the person performing the dribbling, passing, or shooting, and any other players on the dispersed court. The depth sensor 112 can be configured to determine a relative distance (with respect to the depth sensor 112) Of objects in the field of view of the user device 100. The audio sensor 118 can be configured to record sound or noise in proximity to the user device 100. The light sensor 114 can be configured to sense ambient light in the area surrounding the user device 100. The wearable sensor 119 can be configured to sense motion of the player or body part of the player.

The camera 116 can include one or more CCDs (charge coupled devices) and/or one or more active pixel sensors or CMOS (complementary metal-oxide semiconductor) sensors. The images or videos from camera 116 can be stored as image data 126 in memory 102. In one embodiment, the image data 126 may define frames of the captured images. The image data 126 can be stored in any appropriate file format, including but not limited to, PNG (portable network graphics), JPEG (joint photographic experts group), TIFF (tagged image file format), MPEG (moving picture experts group), WMV (windows media video), QuickTime, and GIF (graphics interchange format). The sound recordings from audio sensor 118 may be incorporated into the video file from the camera 116 and stored in image data 126. If the sound recording from the audio sensor 118 is not part of the video file, then the sound recording can be stored in any appropriate file format, including but not limited to WAV (waveform audio), MP3 (MPEG Layer III Audio), WMA (Windows media audio) and MPEG and saved in image data 126 or elsewhere in memory 102.

In one embodiment, for each frame of image data 126, the depth sensor 112 can provide a depth map indicating a respective depth for each pixel of the image frame. The depth maps provided by the depth sensor 112 can be stored as depth data 124 in memory 102. Note that the depth sensor 112 may be oriented such that the distance measured by the depth sensor 112 is in a direction that is substantially normal to the plane of the 2D coordinate system used by the camera 116, although other orientations of the depth sensor 112 are possible in other embodiments.

From time to time, the camera logic 122 can be configured to transmit the image data 126 and the depth data 124 to server 300, viewing device 400, tracking device 600, and/or training device 700. The image data 126 and the depth data 124 may be analyzed by the user device 100, server 300, tracking device 600, and/or training device 700 to track the motion of the players, the motion of the ball, and determine one or more characteristics of the ball motion (e.g., ball velocity, angle, spin, etc.), one or more characteristics of a player's motion (posture, speed, positioning, etc.), and to track a shot, dribble, or pass being made by a player. The image data 126 and the depth data 124 can be time-stamped based on the time indicated by the clock 108 in order to indicate when the image data 126 and the depth data 124 were obtained. Thus, upon receiving the image data from multiple user device(s) 100, a user device 100, the server 300, tracking device 600, and/or training device 700 can determine which image frames from the multiple user devices 100 were captured at substantially the same time in order to facilitate tracking of ball and player movement. From time to time, the user devices 100 may communicate with each other and/or the other components of system 10 in order to synchronize their clocks so that a comparison of a timestamp for an image frame from one camera 116 (and/or image sensor 616) with a timestamp for an image frame from another camera 116 (and/or image sensor 616) accurately indicates the time difference that the two image frames were captured. The image data 126 and the depth data 124 may be presented to a user for analysis or review (e.g., via user device 100, connected device 200, server 300, viewing device 400, and/or tracking device 600).

Various types of cameras 116 and depth sensors 112 may be used in user device 100. In some embodiments, user device may be a smartphone device, such as an Apple iPhone™ or Android™ device with integrated camera. In such a user device, the camera 116 and depth sensor 112 can be integrated into the same housing. The camera 116 is configured to capture a video stream including frames of video data in which each frame is defined by a plurality of pixels. Each pixel can be associated with two coordinates, an x-coordinate and a y-coordinate, representing a location in 2D space. For each frame, each pixel is assigned a color value (which may include a red component I value, a blue component (B) value, and a green component (G) value) indicative of the color of light received by the camera 116 from the location in 2D space corresponding to the pixel's coordinates. Further, for each pixel, the depth sensor 112 can measure the distance from the depth sensor 112 to the real-world object that is at the pixel's corresponding location in 2D space. The distance (which, as described above, may be in a direction substantially normal to the plane of the 2D coordinate system used by the camera 116) may be referred to as the "depth" as the corresponding pixel. Using the image data 126 from the camera 116 and the depth data 124 from the depth sensor 112, the location of an object captured by the camera 116 can be determined in 3D space. That is, for a point on the object, its x-coordinate and y-coordinate from the image data 126 provided by the camera 116 indicate its location along two axes (e.g., the x-axis and y-axis), and the point's depth value from the depth sensor 112, which may be referred to as the "z-coordinate," indicates its location along a third axis (e.g., the z-axis). Notably, the coordinate system defined by the three axes is not necessarily relative to gravity. That is, depending on the orientation of the user device 100, gravity may be in any direction relative to the axes of the coordinate system. Thus, unless a calibration process is performed, the direction of gravity relative to the coordinate system may be unknown. An example of a calibration process for determining the direction of gravity relative to the coordinate system is described by commonly-assigned U.S. Pat. No. 9,734,405, entitled "Systems and Methods for Monitoring Objects in Athletic Playing Spaces" and issued on Aug. 15, 2017, which is incorporated herein by reference.

In some embodiments, the depth sensor 112 has a wave emitter (e.g., an infrared laser projector or other type of emitter) and a wave sensor for sensing reflections of the energy emitted by the wave emitter. The wave emitter emits infrared radiation at various wavelengths into free space, although radiation at other wavelengths outside of the infrared spectrum (e.g., visible light) may be emitted in other embodiments, and the wave sensor senses the reflected energy to capture a video stream having frames of video data. Each frame of the depth data 124 from the depth sensor 112 corresponds to a respective frame of image data 126 from the camera 116. Further, a pixel of a frame of the depth data 124 corresponds to (e.g., has the same x and y coordinates) and indicates the depth for at least one corresponding pixel in the image data 126 from the camera 116. In another embodiment, the depth sensor 112 can use a stereoscopic camera to capture depth data 124.

In this regard, for a frame of video data captured by the depth sensor 112, the depth sensor 112 converts the frame to a depth map by assigning each pixel a new color value (referred to herein as "depth value") representative of the pixel's depth. Thus, when the depth map is displayed, objects displayed as the same color within the image should be approximately the same distance away from the depth sensor 1546, noting that it is often unnecessary for the depth map to actually be displayed during operation.

As described above, a given pixel of the image data 126 from the camera 116 is associated with an x-coordinate and y-coordinate indicative of the pixel's location in 2D space, and the pixel is associated with a depth value from a corresponding pixel in the depth data 124 provided by the depth sensor 112 indicative of the pixel's z-coordinate. The combination of the x-coordinate, y-coordinate, and z-coordinate defines the pixel's location in 3D space relative to the coordinate system of the camera 116. That is, the x-coordinate, y-coordinate, and z-coordinate define the location of the point from which light measured for the pixel was reflected toward the image sensor from an object.

User device 100 can include device logic 132 for generally controlling the operation of the user device 100, including communicating with the other components of the system 10. User device 100 can optionally include computer vision logic 128 for processing and analyzing the image data 126 and depth data 124 from the user device 100, object tracker 136 that is configured to determine the position and movement of objects, such as a game ball, and players handling the object, and any other persons in the playing area. The device logic 132, camera logic 122, computer vision logic 128, and object tracker 136 collectively will be referred to herein as the "control logic" 140 of device 100, though the control logic 140 may have other configurations in other embodiments. User device 100 can optionally include evaluation data 138, which can be data that is used and/or analyzed by device logic 132, computer vision logic 128, and/or object tracker 136 to track the motion of an object including dribbling, passing and/or shooting, determine whether a shot has been made, and determine one or more characteristics of a shot or pass. Object tracker 136, computer vision logic 128, and evaluation data 138 are substantially similar to object tracker 326, computer vision logic 316, and evaluation data 322, which are described in more detail with respect to FIG. 3; thus a full description here is omitted for brevity.

Figure 3:
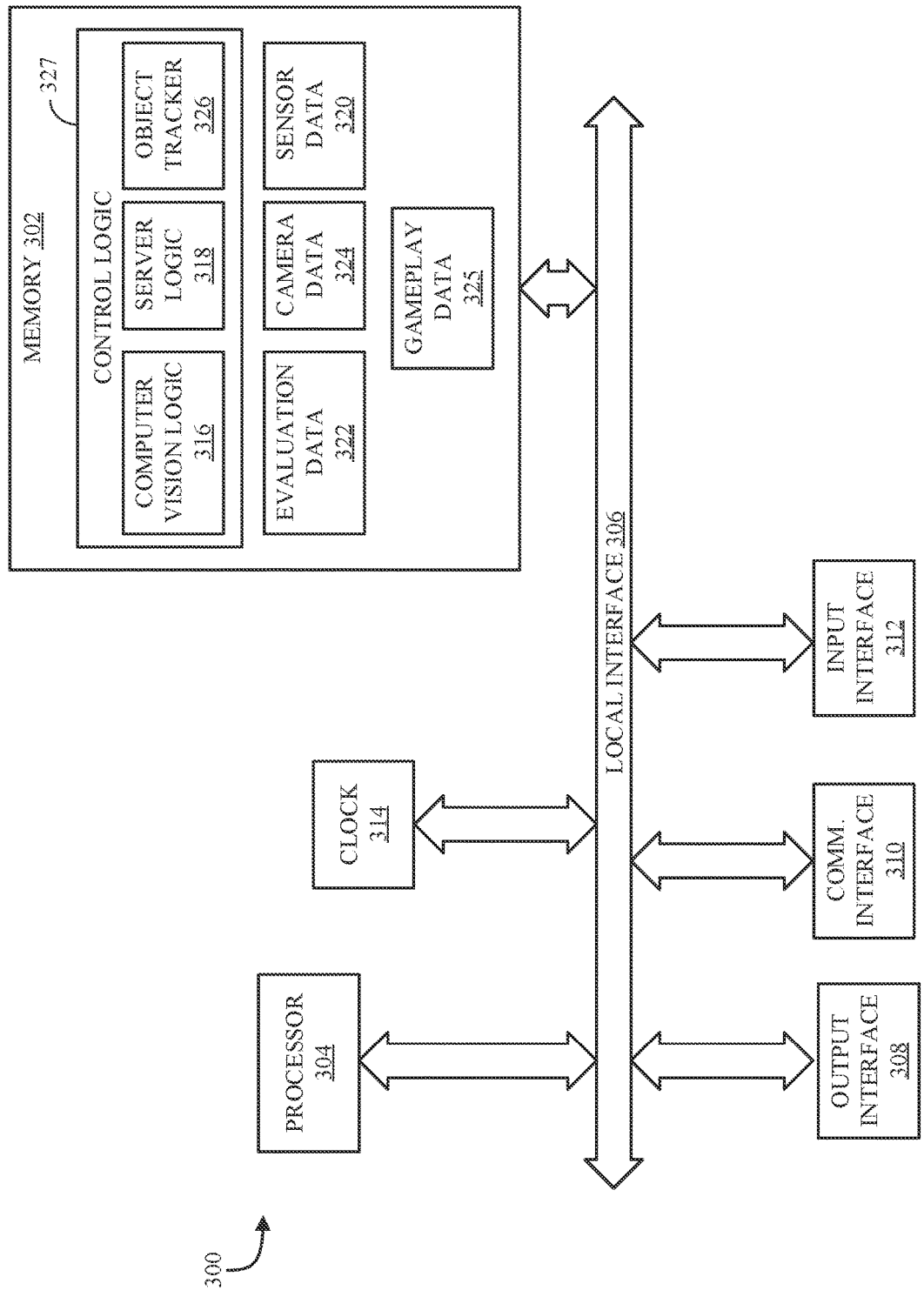
FIG. 3 is a block diagram of an embodiment of a server used in the tracking system of FIG. 1.

FIG. 3 is a block diagram of an embodiment of a server 300 used in the tracking system of FIG. 1. The server 300 can be implemented as one or more general or special-purpose computers, such as a laptop, hand-held (e.g., smartphone) desktop, or mainframe computer. The server 300 can include server logic 318 for generally controlling the operation of the server 300, including communicating with the other components of the system 10. The server 300 can also include object tracker logic 326 that can determine the position and movement of an object, such as a ball used for a sporting event, the person handling the object, and any other persons in the athletic playing area. The server 300 can also include computer vision logic 316 for processing and analyzing the image data 126 and depth data 124 received from user device(s) 100 (and/or the camera data 630 received from tracking device 600, as described in more detail with respect to FIG. 5). The server logic 318, the computer vision logic 316, and the object tracker 326 will be collectively referred to herein as the "control logic" 327 of the server 300, though the control logic 327 can have other configurations in other embodiments. Any portions of the control logic 327 can be implemented in software, hardware, firmware, or any combination thereof. In the server 300 shown in FIG. 3, the control logic 327 is implemented in software and stored in memory 302 of the server 300. Note that the control logic 327, when implemented in software, can be stored and transported on any non-transitory computer-readable medium for use by or in connection with an instruction execution apparatus that can fetch and execute instructions.

The server 300 can include at least one processor 304, which has processing hardware for executing instructions stored in memory 302. As an example, the processor 304 can include a central processing unit (CPU), a digital signal processor (DSP), a graphic processing unit (GPU), and/or a quantum processing unit (QPU). The processor 304 communicates to and drives the other elements within the server 300 via a local interface 306, which can include at least one bus. Furthermore, an input interface 312, for example, a keypad, keyboard, or a mouse, can be used to input data from a user of the server 300, and an output interface 308, for example, a printer, monitor, liquid crystal display (LCD), or other display apparatus, can be used to output data to the user. Further, a communication interface 310 may be used to exchange data among the components of the system 10 or with network 650, as shown in FIG. 1.

As shown by FIG. 3, sensor data 320, evaluation data 322, camera data 324, and gameplay data 325 can be stored in memory 302 at the server 300. The camera data 324 can include image data 126 and depth data 124 from user device(s) 100. The sensor data 320 can include data and measurements from any additional sensors located on a dispersed court, for example, sensors integrated into tracking device 600 and/or training device 700. The camera data 324, the sensor data 320, and the evaluation data 322 can be used and/or analyzed by server logic 318, the computer vision logic 316, and the object tracker 326 to track the object including dribbling, passing, shooting, and transition from dribbling to passing, determine whether a shot has been made, and determine one or more characteristics of a shot, pass, dribble, or transition.

The gameplay data 325 includes information regarding the gameplay being monitored by the system 10. Such data 325 can indicate events that affect the outcome of the gameplay. As an example, in the game of knockout, the gameplay data 325 may indicate a history of the shots made by the respective player, as well as the time of occurrence of each made shot (e.g., when the ball 20 passes through the hoop 25). Thus, the gameplay data 325 can be analyzed to determine the outcomes of the game and the status of each player during the game, including which player won the game and when the other players are eliminated and/or active. For the game of horse, the gameplay data 325 may indicate the location, shot type, and outcome of each shot attempted such that the data 325 may be analyzed to determine the status of each player in the game as well as the winner of the game once the game has concluded. The gameplay data 325 may indicate other types of events and information about the game being monitored by the system 10 as may be desired. In addition, gameplay data 325 is shown as being stored by the server 300, but such data 325 may be stored and used by other devices of the system 10, as may be desired. Storing such data 325 at the device hosting gameplay may be a convenient location of the gameplay data 325, but the data 325 may be stored elsewhere as may be desired.

The evaluation data 322 can include information associated with one or more shot characteristics, one or more passing characteristics, one or more dribbling characteristics, and/or one or more player movements characteristics, for example, the movements associated with particular shot types or the movements associated with particular pass types. The evaluation data 322 can also include training information such as diagrams and videos that can be transmitted and displayed on a user device 100, connected device 200, and/or tracking device 600 to provide training instructions on proper shooting form and/or technique, proper dribbling form and/or technique, proper passing form and/or technique, and proper player posture during passing, shooting, and/or dribbling associated with a user. In one embodiment, the testing procedures can be displayed to the user on user device, 100, connected device 200 and/or tracking device 600, and the object tracker 326 can evaluate a user's performance with respect to the testing procedure in evaluation data 322 based on the user's shooting motion, passing motion, and/or dribbling motion captured in camera data 324.

The object tracker 326 can receive camera data 324, sensor data 320, information from computer vision logic 316 and/or other information relating to the ball and/or the person handling the ball to track the shooting motion, passing motion, and/or dribbling motion to determine one or more characteristics of the shooting motion, passing motion, dribbling motion, and/or transition from passing motion to dribbling motion. Once a characteristic has been determined, the object tracker 326 can compare the determined characteristic to proper characteristic information in evaluation data 322 to score or otherwise evaluate the determined characteristic. The proper characteristics stored in evaluation data 322 can be preselected parameters or techniques that are associated with a preferred shooting motion, player posture, passing motion, and/or dribbling motion. The proper shooting characteristics may include a predetermined number, such as a predetermined ball velocity or predetermined shooting angle. The proper shooting characteristics may also be defined relative to the body of the person performing the shot (e.g., arm bend angle while shooting). Further, the proper shooting characteristics may be defined relative to actions of the person shooting the ball (e.g., there may be one set of proper shooting characteristics when the person is running and a different set of proper shooting characteristics for when the person is walking or stationary). In still other embodiments, the proper shooting characteristics may be defined as a range (e.g., greater than a predetermined minimum, less than a predetermined maximum, or between a predetermined minimum and a predetermined maximum).

The proper passing characteristics may include a predetermined number such as a predetermined speed, a predetermined pass height or a predetermined number of turnovers. The proper passing characteristics may also be defined relative to the body of the person performing the passing (e.g., the pass height should not exceed the chest of the person passing the ball). Further, the proper passing characteristics may be defined relative to actions of the person passing the ball (e.g., there may be one set of proper passing characteristics when the person is running and a different set of proper passing characteristics for when the person is walking or stationary). In still other embodiments, the proper passing characteristics may be defined as a range (e.g., greater than a predetermined minimum, less than a predetermine maximum, or between a predetermined minimum and a predetermined maximum).

The proper transition characteristics may include a predetermined number such as a predetermined time, a predetermined ball position or a predetermined number of turnovers. The proper transition characteristics may also be defined relative to the body of the person performing the transition (e.g., the ball position should not exceed the chest of the person passing the ball). Further, the proper transition characteristics may be defined relative to actions of the person completing the transition (e.g., there may be one set of proper transition characteristics when the person is dribbling while running and a different set of proper transition characteristics when the person is dribbling while walking or being stationary). In still other embodiments, the proper transition characteristics may be defined as a range (e.g., greater than a predetermined minimum, less than a predetermine maximum, or between a predetermined minimum and a predetermined maximum).

The computer vision logic 316 can be used to analyze and process the image data 126 and depth data 124 from the user device(s) 100 stored in camera data 324. The computer vision logic 316 can extract information from the image data 126 and depth data 124 in camera data 324 using models, theories and other techniques to identify or recognize the object to be tracked and one or more participants (including the torso, arms, legs, hands, feet, etc., of the participants) involved in the athletic event associated with the object. The computer vision logic 316 can use numerous techniques to identify or recognize objects and people such as content-based image retrieval, pose estimation, optical character recognition, 2D code reading, shape recognition, facial recognition, object recognition, pattern recognition and any other appropriate identification or recognition technique. Exemplary techniques for identifying and tracking players are disclosed in commonly-assigned U.S. Pat. No. 11,450, 106 entitled "Systems and Methods for Monitoring Objects at Sporting Events" and filed on Feb. 28, 2022, which is incorporated herein by reference.

In one embodiment, the computer vision logic 316 can perform one or more of the following techniques and/or processes on the image data 126 and depth data 124 data from camera data 324: pre-processing; feature extraction; detection/segmentation; high-level processing; and decision making. The pre-processing of the camera data 324 can involve the processing of the data to confirm that the data is in the proper form for subsequent actions. Some examples of pre-processing actions can include noise reduction and contrast enhancement. After the camera data 324 has been pre-processed, the camera data 324 can be reviewed or analyzed to extract features (e.g., lines, edges, corners, points, textures and/or shapes) of various complexity from the camera data 324. Next, in the detection/segmentation step, decisions can be made regarding the features and/or regions that are relevant and require additional processing. The high-level processing of the reduced set of camera data 324 (as a result of the detection/segmentation step) involves the estimation of specific parameters (e.g., object size) and classifying of a detected object into categories. Finally, the decision-making step makes a determination of the identity of the detected object or person or indicates that the detected object or person is not known.

The computer vision logic 316 can identify objects and persons that are present in the camera data 324 by processing the individual images and videos received from a camera 100 and/or any combined or grouped images and videos based on camera data 324 from multiple cameras 100A, 100B, . . . , 100N (and/or image sensors 616 and depth sensors 612 associated with tracking device 600A, 600B, . . . , 600N). The computer vision logic 316 can identify objects or persons using labels carried by the objects or persons (e.g., numbers worn on jerseys), facial recognition techniques (if identifying a person), profiling techniques (using the profile of the object or person) or any other suitable recognition techniques.

In one embodiment, the object or person can have a label that is attached or affixed to the object or person and that can be recorded by user device(s) 100 and/or tracking device(s) 600. If the person is carrying a tag, the label can be (but does not have to be) incorporated into the tag carried by the person. The computer vision logic 316 can identify the label attached to the object or person and then identify the object or person based on stored information in memory 302 correlating each label to an object or person. In another embodiment, the computer vision logic 316 can identify a person using facial recognition or can identify an object or a person by using a distinguishable or identifiable profile or feature of the object or person. For example, the identification of a circular or spherical shape may indicate the presence of the ball in the frame. Similar to the process for identifying an object or person using a label, the computer vision logic 316 can identify facial features and/or other profiles or features of the object or person in the camera data 324 and then compare the identified facial features and/or other profiles or features of the asset to stored information in memory 302 correlating information on features and/or profiles to an object or person.

The computer vision logic 316 can send the camera data 324 and/or information on the identified object or person from analyzing the camera data 324 to the object tracker 326. The object tracker 326 can use information on the identified object and/or persons from the computer vision logic 316 to determine a dribbling motion for the object and one or more dribbling characteristics associated with the dribbling motion, a transition from a dribbling motion to a passing motion and one or more characteristics associated with the transition, a passing motion with the object, one or more passing characteristics associated with the passing motion, and a shooting motion with the object, and one or more shooting characteristics associated with the shooting motion. In one embodiment, the object tracker 326 can use synchronized and calibrated camera data 324 to determine a dribbling motion and corresponding dribbling characteristics, a dribble-to-pass transition and corresponding transition characteristics, a passing motion and corresponding passing characteristics, and/or a shooting motion and corresponding shooting characteristics. The synchronization and calibration of the camera data 324 can be done by the computer vision logic 316 or the object tracker 326.

The synchronization of the camera data 324 may involve ensuring that the corresponding frames of camera data 324 processed by the computer vision logic 316 or the object tracker 326 for a given sample were captured substantially at the same time. In this regard, a sample generally refers to data from measurements that were taken substantially at the same time. For example, at a given instant, images of multiple balls over dispersed courts may be captured by multiple user devices 100 (e.g., user device 100A, 100B, . . . , 100n) located on the dispersed courts. Further, each ball's position may be calculated from each of the images. Since the position data from the multiple user devices 100 are based on image data captured substantially at the same time in such example, the measured positions are part of the same sample. In order to determine which frames were captured substantially at the same time, a global time system may be defined.

As an example, the server 300 may maintain a global time domain and adjust the timestamps from each of the user devices 100 according to the global time domain so that the timestamps are synchronized. That is, images captured at the same time should have the same adjusted timestamp in the global time domain. Alternatively, the server 300 (or other device maintaining a global time domain, such as one or more of user device(s) 100 and/or one or more tracking device(s) 600) may from time-to-time transmit timing information to the user device(s) 100. The user device(s) 100 may then use such information to adjust their respective clocks so that images having the same timestamps relative to the global time domain from the user device(s) 100 were captured substantially at the same time. Alternatively, the server 300 may analyze unsynchronized timestamps from the user device(s) 100 and determine which frames were captured substantially at the same time. In such embodiment, the server 300 may communicate with the user device(s) 100 in a controlled calibration process in order to assess timing differences between the user device(s) 100. As an example, each user device 100 may report a current timestamp to the server 300 in a handshake process, as previously described above for determining a roundtrip delay, so that the server 300 can determine the respective user device(s) 100 time relative to a global time system maintained by the server 300 or otherwise. Specifically, by calculating the delay from a device (e.g., a user device 100) to the server 300, the server can be configured to use such delay to determine the proper global timestamp to assign a given frame so that the global timestamp indicates the time that the frame was captured by the user device 100. In other embodiments, other techniques for synchronizing the camera data are possible.

In one embodiment, assume that the server 300 is configured to maintain the global time domain and that the clocks of the other components, such as user devices 100, viewing devices 400, tracking devices 600, and training devices 700, are updated from time-to-time to remain synchronous (within an acceptable margin of error) with the clock 314 of the server 300. In the described embodiment, the clock 108 of each user device 100 (as well as the clocks of the other devices 400, 600, 700) may be configured to maintain a time relatively accurately. As an example, the clock 108 may be based on a cellular or GPS signal received by the device 100. As indicated above, the server 300 may be configured to transmit from time-to-time timing information that may be used to adjust the clock 108 so that the timestamps generated by the clock 108 are relative to the global time domain.

As an example, for a given update, the server 300 may be configured to transmit the current timestamp generated by the clock 314, which may be used as the reference for the global time domain. Upon receiving the timestamp, the user device 100 may adjust the clock 108 such that the timestamps generated by the clock 108 match the timestamps generated by the clock 314 of the server 300 at the same respective time, noting that the device 100 may take into account the network latency between it and the server 300. In this regard, the user device 100 may assume that that the current time relative to the global time domain corresponds to the time indicated by the timestamp received from the server 300 plus the determined network latency between the device 100 and server 300. The user device 100 may then appropriately update the clock 108 such that the timestamp generated by the clock 108 is relative to the global time domain. Thus, if the clocks 108 and 314 generate timestamps at the same time, such timestamps preferably have the same value within an acceptable margin of error.

When multiple user device(s) are present on a court, the calibration of the camera data 324 can involve the correlation of the pixels in an image frame to a global coordinate system such that the server 300 is aware of which pixels in different frames from different user device(s) represent the same physical location in space. This may be achieved, for example, by ensuring that the pixels in frames from different user device(s) representing the same location on the court are assigned the same global coordinates. By calibrating the camera data 324, the object and the person handling the object can be tracked through multiple image frames from different user device(s) 100 since the location of the object and the person handling the object, as defined in the global coordinate system, can be the same in each image frame regardless of the field of view of the user device 100 capturing the image frame. Once the camera data 324 is calibrated, the object tracker 326 can track the object through multiple image frames as the object moves into and out of view individual image frames. If one or more user device(s) 100 become misaligned, the calibration process can be repeated to calibrate the misaligned user device(s) 100. Note that the global coordinate system may be referenced to predefined directions (e.g., one reference direction downward toward the center of the earth and another reference direction toward the north pole) such that play at two different locations (e.g., two different cities) can be normalized.

In one embodiment, the object tracker 326 can determine a dribbling motion, a passing motion, and/or a shooting motion by analyzing successive frames of camera data 324 to determine changes in the position and/or depth of the identified object and/or changes in the position of the person preforming the dribbling, passing, and/or shooting motion. Some exemplary techniques of calculating the trajectory of a ball that may be used by object tracker 326 can be found in commonly-assigned U.S. Pat. No. 8,908,922 entitled "True Space Tracking of Axisymmetric Object Flight Using Diameter Measurement" and U.S. Pat. No. 8,948,457 entitled "True Space Tracking of Axisymmetric Object Flight Using Diameter Measurement," both of which patents are hereby incorporated by reference. By identifying changes associated with the upward and downward trajectories of the object or the person handling the object, the object tracker 326 can determine characteristics associated with the dribbling, passing, and/or shooting motion. In one embodiment, some of the characteristics can be determined using conventional mathematical and physics principles and equations based on trajectory information extracted from the camera data 324. The determined characteristics can then be stored in memory 302 and/or scored based on proper characteristics stored in evaluation data 322.

As an example, the object tracker 326 may analyze the trajectory of the ball and identify a plurality of dribbles. For one or more dribbles, the object tracker 326 may determine a parameter indicative of a dribbling characteristic, such as ball speed, dribble height, repetition rate, type of dribble, etc., and store such parameters for analysis. In some cases, the object tracker 326 may correlate a given parameter with information that can be used to characterize dribbling performance. For example, if a given dribble is performed with the left hand, the parameter determined for the dribble may be correlated in memory with a left-hand identifier. Based on the parameters correlated with such identifier, the object tracker 326 may calculate one or more scores or other statistics indicative of the player's performance with his left hand. As an example, an average repetition rate, ball speed, or dribble height for the player's left hand may be calculated. If a dribble type is identified for a particular dribble, as will be described in more detail below, the parameter determined for the dribble may be correlated in memory with a type identifier indicative of the dribble type. Based on the parameters correlated with such identifier, the object tracker 326 may calculate one or more scores or other statistics indicative of the player's dribbling performance for the identified dribble type. If a particular defender (e.g., a virtual defender, as described below with respect to FIG. 14) can be identified as guarding the player, as will be described in more detail below, the parameter determined for the dribble may be correlated in memory with an identifier that identifies the defender. Based on parameters correlated with such identifier, the object tracker 326 may calculate one or more scores or other statistics indicative of the player's dribbling performance against the defender. In other embodiments, the data can be grouped in other ways in order to provide further insight into the player's dribbling performance relative to certain conditions. Any of the parameters, scores, or other statistics described herein may be reported by the system to indicate one or more dribbling characteristics for the tracked player. Any such parameters, scores, or other statistics may be used in order to calculate an overall or combined assessment of the player's dribbling performance that may be reported.

Note that techniques other than or in addition to the identification of objects and/or persons by computer vision logic 316 may be used by the object tracker 326 to determine a dribbling motion and one or more characteristics associated with the dribbling motion. In one embodiment, sensor data 320 may be analyzed by the object tracker 326 to determine the location and movement of an object and/or person. The sensor data 320 can then be used to determine dribbling motion and one or more characteristics associated with the dribbling motion.

In another embodiment, the object tracker 326 can determine a transition from a dribbling motion to a passing motion and/or a passing motion by analyzing successive frames of camera data 324 to determine changes in the position and/or depth of the identified object, changes in the position of the person initiating the transition and/or passing motion and/or changes in the person in possession of the identified object. The object tracker 326 can determine a transition from a dribbling motion to a passing motion by detecting an end to an upward/downward trajectory for the identified object followed by the subsequent initiation of a passing motion. The object tracker 326 can determine a passing motion by detecting a horizontal motion or trajectory (e.g., movement away from the location of the person) of the identified object from a first location on dispersed court followed by a change of person in possession of the identified object at a different location from the first location. By identifying changes associated with the trajectories of the object or the person initiating the passing motion, the object tracker 326 can determine characteristics associated with the transition and/or the passing motion. In one embodiment, some of the transition characteristics and/or passing characteristics can be determined using conventional mathematical and physics principles and equations based on trajectory information extracted from the camera data 324. In some embodiments, machine learning (e.g., an artificial intelligence (AI) neural network) may be used to identify or otherwise evaluate the transition, motion, or other characteristics. The determined transition and/or passing characteristics can then be stored in memory 302 and/or scored based on proper transition and/or passing characteristics stored in evaluation data 322.

As an example, the object tracker 326 may analyze the trajectory of the ball and identify a passing motion. For each passing motion, the object tracker 326 may determine a parameter indicative of a passing characteristic, such as ball speed, pass height at initiation, pass height at reception, type of pass, etc., and store such parameters for analysis. In some cases, the object tracker 326 may correlate a given parameter with information that can be used to characterize passing performance. For example, if a given pass is initiated with the left hand, the parameter determined for the pass may be correlated in memory with a left-hand identifier. Based on the parameters correlated with such identifier, the object tracker 326 may calculate one or more scores or other statistics indicative of the player's performance with his left hand. As an example, an average pass height at initiation, ball speed, or pass height at reception for the player's left hand may be calculated. If a pass type is identified for a particular passing motion, as will be described in more detail below, the parameter determined for the pass may be correlated in memory with a type identifier indicative of the pass type. Based on the parameters correlated with such identifier, the object tracker 326 may calculate one or more scores or other statistics indicative of the player's passing performance for the identified pass type. If a particular defender (e.g., a virtual defender, as described below with respect to FIG. 14) can be identified as guarding the player, as will be described in more detail below, the parameter determined for the pass may be correlated in memory with an identifier that identifies the defender. Based on parameters correlated with such identifier, the object tracker 326 may calculate one or more scores or other statistics indicative of the player's passing performance against the defender. In other embodiments, the data can be grouped in other ways in order to provide further insight into the player's passing performance relative to certain conditions. Any of the parameters, scores, or other statistics described herein may be reported by the system to indicate one or more passing characteristics for the tracked player. Any such parameters, scores, or other statistics may be used in order to calculate an overall or combined assessment of the player's passing performance that may be reported.

Note that techniques other than or in addition to the identification of objects and/or persons by computer vision logic 316 may be used by the object tracker 326 to determine a transition and/or passing motion and one or more characteristics associated with the transition and/or passing motion. In one embodiment, sensor data 320 may be analyzed by the object tracker 326 to determine the location and movement of an object and/or person. The sensor data 320 can then be used to determine a transition and/or passing motion and one or more characteristics associated with the transition and/or passing motion.

In another embodiment, the object tracker 326 can determine a transition from a dribbling motion to a shooting motion and/or a shooting motion by analyzing successive frames of camera data 324 to determine changes in the position and/or depth of the identified object, changes in the position of the person initiating the transition and/or shooting motion and/or changes in the person in possession of the identified object. The object tracker 326 can determine a transition from a dribbling motion to a shooting motion by detecting an end to an upward/downward trajectory for the identified object followed by the subsequent initiation of a shooting motion. The object tracker 326 can determine a shooting motion by detecting a vertical motion or trajectory (e.g., movement away from the location of the person) of the identified object from a first location on dispersed court towards a goal or basket. By identifying changes associated with the trajectories of the object or the person initiating the shooting motion, the object tracker 326 can determine characteristics associated with the transition and/or the shooting motion. In one embodiment, some of the transition characteristics and/or shooting characteristics can be determined using conventional mathematical and physics principles and equations based on trajectory information extracted from the camera data 324. The determined transition and/or passing characteristics can then be stored in memory 302 and/or scored based on proper transition and/or passing characteristics stored in evaluation data 322.

As an example, the object tracker 326 may analyze the trajectory of the ball and identify a shooting motion. For each shooting motion, the object tracker 326 may determine a parameter indicative of a shooting characteristic, such as ball velocity, shot angle, ball spin, type of shot, etc., and store such parameters for analysis. In some cases, the object tracker 326 may correlate a given parameter with information that can be used to characterize passing performance. For example, if a given shot is initiated with the left hand, the parameter determined for the pass may be correlated in memory with a left-hand identifier. Based on the parameters correlated with such identifier, the object tracker 326 may calculate one or more scores or other statistics indicative of the player's performance with his left hand. As an example, an average ball velocity, shot angle, or ball spin for the player's left hand may be calculated. If a shot type is identified for a particular shooting motion, as will be described in more detail below, the parameter determined for the shot may be correlated in memory with a type identifier indicative of the shot type. Based on the parameters correlated with such identifier, the object tracker 326 may calculate one or more scores or other statistics indicative of the player's shooting performance for the identified shot type. If a particular defender (e.g., a virtual defender, as described below with respect to FIG. 14) can be identified as guarding the player, as will be described in more detail below, the parameter determined for the shot may be correlated in memory with an identifier that identifies the defender. Based on parameters correlated with such identifier, the object tracker 326 may calculate one or more scores or other statistics indicative of the player's shooting performance against the defender. In other embodiments, the data can be grouped in other ways in order to provide further insight into the player's shooting performance relative to certain conditions. Any of the parameters, scores, or other statistics described herein may be reported by the system to indicate one or more shooting characteristics for the tracked player. Any such parameters, scores, or other statistics may be used in order to calculate an overall or combined assessment of the player's shooting performance that may be reported.

Note that techniques other than or in addition to the identification of objects and/or persons by computer vision logic 316 may be used by the object tracker 326 to determine a transition and/or shooting motion and one or more characteristics associated with the transition and/or shooting motion. In one embodiment, sensor data 320 may be analyzed by the object tracker 326 to determine the location and movement of an object and/or person. The sensor data 320 can then be used to determine a transition and/or shooting motion and one or more characteristics associated with the transition and/or shooting motion.

While computer vision logic 316 and object tracker 326 have been described with respect to server 300, it should be understood that some or all of the processes performed by server 300 associated with tracking players and objects on dispersed courts and determining characteristics associated with dribbling, passing, shooting, transitions between dribbling and passing, and transitions between dribbling and shooting can be accomplished by user device(s) 100 without the use of a server 300. In some embodiments, in place of user device(s) and/or server 300, some or all of the functions of server 300 associated with tracking players and objects on dispersed courts and determining characteristics associated with dribbling, passing, shooting, transitions between dribbling and passing, and transitions between dribbling and shooting can be accomplished by tracking device 600, as described below with respect to FIG. 5.

Figure 4:
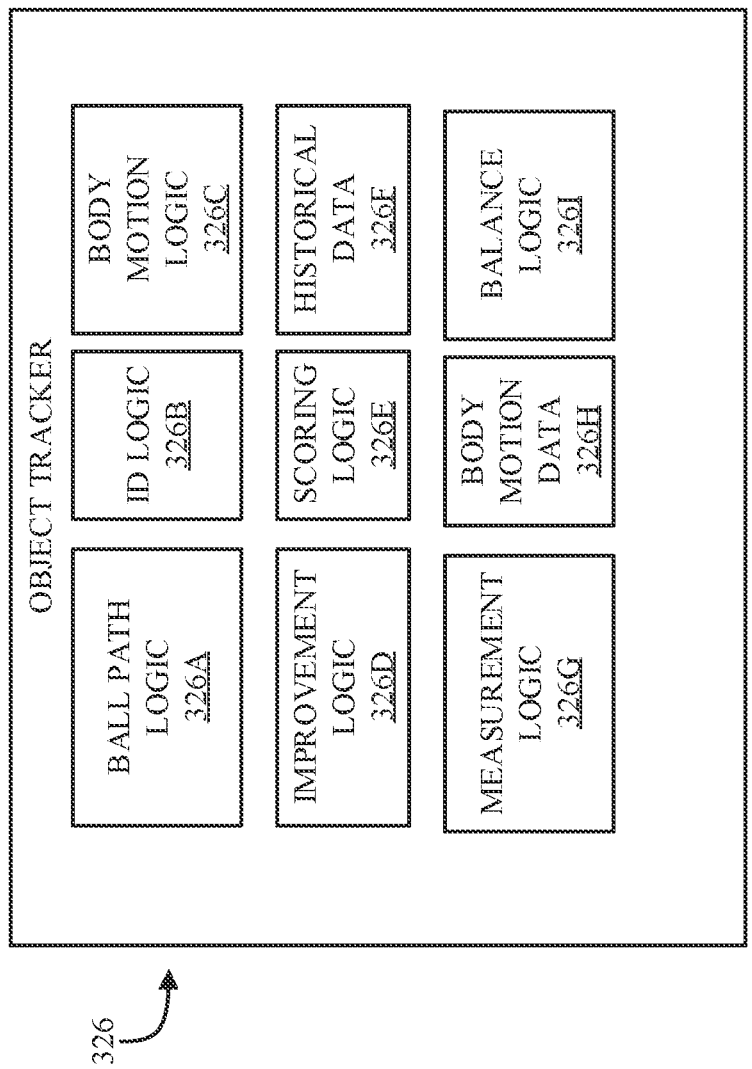
FIG. 4 is a block diagram of an object tracker of the dispersed game tracking system.

FIG. 4 shows an embodiment of the object tracker 326 that can be used by the server 300. It should be noted that object tracker 136 of user device 100 and object tracker 636 of tracking device 600 may be substantially similar to object tracker 326 and enable similar functions of user device 100 and/or tracking device 600. The object tracker 326 can include ball path logic 326A for generally determining the path or movement of the ball and the person dribbling and/or passing the ball, even when the ball and/or the person are concealed from the cameras 116 and/or image sensor(s) 616, identification logic 326B for determining the location of the ball and/or the offensive and defensive players or persons on the athletic playing surface, and scoring logic 326E for evaluating the dribbling and/or passing motion of a person or the performance of a defender guarding the person dribbling and/or passing the ball and providing a "score" associated with the person's performance. The scoring logic 326E can evaluate a person's performance based on information from measurement logic 326G. Measurement logic 326G can be used to measure the capabilities of the person dribbling and/or passing the ball and/or the capabilities of the person(s) defending the person dribbling the ball. Improvement logic 326D can use information from measurement logic 326G and scoring logic 326E to determine areas where the person can improve his/her performance. The object tracker 326 can also include body motion logic 326C to generally determine the movement and/or actions of a player, even when the player is concealed from the cameras 116 and/or image sensor(s) 616, and balance logic 326I to evaluate the balance and/or fluidity of the person dribbling, passing, and/or shooting the ball and/or the other person(s) on the dispersed court.

Note that the object tracker 326 can be configured to find a certain reference point of the ball, such as the center of the ball, in assessing the player's performance. As an example, for a basketball shot, the object tracker 326 may determine the position of the ball center (or other reference point of the ball) relative to the hoop as the ball is passing through the hoop to assess how on target the shot is relative to the hoop.

There are various techniques that can be used to find the center of the ball. In one exemplary embodiment, the object tracker 326 is configured to identify multiple points on the ball surface and to then, for each point, define a vector that is normal to the ball's surface at that point. The point of intersection of the vectors from multiple points is then determined to be the center of the ball.

Figure 27:
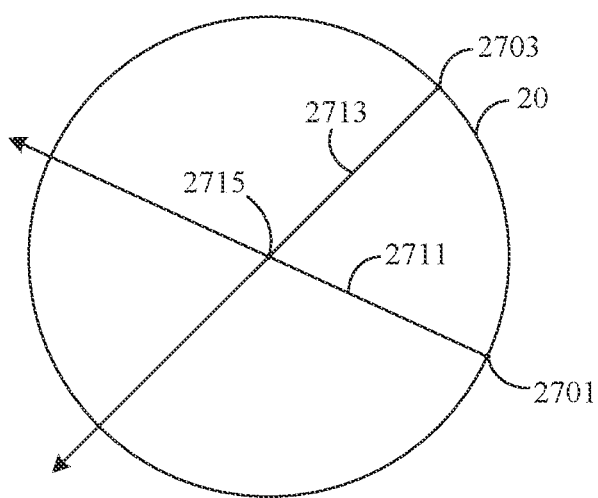
FIG. 27 illustrates an exemplary image of a ball captured by a depth sensor showing vectors used for finding a center of the ball.

In this regard, the object tracker 326 may be configured to analyze an image captured by a depth sensor 112, noting that the depth sensor 112 for each point on a surface of the ball determines the distance of the point to the depth sensor 112. Using such distance, the location of the point in 3D space can be determined. In the exemplary embodiment shown by FIG. 27, the object tracker 326 is configured to identify at least two points 2701, 2703 on the surface of a ball 20 within the image. For point 2701, the object tracker 326 may define a vector 2711 at the point 2701 that is normal to the ball's surface. Note that the points of the ball's surface adjacent to the point 2701 may be used to find the direction that is normal to the ball's surface at point 2701. Similarly, for point 2703, the object tracker 326 may define a vector 2713 at the point 2703 that is normal to the ball's surface. The point 2715 of intersection of the two vectors 2711, 2713 is at the center of the ball 20. The object tracker 326 determines the location of the intersection point 2715 in 3D space and determines the center of the ball 20 to be at this location. Note that, for simplicity of illustration, FIG. 27 shows two vectors 2711, 2713 for two points 2701, 2713 on the ball surface, but in other embodiments, a greater number of vectors for any number of points on the ball surface may be defined using the same techniques described above, as may be desired. In addition, in other embodiments, other techniques may be used to identify the center of the ball 20 or other reference point of the ball 20.

Historical data 326F and body motion data 326H used by the object tracker 326 can be stored in memory 302 at the server 300. The historical data 326F can include information relating to previous movements and actions of the person dribbling and/or passing the ball during training sequences and/or live play sequences. The historical data 326F can also include data and information on the movements and actions of the defender(s) guarding the person dribbling and/or passing the ball. Body motion data 326H can include information relating to the location and movement of a person and his/her associated body parts (e.g., head, eyes, shoulder, elbow, hand, finger, chest, waist, back, thigh, knee, calf, hip, ankle and foot) during the dribbling, passing, and/or shooting of the ball. As an example, the body motion data 326H may be based on the camera data 324 and/or sensor data 320. As a further example, the camera data 324 may be analyzed as a shooter is taking a shot to derive an extent and direction to which a particular body part of the shooter moves during the shot, and the body motion data 326H may indicate such information about the body part's movement. The body motion data 326H can include information about various body parts and, where applicable, indicate left-side and right-side information and front and back information associated with the player's body parts. As an example, the body motion data 326H may characterize the player's motion of each his or her fingers, hands, arms, elbows, legs, knees, etc. during a shot, pass, dribble or any of other various events of interest.

As previously discussed, the object tracker 326 can receive camera data 324, sensor data 320, information from computer vision logic 316 and/or other information relating to the ball and the players or persons on the dispersed court. The ball path logic 326A can be used to determine (or approximate) the path of the ball and the person dribbling, passing, and/or shooting the ball even if the ball or the person cannot be identified by identification logic 326B based on the camera data 324. For example, the identification logic 326B (or the computer vision logic 316) may not be able to identify the ball or the person because the ball may not be present in camera data 324. The ball may not be present in the camera data 324 due to the ball being concealed from the fields of view of the cameras 116 and/or image sensor 616. Further, even if the ball is present in the camera data 324, the identification logic 326B may not be able to recognize the ball because the ball is obscured in the camera data 324 due to poor lighting conditions, partial occlusion of the ball and/or blurring as a result of rapid movement of the ball.

In some examples, the ball path logic 326A can use information from body motion logic 326C to determine or estimate the trajectory of a virtual ball. In some examples, a player may wish to train using system 10 without the use of the ball. Nevertheless, system 10 can determine a trajectory of a "virtual" ball based on information gathered from image data by body motion logic 326C, which can track the positioning of a player's body parts over time and use established principles of physics to determine a trajectory of a ball. In some examples, as will be described in further detail with respect to FIG. 14, a first dispersed player can be involved in a training session with a second dispersed player who is remote from the first dispersed player, wherein the first dispersed player can be training how to make a particular shot and the second dispersed player can be training how to block the shot being attempted by the first dispersed player. For example, the object tracker 326 can be configured to determine whether the trajectory of the ball shot by the first player intersects with the body of the second defending player (e.g., by using ball path logic 326A to determine the trajectory of the ball, and body motion logic 326C to determine the motion of the defending player, and determining whether an intersection occurs between the ball and the defending player).

In one embodiment, the identification logic 326B can determine if a player in the basketball game of knockout has made or missed a basket by identifying one or more actions of the shooting player following a shot attempt (e.g., the player making one or more gestures subsequent to taking a shot, such as raising one or both hands above his or her head). The identification logic 326B can determine which player made or missed the shot based on the hand and arm movements of the player. The identification logic 326B may also be able to determine which player made or missed the shot by processing audio information captured from the player identifying the player and whether the shot was made.

The ball path logic 326A can use the information from the identification logic 326B to determine the path or trajectory of the ball. When the identification logic 326B is unable to identify the ball from the camera data 324, the ball path logic 326A can determine an expected trajectory or movement of the ball based on the last known location and/or movement of the ball from identification logic 326B and other information stored in memory 302, such as the initial or previous trajectory of the ball. The ball path logic 326A can analyze the body position of a player based on the body motion data 326H and approximate the expected trajectory of the ball and the time to complete the trajectory based on how the player is positioned. The ball path logic 326A can confirm (or reject) the approximate trajectory of the ball once the identification logic 326B is able to identify the ball from the camera data 324. Even when identification logic 326B cannot detect the ball, the identification logic 326B may be able to detect the motion of the shoulders, arms, and hands of the person in control of the ball and provide that information to the ball path logic 326A. The ball path logic 326A can then use the information from the identification logic 326B and body motion data 326H to approximate the motion, trajectory, direction, spin, and velocity of the ball while it is not visible or detectable to identification logic 326B.

If the ball path logic 326A receives information from the identification logic 326B that the ball is in the position expected by the ball path logic 326A (subject to a margin of error), the ball path logic 326A can determine that the actual trajectory of the ball followed the approximated trajectory determined by the ball path logic 326A. However, if the ball path logic 326A receives information from the identification logic 326B that the ball is in a different location than expected, the ball path logic 326A can determine that the movement of the ball did not follow the approximated trajectory and can approximate a new trajectory for the ball based on the starting and ending locations for the ball. In addition, the ball path logic 326A can store information in memory 302 (possibly as historical data 326F) on the starting and ending positions of the ball, the revised approximated trajectory and the person dribbling the ball. The ball path logic 326A can then use the stored information on the starting and ending position for the ball and the revised approximated trajectory when formulating an approximated trajectory for the ball when the ball becomes occluded in a similar situation in the future.

In another embodiment, the ball path logic 326A may be able to determine the trajectory or movement of the ball even if the ball or some (or all) of the person dribbling and/or passing the ball is occluded in camera data 324. As an example, the ball may be occluded from view, but the person's elbow may be visible. Movement of the person's arm near the elbow may indicate when the ball has reached or exited the person's hand. In this regard, a change in movement of the person's arm may indicate that the ball has reached the person's hand and is being pushed downward for a dribble or outward for a pass or shot attempt. Further, the ball path logic 326A may calculate the location of the ball at the time it is determined to reach or exit the person's hand based on the location and orientation of the person's elbow. In this regard, the arm length of the person may be predetermined and used by the logic 326A to determine the ball's distance from the person's elbow. Also, the angle of the person's forearm may indicate the ball's direction from his elbow. By determining various locations of the ball at different times while the ball is occluded, the ball path logic 326A can estimate the trajectory of the ball between such points.

If desired, the ball path logic 326A can use machine learning and/or artificial intelligence to establish the most likely paths the ball would travel based on any other current data that is available (e.g., data extracted from camera data 324 or data from sensor data 320 such as depth sensor, motion sensor/accelerometer or sound information) or from historical data 326F that includes information of what the person is most likely to do in a particular situation or environment. In this regard, by analyzing the person's movements over time, the ball path logic 326A can learn how the person likely responds to certain conditions (such as when a competing player sharing a dispersed court attempts to knock the player's ball away in the game of knockout) and then predict the ball movements and trajectories based on such learned tendencies when the ball is occluded from view during similar conditions.

If the ball path logic 326A is not able to approximate the movement of the ball from the currently available data, the ball path logic 326A may be able to approximate the movement of the ball based on historical data 326F associated with the person dribbling, passing, and/or shooting the ball. In other words, the ball path logic 326A can determine an approximate movement of the ball based on the previous movements of the person in similar situations.

In one embodiment, the ball path logic 326A can process video/audio/depth sensing/motion sensing sequences that include tagged descriptors provided by a reviewer of the camera data 324 which describe dribble patterns, dribbler patterns, levels of dribbling capability, transition patterns, pass types, passer patterns, levels of passing capability, shooter patterns, shooting patterns, shot types, and/or levels of shooting capabilities in a quantitative or qualitative way. The ball path logic 326A can use the tagged descriptors in building a knowledge base for machine learning and/or artificial intelligence. The degree of tagging provided in the video/audio/depth sensing/motion sensing data can vary between no tagging, light tagging, or full tagging. As the knowledge base for the ball path logic 326A increases, the machine learning and/or artificial intelligence of the ball path logic 326A can be used to "track" the movements of the ball and the person dribbling and/or passing the ball for longer periods when the ball and the person are mostly occluded from the view of cameras 116 or image sensors 616.

In another embodiment, the ball path logic 326A may be able to use data from only a single sensor (e.g., a camera 116, audio detector, depth sensor or motion sensor) to accomplish ball movement determinations across a dispersed court even though the ball and/or aspects of the player in control of the ball are occluded much of the time. The ball path logic 326A can use one or more of the techniques described above to determine the movement of the ball with only an occasional detection of the ball by identification logic 326B to locate/relocate the ball between analysis techniques.

In still another embodiment, the ball path logic 326A can use machine learning and/or artificial intelligence to analyze the historical data 326F to uncover patterns and trend information. The ball path logic 326A can then use the pattern and trend information when determining the probabilities associated with the location and movement of the ball.

The body motion logic 326C can be used to identify a specific person on the dispersed court and determine or approximate the movements and actions of the identified person. The body motion logic 326C can determine the movements and actions of one or more players on a dispersed court even if the player(s) cannot be continuously identified by identification logic 326B from the camera data 324. For example, the identification logic 326B (or the computer vision logic 316) may not be able to identify a player because the player may not be present in camera data 324. The player may not be present in some portions of the camera data 324 due to the player being concealed from the field of view of the cameras 116 and/or image sensors 616 by one or more other persons on the dispersed court. Further, even if the player is present in the camera data 324, the identification logic 326B may not be able to identify the defender because the defender is obscured in the camera data 324 due to poor lighting conditions and/or partial occlusion of the player.

In some embodiments, the body motion logic 326C can identify the specific player using information from the identification logic 326B regarding the identity of the player. The body motion logic 326C can use identification information directly from the identification logic 326B or the computer vision logic 316 to specifically identify the defender. In another embodiment, the body motion logic 326C can perform the identification of the specific player based on the information from the identification logic 326B. For example, the body motion logic 326C may use body motion data 326H to identify the specific player since each player can have a unique body motion profile. The body motion logic 326C can then designate and store specific movements and actions of the specific player. The measurement logic 326G can use the stored information by the body motion logic in evaluating the performance of the defender.

In one embodiment, the body motion logic 326C can identify the location in a 3-D space of the player's fingers, hands, elbows, shoulders, chest, head, waist, back, thighs, knees, calves, hips, ankles, feet, and/or other body parts. In addition, once the individual body parts have been identified, the body motion logic 326C can determine relative locations of the identified body parts to each other. The body motion logic 326C can provide the information of the player's body to the body motion data 326H for use by the object tracker 326. For example, the balance logic 326I can use the body motion data 326H to measure or infer the balance of the player. In one embodiment, the player's balance could be relative to the balance of a normal person from a chosen group or could be relative to the "normal" balance of the particular player using historical data 326F. In another embodiment, the body motion logic 326C can specifically identify each of the players and store corresponding information for each of the players.

The body motion logic 326C can use the information from the identification logic 326B to determine the movement and/or actions of the player. In addition, the body motion logic 326C can assign parameters to the player movements and/or actions and categorize the outcome of the particular player movements and/or actions. For example, the body motion logic 326C can identify when a player successfully knocks out another player in the game of knockout, or when a player knocks a competitor's ball away from the hoop in the game of knockout.

When the identification logic 326B cannot provide specific information on the location of the player, possibly due to occlusion or lighting, the body motion logic 326C can determine an expected movement of the player based on the last known location and/or movement of the player from identification logic 326B and other information stored in memory 302. The body motion logic 326C can use machine learning to establish the most likely movements and/or actions the player would perform based on any other current data that is available (e.g., data extracted from camera data 324 or data from sensor data 320 such as depth sensor, motion sensor/accelerometer or sound information) or from historical data 326F that includes information on what the person is most likely to do in a particular situation or environment.

In one embodiment, the body motion logic 326C can process various sequences (e.g., video sequences, audio sequences, depth sensor sequences or motion sensor sequences) about a player that includes tags (or tagged descriptors) with information about player patterns and/or player capabilities in a quantitative or qualitative way. The tags provide information and/or a description about the content (e.g., the actions of the player) of a sequence and can be associated with the sequence (or file) similar to metadata. A sequence can have a single tag describing the actions of the player or multiple tags describing different actions of the player. The tags can correspond to actions or categories of actions (e.g., player movement associated with different shots, such as a hook shot, a layup, a dunk, etc.) which are recognized by the body motion logic 326C. A user can review the sequences (which may be obtained from camera data 324) and apply the appropriate tag(s) to the player's actions in the sequence. When applying a tag, the user can select from a predetermined list of tags and/or can create his or her own tag. The degree of tagging provided in the sequence data can vary between no tagging, light tagging, or heavy tagging. The body motion logic 326C can use the tagged descriptors in building a knowledge base for machine learning and/or artificial intelligence. As the knowledge base for the body motion logic 326C increases, the machine learning and/or artificial intelligence of the body motion logic 326C can be used to "track" the movements of the players for longer periods when the players are mostly occluded from the view of cameras 116 or image sensors 616.

In another embodiment, the body motion logic 326C may be able to use data from only a single sensor (e.g., a camera 116, audio detector, depth sensor or motion sensor) to accomplish player movement and/or action determinations across an entire dispersed court even though the player may be occluded much of the time. The body motion logic 326C can use one or more of the techniques described above to determine the movements of the player with only an occasional detection of the player by identification logic 326B to assess/reassess the position of the defender between analysis techniques.

The body motion logic 326 may also be configured to determine the player's direction of gaze based on the position of his or her eyes and assess player performance based on such direction. In this regard, the body motion logic 326 in frames of camera data 324 may locate the player's eyes and estimate, based on the locations and angles of the player's eyeballs in the images, the direction at which the player is looking at the occurrence of an event, such as at the time the ball leaves the player's hands during a shot, dribble, or pass. The object tracker 326 may then use such direction as a factor in assessing the player's performance.

As an example, for a basketball shot, the object tracker 326 may be configured to provide a better assessment (e.g., a higher performance score) if the shooter is determined to be looking at the basketball hoop or a specific range of points on the hoop (e.g., the back of the hoop). In another example, a passer may be assessed a better score if he or she is looking away from the direction of the pass so as to make it more difficult to block the pass by a defender who may be trying to "read" the passer's eyes. In dribbling, a better performance may be assessed if the dribbler is looking away from the ball, such as at a defender, during the dribbling. Yet other ways of using a player's gaze direction as a factor in assessing his or her performance during an event of interest are possible.

The measurement logic 326G can be used to analyze data about a player handling the ball on the dispersed court. The measurement logic can use information from identification logic 326B, ball path logic 326A, body motion logic 326C, balance logic 326I, historical data 326F, body motion data 326H and/or evaluation data 322 to analyze the performance and capabilities of the respective player.

The measurement logic 326G can determine the proficiency of the person dribbling the ball with respect to many different dribbling characteristics. For example, some of the dribbling characteristics of the person dribbling the ball that can be evaluated by the measurement logic 326G can include the person dribbling the ball performing very low dribbling, very fast dribbling, fast changes in dribbling speed (i.e., acceleration or deceleration), fast changes in dribbling direction, multiple fast changes in dribbling direction, stopping a forward or sideways motion very quickly while maintaining a dribble, fast transitions from dribbling to shot release, fast transitions from dribbling to pass (for a wide variety of passing types and situations), and/or any other desired dribbling characteristic. Each of these dribbling characteristics can be described by one or more quantitative parameters. For example, very low dribbling can be characterized by maintaining the dribble height (actual or average) under a predefined value, very fast dribbling can be characterized by the person maintaining the dribbles per second above a predefined value, fast changes in dribbling speed can be characterized by completing a change in the dribbles per second within a predefined time period, fast changes in dribbling direction can be characterized by completing a change of direction within a predefined time period, multiple fast changes in dribbling direction can be characterized by completing several changes of direction within a predefined time period, stopping a forward or sideways motion very quickly while maintaining the dribble can be characterized by ending an active motion (while maintaining a dribbling motion) within a predefined time period and/or predefined distance, fast transitions from dribbling to shot release can be characterized by the time to transition from a dribbling motion to a shooting motion being within a predefined time period, and fast transitions from dribbling to pass can be characterized by the time to transition from a dribbling motion to a passing motion being within a predefined time period. Each of the dribbling characteristics can further be characterized by some type of qualitative or quantitative score from scoring logic 326E that indicates the level of skill required to achieve proficiency over the dribbling characteristic. In one embodiment, the measurement logic 326G can provide the person's dribbling characteristics relative to individual defensive players.

The measurement logic 326G can also determine the proficiency of the person dribbling the ball with respect to the person's ability to achieve the same pattern of dribbling every time. The measurement logic 326G can evaluate a person's ability to complete training sequences that can require specified dribble speeds, specified dribble heights, specified changes in speed, specified changes in dribble position, specified changes in head/eyes/shoulder/elbow/hand/finger/chest/waste/thigh/knee/ankle/foot position and/or specified maintenance of balance. The measurement logic 326G can also determine the proficiency of the person dribbling the ball by evaluating whether the person is able to repeat the same dribble move in a highly effective way in game situations. Each of these situations can be described by a quantitative parameter or set of parameters. For example, to evaluate the person's proficiency in completing a training sequence, the measurement logic 326G may individually evaluate the person's completion of each of the individual tasks (which can correspond to one or more parameters) in the training sequence. Each of these parameters can further be characterized by some type of qualitative or quantitative score from scoring logic 326E that indicates the level of skill required to achieve proficiency over the dribbling moves.

The measurement logic 326G can evaluate the performance of the person dribbling the ball based on the number and type of different movements that are performed by the person dribbling the ball in response to the same or similar situation. In other words, the measurement logic 326G can determine the person's proficiency in not repeating the same pattern of dribbling every time. The ability of the person dribbling the ball to vary the dribbling motions used in response to particular situations can be used to limit the effectiveness of a defensive player in identifying and responding to repetitive patterns in the person's dribbling motion. The measure of the person's ability not to repeat the same pattern of dribbling can be described by one or more quantitative parameters. Each of these parameters can further be characterized by some type of qualitative or quantitative score from scoring logic 326E that indicates the level of skill required to achieve that non-repetitive capability.

The measurement logic 326G can determine the proficiency of the person passing the ball with respect to many different passing characteristics. For example, some of the passing characteristics of the person passing the ball that can be evaluated by the measurement logic 326G can include passing the ball very quickly, providing the ball at predetermined location relative to the person receiving the ball, fast transitions from dribbling to pass, and/or any other desired passing characteristic. Each of these passing characteristics can be described by one or more quantitative parameters. For example, passing the ball very quickly can be characterized by passing the ball at a speed greater than a predefined value, providing the ball at predetermined location relative to the person receiving the ball can be characterized by the ball being provided within a predefined distance of a locus on the person receiving the pass (e.g., the center of the chest), and fast transitions from dribbling to pass can be characterized by the time to transition from a dribbling motion to a passing motion being within a predefined time period. Each of the passing characteristics can further be characterized by some type of qualitative or quantitative score from scoring logic 326E that indicates the level of skill required to achieve proficiency over the passing characteristic. In one embodiment, the measurement logic 326G can provide the person's passing characteristics relative to individual defensive players.

The measurement logic 326G can also determine the proficiency of the person passing the ball with respect to the person's ability to achieve the same pattern of passing every time. The measurement logic 326G can evaluate a person's ability to complete training sequences that can require specified transitions from dribbling types, specified passing speeds, specified locations for the pass, specified changes in head, shoulder, elbow, hand, finger, chest, waste, thigh, knee, ankle, and/or foot position and/or specified maintenance of balance. The measurement logic 326G can also determine the proficiency of the person passing the ball by evaluating whether the person is able to repeat the same passing motions in a highly effective way in game situations. Each of these situations can be described by a quantitative parameter or set of parameters. For example, to evaluate the person's proficiency in completing a training sequence, the measurement logic 326G may individually evaluate the person's completion of each of the individual tasks (which can correspond to one or more parameters) in the training sequence. Each of these parameters can further be characterized by some type of qualitative or quantitative score from scoring logic 326E that indicates the level of skill required to achieve proficiency over the passing motions.

The measurement logic 326G can evaluate the performance of the person passing the ball based on the number and type of different movements that are performed by the person passing the ball in response to the same or similar situation. In other words, the measurement logic 326G can determine the person's proficiency in not repeating the same pattern of passing every time. The ability of the person passing the ball to vary the passing motions used in response to particular situations can be used to limit the effectiveness of the defensive player in identifying and responding to repetitive patterns in the person's passing motion. For example, the ability of the person to execute different types of passes (e.g., bounce pass, chest pass, etc.) after completing different dribbling moves (e.g., behind-the-back dribble, crossover dribble, between-the-legs dribble, etc.) can limit the effectiveness of the defensive player. The measure of the person's ability not to repeat the same pattern of passing can be described by one or more quantitative parameters. Each of these parameters can further be characterized by some type of qualitative or quantitative score from scoring logic 326E that indicates the level of skill required to achieve that non-repetitive capability.

The measurement logic 326G can determine the proficiency of the person in transitioning from dribbling the ball to passing the ball with respect to many different characteristics. For example, the measurement logic 326G can evaluate one or more dribbling characteristics (as described above) of the person during a time period associated with the end of the dribbling motion and one or more passing characteristics (as described above) of the person during the start (and possibly the completion) of the passing motion. In addition, the measurement logic 326G can also evaluate the transition characteristics of the person in transitioning from the dribbling motion to the passing motion. Each of these dribbling, passing and/or transition characteristics can be described by one or more quantitative parameters. For example, fast transitions from dribbling to pass can be characterized by the time to transition from a dribbling motion to a passing motion being within a predefined time period. Each of the dribbling, passing and/or transition characteristics can further be characterized by some type of qualitative or quantitative score from scoring logic 326E that indicates the level of skill required to achieve proficiency over the corresponding characteristic.

The measurement logic 326G can also determine the proficiency of the person in transitioning from dribbling the ball to passing the ball with respect to the person's ability to achieve the same pattern of transition every time. The measurement logic 326G can evaluate a person's ability to complete training sequences that can require specified transitions from dribbling types, specified transitions to passing types, specified changes in head, shoulder, elbow, hand, finger, chest, waste, thigh, knee, ankle, and/or foot position and/or specified maintenance of balance. The measurement logic 326G can also determine the proficiency of the person in transitioning from dribbling the ball to passing the ball by evaluating whether the person is able to repeat the same dribbling and passing motions in a highly effective way in game situations. Each of these situations can be described by a quantitative parameter or set of parameters. For example, to evaluate the person's proficiency in completing a training sequence, the measurement logic 326G may individually evaluate the person's completion of each of the individual tasks (which can correspond to one or more parameters) in the training sequence. Each of these parameters can further be characterized by some type of qualitative or quantitative score from scoring logic 326E that indicates the level of skill required to achieve proficiency over the transitions from dribbling motions to passing motions.

The measurement logic 326G can evaluate the performance of the person in transitioning from dribbling the ball to passing the ball based on the number and type of different movements that are performed by the person in ending the dribbling motion and beginning the passing motion in response to the same or similar situation. In other words, the measurement logic 326G can determine the person's proficiency in not repeating the same pattern of transitioning from dribbling the ball to passing the ball every time. The ability of the person transitioning from dribbling the ball to passing the ball to vary the dribbling motions and passing motions used in response to particular situations can be used to limit the effectiveness of the defensive player in identifying and responding to repetitive patterns of the person. For example, the ability of the person to execute different types of passes (e.g., bounce pass, chest pass, etc.) after completing different dribbling moves (e.g., behind-the-back dribble, crossover dribble, between-the-legs dribble, etc.) can limit the effectiveness of the defensive player. The measure of the person's ability not to repeat the same pattern of transitioning from dribbling to passing can be described by one or more quantitative parameters. Each of these parameters can further be characterized by some type of qualitative or quantitative score from scoring logic 326E that indicates the level of skill required to achieve that non-repetitive capability. In one embodiment, measurement logic 326G can use machine learning and/or artificial intelligence to measure and/or evaluate, directly or indirectly, a player's performance in dribbling the ball, passing the ball and transitioning from a dribbling motion to a passing motion.

In one embodiment, the measurement logic 326G can determine the number of assists by the person dribbling and/or passing the ball. An assist can be defined as the last pass to a person that directly leads to the scoring of a basket. In addition, for an assist, the person receiving the pass must move directly toward the basket in a "scoring motion," which may include dribbling the ball. The measurement logic 326G can be used to determine when the person dribbling and/or passing the ball makes a pass to a teammate and when the teammate receiving the pass takes (and makes) a shot at the basket (i.e., scores a field goal). The measurement logic 326G can track the motions and actions of the teammate receiving the pass and determine if the teammate receiving the pass has performed a "scoring motion." The measurement logic 326G can determine a scoring motion based on the movements and actions of the teammate involved with the scoring of a basket and numerous other factors such as the amount of time between receiving the pass and scoring the basket, the movement of the teammate towards the basket and the location where the shot was taken relative to the location where the pass was caught. The measurement logic 326G can also track the passer's number of assists for each of his/her teammates. In another embodiment, the measurement logic 326G can determine whether the person dribbling the ball has taken (and made) a shot at the basket.

The measurement logic 326G can also evaluate the effectiveness of the person dribbling the ball with respect to the defender(s) guarding the person. The measurement logic 326G can use information from balance logic 326I to determine changes in the body orientation and position and balance of the defender as a result of a dribbling move. For example, a person dribbling the ball may cause a defender to stumble and/or fall after performing a particular dribbling move (e.g., a cross-over dribble) which enables the person dribbling the ball to "defeat" the defender and progress to the basket or an open position on the court. The measure of the ability of the person dribbling the ball to negatively impact a defender's balance and position and orientation to enable the person dribbling the ball to advance to the basket can be described by one or more quantitative parameters. Each of these parameters can further be characterized by some type of qualitative or quantitative score from scoring logic 326E that indicates the level of ability in disrupting the defender's body orientation and position and balance.

The measurement logic 326G can also determine the ability of the person dribbling and/or passing the ball to complete one or more related objectives such as a high number of assists and/or a low number of turnovers. The objectives can be calculated based on the person's overall performance or with respect to individual defensive players. The measure of a player's ability to achieve the related objectives and to determine how much of the achievement of the higher-order objectives is due to dribbling and/or passing expertise can be described by a quantitative parameter or set of parameters. For example, the measurement logic 326G can determine the effectiveness of a dribbling move in generating an open passing lane (that can result in a score by the person receiving the ball) for the person dribbling the ball when evaluating the passing performance for the player and/or the number of assists. Each of these parameters can further be characterized by some type of qualitative or quantitative score from scoring logic 326E that indicates the level of skill required to achieve the higher order objectives.

The measurement logic 326G can determine the proficiency of the person shooting the ball with respect to many different shooting characteristics. For example, some of the shooting characteristics of the person shooting the ball that can be evaluated by the measurement logic 326G can include shooting the ball very quickly, shooting the ball at predetermined velocity, angle, spin, etc., fast transitions from dribbling to shot, and/or any other desired shooting characteristic. Each of these shooting characteristics can be described by one or more quantitative parameters. For example, shooting the ball very quickly can be characterized by shooting the ball at a speed greater than a predefined value, shooting the ball at a predetermined spin or angle can be characterized by the ball being shot at a predetermined angle or spin speed, and fast transitions from dribbling to shot can be characterized by the time to transition from a dribbling motion to a shooting motion being within a predefined time period. Each of the shooting characteristics can further be characterized by some type of qualitative or quantitative score from scoring logic 326E that indicates the level of skill required to achieve proficiency over the shooting characteristic. In one embodiment, the measurement logic 326G can provide the person's shooting characteristics relative to individual defensive players.

The measurement logic 326G can also determine the proficiency of the person shooting the ball with respect to the person's ability to achieve the same pattern of shooting every time. The measurement logic 326G can evaluate a person's ability to complete training sequences that can require specified transitions from dribbling types, specified shooting speeds, angles, or spins, specified changes in head, eyes, shoulder, elbow, hand, finger, chest, waste, thigh, knee, ankle, and/or foot position and/or specified maintenance of balance. The measurement logic 326G can also determine the proficiency of the person shooting the ball by evaluating whether the person is able to repeat the same shooting motions in a highly effective way in game situations. Each of these situations can be described by a quantitative parameter or set of parameters. For example, to evaluate the person's proficiency in completing a training sequence, the measurement logic 326G may individually evaluate the person's completion of each of the individual tasks (which can correspond to one or more parameters) in the training sequence. Each of these parameters can further be characterized by some type of qualitative or quantitative score from scoring logic 326E that indicates the level of skill required to achieve proficiency over the shooting motions.

The measurement logic 326G can evaluate the performance of the person shooting the ball based on the number and type of different movements that are performed by the person shooting the ball in response to the same or similar situation. In other words, the measurement logic 326G can determine the person's proficiency in not repeating the same pattern of passing every time. The ability of the person shooting the ball to vary the shooting motions used in response to particular situations can be used to limit the effectiveness of the defensive player in identifying and responding to repetitive patterns in the person's shooting motion. For example, the ability of the person to execute different types of shots (e.g., layups, dunks, three-pointers, fade-away, etc.) after completing different dribbling moves (e.g., behind-the-back dribble, crossover dribble, between-the-legs dribble, etc.) can limit the effectiveness of the defensive player. The measure of the person's ability not to repeat the same pattern of shooting can be described by one or more quantitative parameters. Each of these parameters can further be characterized by some type of qualitative or quantitative score from scoring logic 326E that indicates the level of skill required to achieve that non-repetitive capability.

The measurement logic 326G can determine the proficiency of the defender with respect to many different defensive characteristics. For example, some of the defensive characteristics of the defender that can be evaluated by the measurement logic 326G can include the defender having a very fast forward speed, very fast forward acceleration, very fast forward lunge acceleration, very low forward lunge, very fast side defensive speed, very fast side defensive acceleration, very low side defensive position, very fast change of direction of side movement, very fast ending of side movement, very fast reverse speed, very fast transition from dribbling defensive position to pass interception position, very fast transition from dribbling defensive position to shot defensive position, and/or any other desired defensive characteristic. Each of these defensive characteristics can be described by one or more quantitative parameters. For example, very fast forward speed can be characterized by maintaining a forward speed (actual or average) above a predefined value, very fast forward acceleration can be characterized by having an acceleration rate above a predefined value, very fast forward lunge acceleration can be characterized by having a lunge acceleration rate above a predefined value, very low forward lunge can be characterized by maintaining the defender's forward lunge position below a predefined height, very fast side defensive speed can be characterized by maintaining a lateral speed (e.g., a speed in moving to the side) above a predefined value, very fast side defensive acceleration can be characterized by having a side acceleration rate above a predefined value, very low side defensive position can be characterized by maintaining a side defensive position below a predefined height, very fast change of direction of side movement can be characterized by switching from one side movement to an opposed sided movement within a predefined time period, very fast ending of side movement can be characterized by stopping a side movement within a predefined time or predefined distance, very fast reverse speed can be characterized by maintaining a reverse speed (actual or average) above a predefined value, very fast transition from dribbling defensive position to pass interception position can be characterized by the time to transition from a dribbling defensive position to a passing defensive position being within a predefined time period, very fast transition from dribbling defensive position to shot defensive position can be characterized by the time to transition from a dribbling defensive position to a shot defensive position being within a predefined time period. Each of the defensive characteristics can further be characterized by some type of qualitative or quantitative score from scoring logic 326E that indicates the level of skill required to achieve proficiency over the defensive characteristic. In one embodiment, the measurement logic 326G can provide the defender's defensive characteristics relative to individual offensive players (e.g., a specific person dribbling, passing, and/or shooting the ball).

The measurement logic 326G can also determine the proficiency of the defender with respect to the defender's ability to achieve one or more patterns of defensive movements. The measurement logic 326G can evaluate a defender's ability to complete training sequences that can require specified forward speeds, specified defensive heights, specified changes in speed, specified changes in defensive position, specified changes in body position and/or specified maintenance of balance. The measurement logic 326G can also determine the proficiency of the defender by evaluating whether the person is able to repeat the same defensive movements or actions in a highly effective way in game situations. Each of these situations can be described by a quantitative parameter or set of parameters. For example, to evaluate the defender's proficiency in completing a training sequence, the measurement logic 326G may individually evaluate the defender's completion of each of the individual tasks (which can correspond to one or more parameters) in the training sequence. Each of these parameters can further be characterized by some type of qualitative or quantitative score from scoring logic 326E that indicates the level of skill required to achieve proficiency over the defensive movements and/or actions.

The measurement logic 326G can evaluate the performance of the defender based on the number and type of different movements that are performed by the defender in response to the same or similar situation. In other words, the measurement logic 326G can determine the defender's proficiency in not repeating the same defensive movements and/or actions for a given situation. The ability of the defender to vary the defensive movements and/or actions used in response to particular situations can be used to limit the effectiveness of the person dribbling the ball in identifying and responding to repetitive patterns in the defender's defensive movements. The measure of the person's ability not to repeat the same pattern of defensive movements can be described by one or more quantitative parameters. Each of these parameters can further be characterized by some type of qualitative or quantitative score from scoring logic 326E that indicates the level of skill required to achieve that non-repetitive capability.

The measurement logic 326G can also determine the ability of the defender to complete one or more related objectives such as a such as a high number of steals, high number of blocks, high number of deflected passes, high number of deflected shots, and/or high number of traps. The objectives can be calculated based on the defender's overall performance or with respect to individual offensive players. The measure of a defender's ability to achieve the related objectives and to determine how much of the achievement of the related objectives is due to defensive expertise can be described by a quantitative parameter or set of parameters. For example, the measurement data 326G can determine effectiveness of a defensive move in positioning the defender to either deflect a pass from the person dribbling the ball or steal the pass from the person dribbling the ball. Each of these parameters can further be characterized by a qualitative or quantitative score from scoring logic 326E that indicates the level of skill required to achieve the related objectives.

In one embodiment, the measurement logic 326G can determine the use of a "screen" on the defender of the person dribbling the ball and the defender's response to the screen. A screen is a known basketball term that generally refers to a play or situation when an offensive player, referred to hereafter as "offensive screener," without the ball establishes a stationary position to block the path of the defender of another offensive player, referred to hereafter as the "offensive screen target," moving towards the screener who is setting the screen. The offensive screen target can either have the ball or can be attempting to receive a pass from the person with the ball. The measurement logic 326G can detect the occurrence of a screen by determining the establishment of a stationary position by the offensive screener near the defender of the offensive screen target such that the path of the defender intersects with the stationary position of the offensive screener.

Note that there are various factors that can be used in the determination of whether a screen has occurred. As an example, the probability of a screen may be increased if the defender contacts the offensive screener within a predefined time after establishment of the screener's stationary position. In addition, the orientation of the offensive screener to the defender of the offensive screen target may be indicative of whether a screen has occurred. In this regard, an offensive screener often faces the defender when setting a screen so as to help increase the width of the screen and, thus, the screen's effectiveness of disrupting the path of the defender. In addition, the proximity of the offensive screen target relative to the offensive screener may indicate whether a screen is occurring. In this regard, an offensive screen target often passes within a close proximity or even contacts the offensive screener when passing the offensive screener. Thus, detecting that the offensive screen target has passed the offensive screener within a predefined distance may indicate the occurrence of a screen. The measurement logic 326G may detect any of the events described above as indicative of a screen and may detect the occurrence of a screen based on any combination of such factors. As an example, in assessing whether a stationary position of the offensive screener constitutes a screen, the measurement logic 326G may calculate a screen score that is increased by a certain amount for each detection of an event that indicates the occurrence of the screen while the offensive screener is in the stationary position. If the screen score exceeds a predefined threshold, then the measurement logic 326G may detect the occurrence of a screen. In other embodiments, other techniques for detecting an occurrence of a screen are possible.

When a screen is detected, the measurement logic 326G may assess how various players performed during the screen and track the results over time to determine a score, referred to herein as "screen score," indicating each player's skill level in executing screens or defending against screens. As an example, the measurement logic 326G can determine how the defensive player responded to the screen. The measurement logic 326G can determine if the defensive player goes "above" or "below" the screen, stops motion or switches defensive assignment with another defensive player such that the defensive player is no longer guarding the person dribbling the ball.

In this regard, as is commonly understood in basketball, it is generally desired for a defensive player to defend against a screen by going "above" the screen. Going "above" the screen generally refers to when the defender passes the offensive screener on the same side as the offensive screen target. This is often the more challenging course of action for the defender as it is often difficult to "fight through" the screen in order to stay on the same side of the offensive screener as the offensive screen target. However, going "above" the screen often allows the defender to maintain a good defensive position with respect to the offensive screen target by staying close to the offensive screen target through the screen. In contrast going "below" the screen generally refers to when the defender passes the offensive screener on the opposite side of the offensive screener as the offensive screen target. This is often simpler for the defender to achieve, relative to going "above" the screen, but it results in separation between the defender and the offensive screen target, which is undesirable as it often gives the offensive screen target an opportunity to make a play such as taking an undefended shot on the goal or driving toward the goal.

The measurement logic 326G can determine if the defensive player goes above or below the screen by determining the position of the defensive player relative to the offensive screener and the offensive screen target. For example, based on the images captured by the cameras or otherwise, the measurement logic 326G may determine whether the defender and the offensive screen target pass on the same side of the offensive screener. If so, the measurement logic 326G determines that the defender has gone "above" the screen. If the measurement logic 326G determines that the defender and the offensive screen target pass on opposite sides of the offensive screener, then the measurement logic 326G determines that the defender has gone "below" the screen.

The measurement logic 326G can track how the defender responds to being screened over time and can also track how the defensive player responds to screens from individual offensive players. As an example, the measurement logic 326G may track the number of times that the defender goes "above" screens during a given time period and provide a parameter indicative of such number (e.g., a percentage of screens that the defender goes "above" the screen). The measurement logic 326G may similarly track other outcomes, such as the number of times that the defender goes "below" the screen or otherwise defends against the screen. The measurement logic 326G can also determine various parameters indicative of the effectiveness of the defender's responses to screens. As an example, for each screen, the measurement logic 326G may determine whether the defender was able to maintain a defensive position with respect to the offensive screen target (e.g., stayed within a certain distance of the offensive screen target and/or stayed between the offensive screen target and the goal) or whether the offensive screen target was able to perform a certain action coming off of the screen (e.g., within a predefined time period after passing the offensive screener), such as taking an open shot at the goal or driving toward the goal unguarded by the defender. The measurement logic 326G may track the number of times that one or more outcomes occur over a given time period or number of screens and provide a parameter indicative of such number (e.g., a percentage of screens that a certain outcome occurs). The parameters tracked by the measurement logic 326G may be correlated with the offensive players so that the defender's play against the offensive players can be ascertained and assessed. As an example, the data provided by the measurement logic 326G may be used to determine how many times the defender went "over" a screen (or performed some other action) set by a particular screener relative to the number of times that he went "under" such a screen. Thus, the performance of the defender against screens set by the particular screener can be assessed.

The measurement logic 326G can similarly track the motions and actions of the offensive players involved with the screen. In this regard, the same or similar actions and events tracked by the measurement logic 326G for assessing the defender's play can be used to assess the play of the offensive players. As an example, the measurement logic 326G may track the number of times that the offensive screen target caused his defender to go "below" the screen or perform some other action during the screen. The measurement logic 326G can also track the number of times that the offensive screen target is able to take a shot at the basket, dribble towards the basket, make a pass to another offensive player, possibly resulting in an assist, or perform some other action coming off of the screen.

The measurement logic 326G can similarly evaluate the performance of the offensive screener. As an example, the measurement logic 326G can determine the proximity of the offensive screener to the defender of the offensive screen target. The measurement logic 326G can determine the speed with which the offensive screener is able to set the screen, i.e., how fast does the screener obtains a stationary position, and the timing with which the screener sets the screen, i.e., the time between when the screener establishes the screen and the time when the defender arrives at the screener or contacts the screener. The measurement logic 326G can evaluate the general effectiveness of the offensive screener by tracking one or both of the responses of the offensive screen target and the defender and can also evaluate the effectiveness of the screener with respect to individual teammates and/or individual defenders. In particular, similar to the tracking of the defender described above, the measurement logic 326G can correlate the parameters tracked for a given offensive player to the screen defenders in order to track the offensive player's performance against certain defenders. As an example, the data provided by the measurement logic 326G may be used to determine how many times a particular offensive screener, offensive screen target, or a pair of offensive screener and offensive screen target caused a particular defender to go "under" a screen (or perform some other action).

In one embodiment, the measurement logic 326G can evaluate the effectiveness of the offensive screener by determining when the screener performed illegal screens. The measurement logic 326G can determine an illegal screen, sometimes referred to as a "moving" screen, based on whether the person was called for a foul. The measurement logic 326G can also determine illegal screens by evaluating the movements of the offensive screener regardless of whether a foul is called. The measurement logic 326G can determine an illegal screen by determining an extent to which the screener's hips or torso moves during the screen. The measurement logic 326G can also detect an illegal screen if the screener moves (e.g., "sticks out") a hip, knee, leg, elbow, etc., while in the stationary position to impede the progress of the defender in an impermissible way.

In one embodiment, the measurement logic 326G can use entropy modeling to determine when dribbling, transition and/or passing unpredictability, screening unpredictability and/or defender unpredictability is beneficial or detrimental to the player and/or team. For example, the measurement logic 326G may determine that dribbling, transition and/or passing unpredictability in a player is beneficial because the unpredictability of the player can make it more difficult for a defensive player to "scout" the movements of the player. However, the measurement logic 326G may determine that the dribbling, transition and/or passing unpredictability of a player is detrimental if the player does not have good control of the ball and generates a high number of turnovers or low number of scores or assists.

The improvement logic 326D can be used to analyze data about the person dribbling, passing, and/or shooting the ball and the defender of the person dribbling and/or passing the ball and recommend methods to improve either dribbling, passing, and/or shooting capability or defensive capability and to predict the amount of improvement in shooting, dribbling, and/or passing capability or defensive capability. The improvement logic 326D can use information from identification logic 326B, ball path logic 326A, defender motion logic 326C, balance logic 326I, measurement logic 326G, historical data 326F, body motion data 326H and/or evaluation data 322 to identify opportunities to improve the performance and capabilities of the person shooting, dribbling, and/or passing the ball and the defender(s) of the person shooting, dribbling, and/or passing the ball.

The improvement logic 326D can recommend particular practice routines, game drills and technique modifications depending on the specific performance area of requiring improvement. For example, if the measurement logic 326G indicates that a person is dribbling or passing the ball too high such that the ball is being stolen frequently by the defender, the improvement logic 326D can recommend one or more training or practice routines that require the person to dribble with a lower dribbling height or pass with a lower passing height. In another example, if the measurement logic 326G indicates that a defender often allows a dribbler to easily move past them on the way to the basket, the improvement logic 326D can recommend one or more training or practice routines that function to improve lateral defensive speed. In another example, if the measurement logic 326G indicates that a player often shoots the ball with an overly acute or overly obtuse angle, the improvement logic 326D can recommend one or more training or practice routines that function to improve shot angle.

The improvement logic 326D can map specific training or practice routines to performance areas. The improvement logic 326D can also map skill level designations (e.g., needs significant improvement) to the training or practice routines. Then, when the improvement logic 326D identifies a performance area that requires improvement, the improvement logic 326D can select a training or practice routine that has been mapped to the performance area requiring improvement. The improvement logic 326D can also narrow the selection of the training or practice routine from the mapping based on the assessment of the performance area by measurement logic 326G such that the selected training or practice routine better matches the actual skill level of the person.

In another embodiment, the improvement logic 326D may not be able to recommend a specific practice routine, game drill and technique modification because there may be multiple areas for which improved performance is appropriate and/or there may be multiple practice routines, game drills and technique modifications that can be used to address a specific area requiring improvement. For example, if a dribbler often has his or her shot blocked or tipped when taking a jump shot off the dribble, the problem might be an inability to get sufficient separation from the defender prior to picking up the dribble, or the problem might be a slow transition from dribble to shooting position, or the problem might be a slow shot release, or the problem might be a low shot release (as determined by measurement logic 326G based on the trajectory of the ball for the shot and the location of the shooter's body parts such as his/her hand and/or elbow), or the problem might be a combination of the above challenges. In another example, if a defender is often unable to disrupt a jump shot off the dribble (e.g., block or tip the jump shot) the problem might be an inability to limit the separation by the person dribbling the ball prior to the jump shot, or the problem might be a slow transition from dribbling defensive position to shooting defensive position, or the problem might be an off-center hand placement, or the problem might be a combination of the above challenges.

In situations where there is not a readily identifiable improvement regimen or multiple possible improvement regimens, the improvement logic 326D can select other players (e.g., other dribblers or defenders) who have previously shown similar dribbling or defensive performance with a subsequent improvement in performance (e.g., an improvement above a threshold amount) based on the dribbling and/or passing or defensive characteristics determined by the measurement logic 326G. The improvement logic 326D can store information on the training or practice routines completed by each person in historical data 326F. The improvement logic 326D can also store information of the person's performance level after completion of a training or practice routine and correlate the change in the player's performance level to the training or practice routine. The improvement logic 326D can review the selected players' practice techniques and improvement pace from historical data 326F to determine an optimal set of practice techniques for the person shooting, dribbling, and/or passing the ball or the defender being analyzed by the improvement logic 326D. In some embodiments, the improvement logic 326D can employ an artificial intelligence (AI) algorithm to use pattern recognition to assess the player's improvement and/or determine what recommendations to make to the player.

In another embodiment, the improvement logic 326D can use information from scoring logic 326E to determine the performance areas requiring the most improvement. The improvement logic 326D can review the historical data 326F for other players (e.g., other dribblers, passers, shooters, or defenders) who have a similar performance area requiring improvement and their corresponding practice techniques to determine an optimal set of practice techniques and predicted improvement for the area requiring improvement.

In one embodiment, the historical data 326F can include a large database of many players with many parameter types undergoing many practice and game dribbling regimens that can all be quantitatively measured. The improvement logic 326D can implement a methodology to maximize the improvement process in the most efficient way. For example, the improvement logic 326D may identify patterns across multiple quantitative dimensions in order to describe the specific problem and then prescribe the best approach for improvement.

Balance logic 326I can be used to measure and/or categorize the effectiveness of the player's balance on the performance of the player. For example, if the person dribbling the ball has good balance, the person can more effectively move left, right, back, forward, up, down, and with different dribbling techniques at different speeds, accelerations, heights, and angles. In one embodiment, balance logic 326I can use machine learning and/or artificial intelligence to measure and/or categorize a player's balance directly or indirectly.

In one embodiment, the balance logic 326I may directly assess the balance of player by determining and analyzing the center of mass of the player relative to the player's body. The balance logic 326I can determine a player has good balance if the player's center of mass does not rapidly change position in response to movements of the player. The balance logic 326I may also make indirect determinations regarding balance based on factors such as fluidity, rapid acceleration, foot placement and/or sluggishness. For example, if the balance logic 326I determines that a player has motions that are fluid, the balance logic 326I can determine that the player has better balance than a player whose motions are less fluid. Similarly, if the balance logic 326I determines that the player has rapid acceleration in one or more movements, the balance logic 326I can determine that the player has better balance. The balance logic 326I may also make a determination of balance regarding a player based on the foot placement of the player in response to a variety of different situations.

In addition, the balance logic 326I can also be used to determine the defender's ability to respond to particular situations. The defender's ability to respond to a situation is dependent on the actions of the person dribbling the ball. For example, if the person dribbling ball is attempting a shot with the ball (as determined by ball path logic 326A), the balance logic 326I can determine if a defender is in a low position or an extended position and thus determine the defender's ability to respond. For example, if the defender is already in an extended position as determined by balance logic 326I, the balance logic 326I may determine that defender does not have the desired muscle contraction available to respond appropriately to an up movement by the person dribbling the ball. Further, the balance logic 326I can also determine whether the defender's ability to respond is limited by the physical positions of other defenders or the physical position of the person dribbling and/or passing the ball.

In one embodiment, historical data 326F can include data obtained during a training sequence in a confined training space. An example of a confined training space is described by commonly-assigned U.S. Pat. No. 9,734,405, entitled "Systems and Methods for Monitoring Objects in Athletic Playing Spaces" and issued on Aug. 15, 2017, which is incorporated herein by reference. When historical data 326F is obtained during a training sequence, information pertaining to the movement of the ball in relation to the movement of the person can be more easily obtained since the camera(s) 116 and the depth sensors 112 can be placed at appropriate locations to reduce and possibly eliminate any occlusion of the ball or the person. The complete tracking of the ball and the person in the historical data 326F can permit the ball path logic 326A to more accurately determine probabilities of movement when the ball or person becomes occluded. The ball path logic 326A can determine the expected movement of the ball based on information in historical data 326F that is similar to the location and position of the dribbler, shooter, or passer when the ball becomes occluded.

Note that the object tracker 326 may be configured to manage data, such as body motion data 326H, camera data 324, or sensor data 320, based on one or more events detected by the object tracker 326. For example, to provide improved results in the analysis of the body motion data 326H by the body motion logic 326C or otherwise, it may be desirable for the body motion data 326H or for the camera data 324 or sensor data 320 from which the body motion data 326H may be derived to have a high resolution. It may also be desirable for the camera or sensor used to capture such data to have a high frame or capture rate. Using high resolution and/or high frame or capture rates may increase the amount of data that is captured and processed by the system, thereby increasing the processing burdens of the system. The object tracker 326 may be configured to identify certain events of interest (such as when a player is shooting, dribbling or passing) and to then manage the data captured by at least one camera or other sensor to retain data during the event but discard data at other times for which there is less interest. Thus, data captured during times of interest is fully retained for further processing while at least some data captured during other times is discarded without further analysis, thereby optimizing the amount of data that is processed.

To better illustrate the foregoing, assume for illustrative purposes that the system has one or more cameras 116 of relatively low resolution and/or frame rate, referred to hereafter as "low-resolution cameras," and at least one camera 116 of higher resolution and/or frame rate, referred to hereafter as "high-resolution camera." In such an embodiment, over a given time frame, the high-resolution camera may generate significantly more camera data 324 to be analyzed than a low-resolution camera.

As the high-resolution camera 116 generates camera data 324, referred to hereafter as "high-resolution camera data" for illustrative purposes, the high-resolution camera data may be temporarily buffered at least to provide sufficient time for the object tracker 326 to analyze the camera data 324 from low-resolution cameras 116, referred to hereafter as "low-resolution camera data" for illustrative purposes, to determine whether an event of interest is occurring. As an example, the object tracker 326 may analyze the low-resolution camera data 324 to determine when a player is performing an action of interest, such as taking a shot. Such determination may be based on the player's body motions and/or trajectory of the ball. For example, the object tracker 326 may determine that a shot is taken at the time that the ball leaves the player's hands on a trajectory toward a basketball hoop.

Upon identifying an occurrence of an event of interest, such as a player taking a shot, the object tracker 326 may then control the buffered high-resolution camera data 324 in an effort to optimize processing of such data 324. As an example, the object tracker 326 may identify a portion of the high-resolution data 324 captured within a certain time frame of the identified event of interest (such as a few seconds prior to the event and a few seconds after the event). The object tracker 326 may then retain the identified portion of the high-resolution data 324 for further processing (e.g., analysis of player performance) and discard the other portions of the high-resolution data 324 being buffered such that processing resources are not wasted on processing high-resolution data 324 captured during times when no event of interest is occurring. For the high-resolution data 324 captured during the event of interest and, thus, retained by the object tracker 326 for further processing (e.g., analysis of player performance), such data 324 may be further analyzed by the body motion logic 326C, the measurement logic 326G or otherwise to determine useful information, such as the body motion data 326H or other information that may be used to assess the performance of the player during the event of interest.

In addition to selectively discarding portions of high-resolution data 324 based on when an event of interest is occurring, the object tracker 326 may also be configured to discard at least some high-resolution data 324 based on where the event of interest is occurring. For example, the trajectory of a ball being shot by a player may be analyzed to determine the origin of the shot (i.e., the location on the court where the ball separates from the player's hands during the shot). Based on such location of the event, the object tracker 326 may cull each frame of the retained high-resolution data to remove portions of the frame that do not include an image of the player taking the shot or the ball being shot. For example, at the location of the shot, the object tracker 326 may be configured to identify the shooter in the image and to define a bounding box around the shooter such that the shooter is entirely encompassed by the bounding box.

Figure 30:
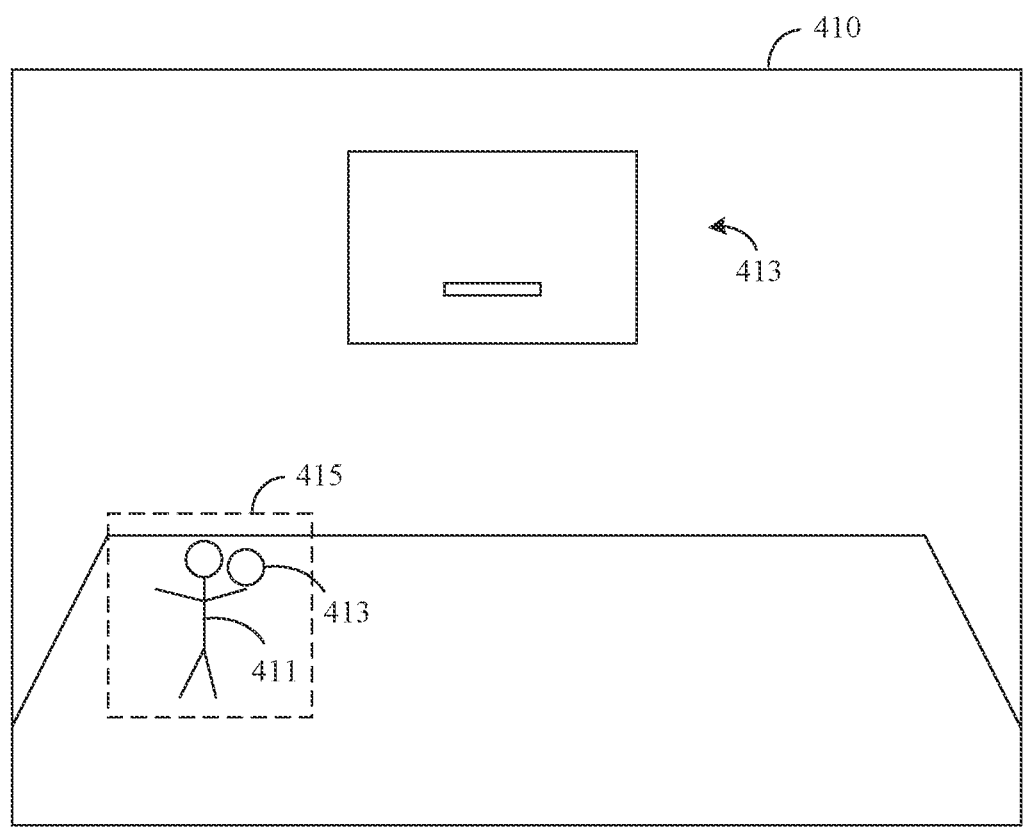
FIG. 30 illustrates an exemplary image frame captured by an image sensor.

As an example, FIG. 30 depicts an image frame 410 in which a shooter 411 is shooting a ball 412 toward a goal 413. The object tracker 326 may define a bounding box 415 around the shooter 411 as shown. The bounding box 415 may be defined such that it has a size that barely encompasses the object of interest (e.g., the shooter 411 in the current example). As an example, the object tracker 326 (or other component performing the analysis) may detect the shooter 411 in the image frame 410 and define the boundaries of the bounding box 415 such that the size of the bounding box 415 is as small as possible, within a desired tolerance, but still encompasses each pixel of the shooter 411 or other object of interest. In other embodiments, other techniques for bounding the object of interest with a bounding box 415 are possible.

After defining the bounding box 415, the object tracker 326 may cull the frame to remove the portions of the frame outside of the bounding box 415, which may then be analyzed to assess the performance of the shooter in shooting the ball. Thus, noting that a similar process may be performed on other frames captured during the event of interest, a significant amount of the high-resolution data 324 captured during the event of interest (i.e., shot in this example) may be removed in order to reduce the amount of data processed by the body motion logic 326C, measurement logic 326G, or other component of the system. In other embodiments, other techniques for determining which portions of each frame to cull may be used in order to reduce the amount of data that is processed.

Figure 5:
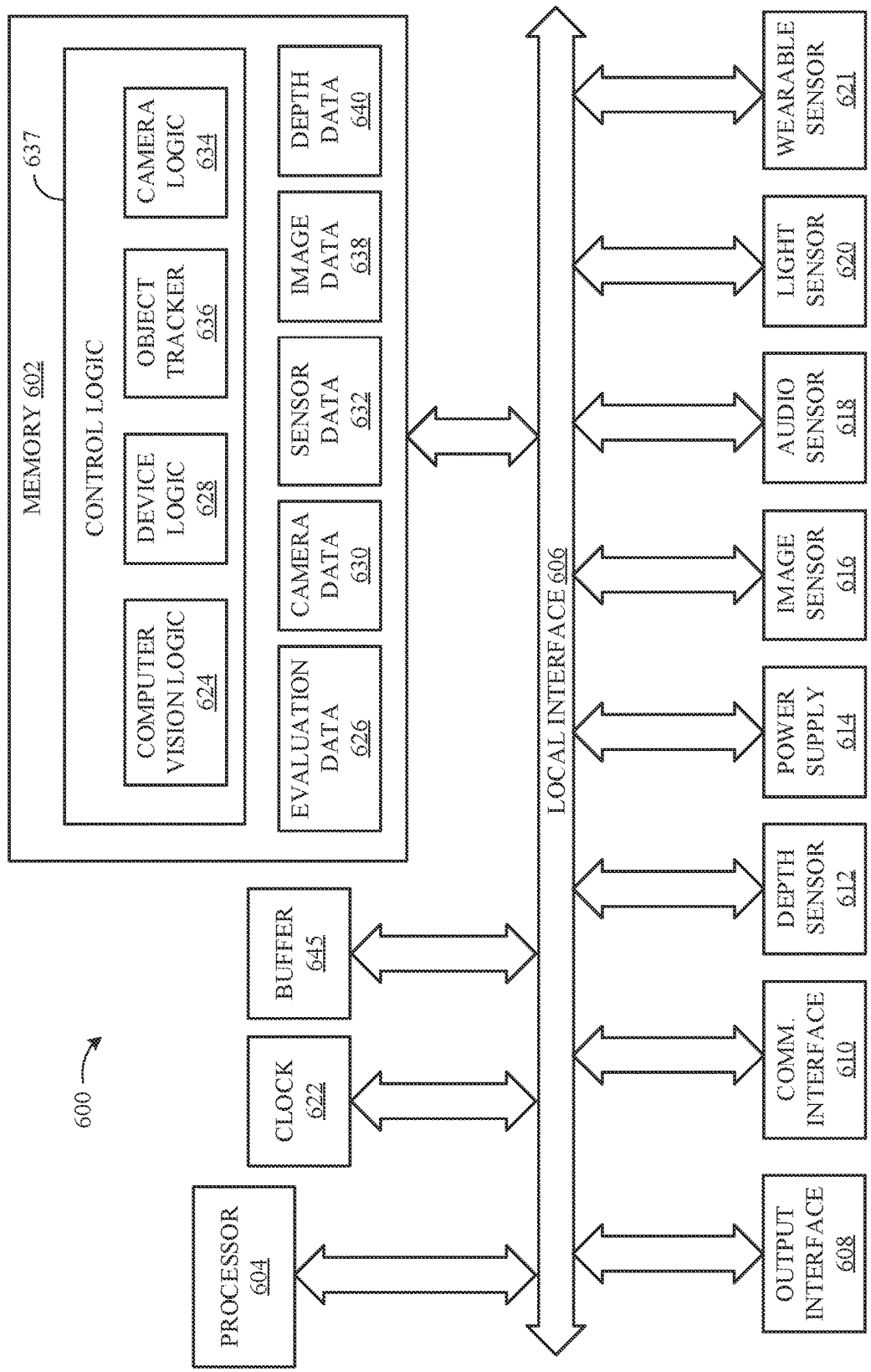
FIG. 5 is a block diagram of an embodiment of a tracking device used in the tracking system of FIG. 1.

Note that there are various locations at which the buffering of the high-resolution data 324 may occur. As an example, FIG. 5 shows a tracking device 600 that may be used to capture the high-resolution data via an image sensor 616. The sensor data (e.g., image data) from the image sensor 616 may temporarily buffered by a buffer 645. The amount of time that the image date remains buffered by the buffer 845 may be sufficient for low-resolution data captured by another image sensor (e.g., by another tracking device 600) to be analyzed, as described above, so that a determination may be made about which portions of the buffered sensor data is to be retained for further processing. As an example, the object tracker 326 at the server 300 (or other location) may send instructions indicating which portions of the sensor data is to be retained, and the control logic 637 may be configured to extract from the buffer 645 the portions of the sensor data to be retained for further processing. As an example, the extracted sensor data may be sent to the server 300 or other component of the system for further processing as described in more detail herein. Portions of the buffered sensor data not extracted from the buffer 645 may be discarded (e.g., eventually overwritten by new sensor data coming from the image sensor 616).

As noted above, the buffer 645 may reside at other locations in other embodiments. As an example, buffer 645 may be located in the same memory 602 as the control logic 637 used to extract the portion of the sensor data to be retained. The buffer 645 may be located at the server 300, and the sensor data captured by the image sensor 616 (or other sensor) may be sent to the server 300 and buffered by the buffer 645. Further, the portions of the sensor data to be retained for further processing may be extracted from the buffer 645, as described above. Having the buffer 645 (from which sensor data is extracted for further processing) located at the device 600 used to capture such data has the advantage of reducing the amount of sensor data that is communicated through the network 650. However, as described above, it is possible for the sensor data to be transmitted through the network 650 before a decision is made as to which portions are to be retained for analysis of the player's performance.

Note that the techniques for selectively retaining and discarding data are described in the context of high-resolution data, but such techniques may be used on low-resolution data, such as the low-resolution camera data 324 described above.

FIG. 5 is a block diagram of an embodiment of tracking device(s) 600 used in the tracking system of FIG. 1. In some embodiments, tracking device(s) 600 can be an integrated device that is capable of performing all of the functions of user device(s) 100 and server 300. For example, in the game of basketball, tracking device 600 can be implemented as a "smart basketball hoop" capable of tracking basketball type games over dispersed courts. In some examples, the tracking device 600 can be a smart football post, smart soccer goal, smart tennis net, smart hockey goal, etc., for facilitating tracking of players over dispersed locations. It should be understood that while the examples referenced herein refer to basketball games over dispersed courts, the same teachings can be applied to any other sporting game played on dispersed playing surfaces or courts. Although system 10 is illustrated with two tracking device(s), tracking device 600A and tracking device 600B, it should be understood that there can be any number of tracking devices within system 10 (e.g., the system can include tracking device 600A, tracking device 600B, . . . tracking device 600N). Each tracking device 600 can be correlated to a dispersed court within a dispersed game being enabled by system 10. In some embodiments, tracking device(s) can be deployed in tandem with user device(s) 100 and/or server 300.

In the dispersed basketball games, (e.g., dispersed games of horse, knockout, basketball training sessions using "virtual defenders" located on remote playing courts with respect to another player, etc.), a tracking device 600 can be placed on each dispersed court to monitor the dispersed court, communicate with another tracking device 600 placed on another dispersed court, track the motion of players and at least one ball on each dispersed court, and monitor passing, dribbling, transitions from dribbling to passing, shooting, and transitions from dribbling to shooting of each player on each dispersed court, etc. Accordingly, each tracking device 600 can include at least one processor 604 in operative communication with memory 602 over local interface 606. Each tracking device 600 can also include output interface 608, communication interface 610, depth sensor 612, power supply 614, image sensor 616, audio sensor 618, light sensor 620, wearable sensor 621, and clock 622.

As an example, the processor 604 may include a central processing unit (CPU) a digital signal processor (DSP), a graphic processing unit (GPU) and/or a quantum processing unit (QPU). The processor 604 can communicate to and drive the other elements within the tracking device 600 via a local interface 606, which can include at least one bus. The user device 600 can have a clock 622, which can be used to track time and synchronize operations with other components of system 10, including user device(s) 100, connected devices 200, server 300, viewing devices 400, tracking devices 600, and/or training devices 700.

The tracking device 600 can have a communication interface 610. The communication interface 610 can include a radio frequency radio (RF) radio or other device for communicating wirelessly with other components of system 10. The power supply 614 can be an internal battery, such as a lithium-ion battery or nickel cadmium battery. In some embodiments, power supply 614 can have an interface that allows it to plug into or otherwise interface with an external component, such as a wall outlet or battery, and receive electrical power from the external component.

As shown in FIG. 5, the tracking device 600 can also include an image sensor 616 which can include some or all of the functionality as described with respect to camera 116, a depth sensor 612 which can include some or all of the functionality as described with respect to depth sensor 112, an audio sensor 618 which can include some or all of the functionality as described with respect to audio sensor 118, and a light sensor 620 which can include some or all of the functionality as described with respect to light sensor 114. The tracking device 600 can further include a wearable sensor 621 which can include some or all of the functionality as described with respect to wearable sensor 119. Therefore, a full description of these components is omitted for brevity.

Memory 602 can include non-transitory executable instructions stored thereon including computer vision logic 624 which can include some or all of the functionality as described with respect to computer vision logic 316, evaluation data 626 which can include some or all of the functionality as described with respect to evaluation data 322, device logic 628 which can include some or all of the functionality as described with respect to server logic 318, camera data 630 which can include some or all of the functionality as described with respect to camera data 324, sensor data 632 which can include some or all of the functionality as described with respect to sensor data 320, camera logic 634 which can include some or all of the functionality as described with respect to camera logic 122, object tracker 636 which can include some or all of the functionality as described with respect to object tracker 326, image data 638 which can include some or all of the functionality as described with respect to camera data 324 and/or image data 126, and depth data 640 which can include some or all of the functionality as described with respect to depth data 124 and/or sensor data 320. Therefore, a full description of these components is omitted for brevity. The device logic 628, the computer vision logic 624, the object tracker 636, and the camera logic 534 will be collectively referred to herein as the "control logic" 637 of the tracking device 600, though the control logic 637 can have other configurations in other embodiments.

During events of interests, movement of certain body parts may have a relatively high degree of importance in assessing the performance of the player. As an example, in shooting or dribbling, the placement of the player's fingers and movement of his or her fingers may be used in assessing the player's performance. Thus, precisely and accurately knowing the position and/or movement of each of one or more fingers during a certain event may be highly desirable. However, there may be difficulties in determining the position of a player's fingers in at least some frames of image data for various reasons.

As an example, since a finger is relatively small body part that can be located relatively far from a camera positioned outside of the court boundaries, the resolution of a captured image of the player's finger may be poor, particularly if the image is captured by a camera with relatively low resolution. In addition, as a player is performing certain events of interest, such as shooting, dribbling or passing, at least some of the player's fingers may be occluded by the ball or other objects from the viewpoint of a camera 116.

In some embodiments, at least one sensor, such as a wearable sensor 621 (e.g., an accelerometer or other type of motion sensor), may be configured to sense motion of a player's finger, and the data from such sensor 621 may then be used to determine the finger's position for at least some frames of image data. In some cases, the wearable sensor 621 may be attached to or positioned on the player's finger. The wearable sensor 621 may be implemented with an accelerometer that is positioned on a finger ring worn on the player's finger or a false fingernail that is positioned on (e.g., glued to) the player's fingernail. In other examples, the wearable sensor 621 may be attached (e.g., glued) to the skin of the player's finger or positioned on a glove worn on the player's hand. The wearable sensor 621 may be attached to a transmitter that is configured to wirelessly transmit sensor data from the wearable sensor 621 to the network 650 or other system component, such as user device 100.

Ideally, the wearable sensor 621, including the components that are used to attach the wearable sensor 621 to the player's finger, are unobtrusive in that they do not significantly affect the player's feel of the ball, particularly at the player's fingertips and palm of his or her hand. As an example, a finger ring or false fingernail are not positioned between the ball and the player's fingertips or palm as the ball is being shot, dribbled, or passed by the player. If a glove is used, the glove may be opened such that it does not cover the player's palm and fingertips (e.g., only covers the back of the player's hand). Various other types of sensors and devices for attaching sensors to the player's fingers may be used in other embodiments.

During an event of interest, such as a shot, dribble, or pass, data from the wearable sensor 621 may be used by the object tracker 326 (or other component of the system) to determine the position of the user's finger and track the position over time and thus movement of the finger during the event. As an example, if the wearable sensor 621 is an accelerometer, conventional techniques exist for converting accelerometer data into position changes so that a monitored object can be tracked over time. Such techniques may be employed by the object tracker 621 to track the position and movement of the player's finger during an event.

Note that the position of the player's finger may be recalibrated from time-to-time using a different sensor, such as a camera 116. For example, the object tracker 326 may be aware of the position of the player's finger, based on the camera data 324, at a point when the finger is visible to a camera 116, and then track the player's finger for at least a short time thereafter using data from the wearable sensor 621. As an example, the player's finger may be visible just prior to taking a shot and then become occluded from a camera's view as the player is holding the ball to take a shot. Thus, the player's finger may be occluded only for a short amount of time during a shot, such as a few seconds, so that tracking of the player's finger based solely on wearable sensor 621 for a short time when his or finger is occluded can be performed with a high degree of accuracy.

In any event, the body motion logic 326C (or other component of the system) may be configured to analyze the position and/or movement of the player's finger based on the sensor data from the wearable sensor 621 (or other type of sensor attached to or positioned on the player's finger) and assess the player's performance during an event based on such information. As an example, for a basketball shot, the body motion logic 326C may determine the velocity or degree of rotation of the player's fingertip and use such information as a factor to score of the player's performance. In some embodiments, the object tracker 326 may compare the player's finger location to the location of the ball. For example, for a basketball shot, the object tracker 326 may determine whether or an extent to which the ball rolls off the player's fingertip during the shot. In other embodiments, yet information may be determined from the sensor data.

Note that similar techniques may be used to monitor and track body parts other than fingers. As an example, a wearable sensor 621 (or other type of sensor) may be attached to or position on the player's elbow, arm, or back of the player's hand to determine how or an extent to which any of these body parts move during an event of interest. A wearable sensor 621 (or other type of sensor) may be positioned on or attached to a foot or shoe of the player to determine how high the player jumps during a basketball shot. Yet other locations and types of sensors are possible in other embodiments.

Figure 29:
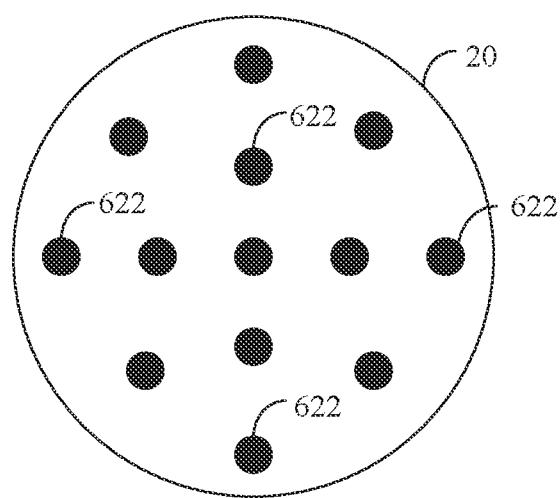
FIG. 29 illustrates an exemplary basketball having a plurality of ball sensors on a surface of the basketball.

In some embodiments, tracking device 600 may include one or more ball sensors 622 (FIG. 29) that are coupled to the ball 20. Such ball sensors 622 may be configured to sense the location of the player's fingers on the ball 20 and/or the pressure applied by the player's fingers or hand to the ball 20. Such ball sensors 622 may be coupled to a wireless transmitter (not shown in FIG. 29) that is configured to wirelessly transmit sensor data from the ball sensors 622 to a tracking device 600, user device 100, or other component of the system so that the information from the ball sensors 622 may be used by the object tracker 326 or other component to track the player's performance as described herein. Note that FIG. 29 shows just a few sensors 629 for simplicity of illustration, and in other embodiments, the ball 20 may have many more sensors 622, such as several hundred or thousand sensors to provide better resolution.

If desired, the sensors 622 may be coupled to a one or more processors (not shown in FIG. 29) embedded within the ball 20 that process the sensor data from the sensors 622. As an example, based on the sensor data, at least one processor may determine the location of each respective finger and/or the pressure applied by each respective finger to the ball 20 and then transmit such information via the wireless transmitter, thereby reducing the amount of information that is wirelessly transmitted from the ball. That is, rather the wirelessly transmitting raw sensor data, the wireless transmitter may transmit processed data, such as the locations of finger touches and the pressure applied for each such finger touch.

In some embodiments, each ball sensor 622 is a pressure sensor that detects a pressure applied to the ball 20 at the location of the sensor 622 by external objects, such as fingers. A processor may be configured to identify finger touches by analyzing the sensor data from the sensor 622 for characteristics consistent with a finger touch (e.g., a signature of a finger touch). For example, a finger touch can be distinguished from touches of other objects, such as the floor when the ball 20 is dribbled, based on various factors. In this regard, the width of finger touch is expected to be much less than the width of a floor touch during a dribble. In addition, the pressure applied by a finger is likely in a range different than the pressure applied by the floor to the ball 20 during a dribble. Thus, based on the characteristics measured by the sensors 622, it is possible to distinguish the type of object likely making contact with the ball 20, thereby enabling finger touches to be identified and tracked over time.

Figure 6:
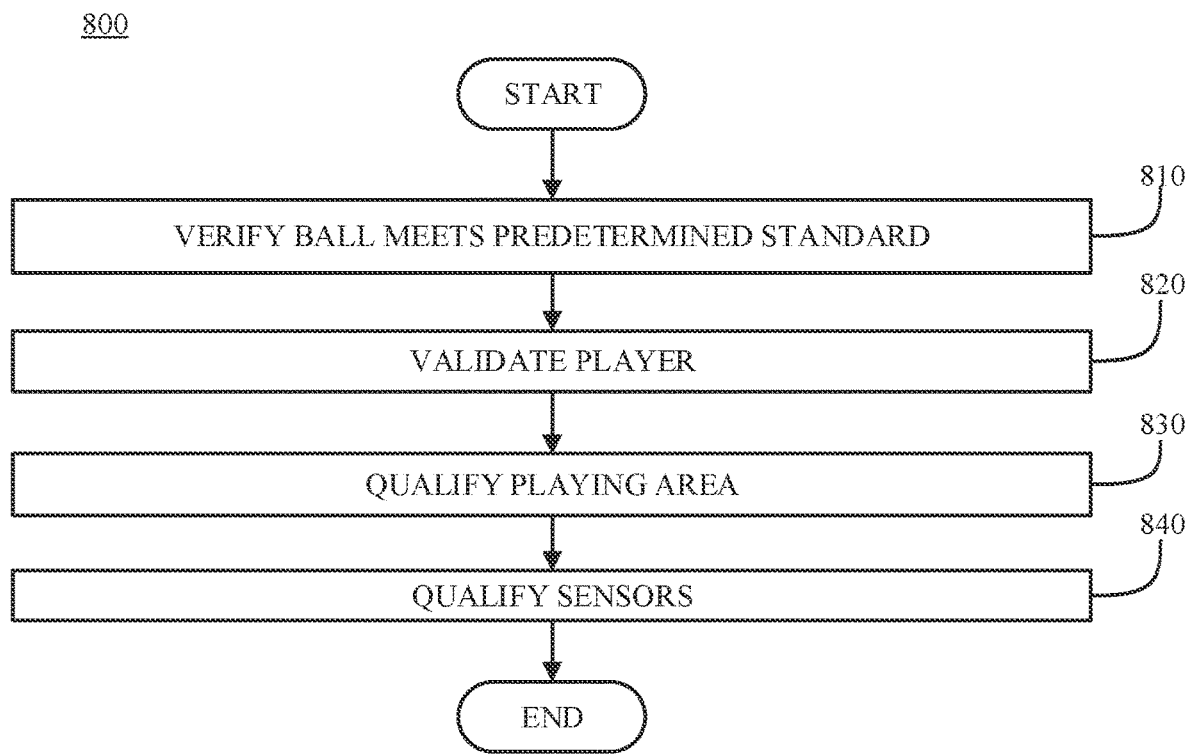
FIG. 6 is a flow diagram of an embodiment of validating a ball and player using the dispersed game tracking system.

FIG. 6 depicts method 800 for validating a ball and player using the dispersed game tracking system 10. For illustrative purposes, it will be assumed hereafter that the server 300 performs verification of game features, such as players, balls, and equipment, but it should be emphasized that other devices, such as user devices 100 for example, may perform such verifications in other embodiments.

Referring to FIG. 6, the steps disclosed specifically refer to a basketball game being enabled by dispersed game tracking system 10, although it should be understood that similar steps can be accomplished to validate a ball and player for other types of dispersed sporting games. In block 810, the method can include verifying that a ball meets a predetermined standard. For example, game balls that do not meet the appropriate size, inflation level, material, etc. may give an unfair advantage to a particular player participating in a dispersed shooting game such as basketball, knockout, and/or horse. To verify the ball meets the predetermined standard, a participating player may hold the ball at a certain heigh (e.g., shoulder height) and let it drop using only the force of gravity. As an example, control logic 327 may compare image data and camera data collected by one of user device(s) 100 or tracking device 600 to stored data (e.g., evaluation data 626, evaluation data 322, and/or evaluation data 138) to determine whether a game ball is properly inflated. In another example, the control logic 327 can determine the bounce height of the ball and thus check whether the ball is appropriately inflated without comparing to evaluation data. Control logic 327 can determine the position of a player's arm, wrist, and elbow to determine whether the player has provided acceleration to the ball and may fail to qualify a ball that is dropped under inappropriate acceleratory conditions or take into account the acceleratory conditions.

Figure 17:
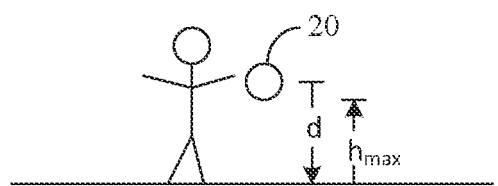
FIG. 17 depicts a user dropping a ball during an exemplary ball validation process.

Note that in some embodiments, the system 10 is configured to take into account imperfections in the test being conducted. For example, even though a user may be directed to drop a ball 20 from a certain heigh (e.g., shoulder height), the ball 20 may be dropped from at least slightly different heights by some users. As an example, differences in heights of users may result in discrepancies in the heights for which balls 20 under test are dropped. In addition, the control logic 327 performing the test may be configured to measure or otherwise determine, based on ball trajectory data, how far the ball 20 travels before contacting the ground. For example, referring to FIG. 17, to determine such distance, the control logic 327 may measure the distance (d) that the ball travels from the height at which it is dropped (e.g., the ball begins accelerating downward from a location of rest) until its velocity reverses from a downward direction to an upward direction indicating that the ball 20 has contacted the ground or floor after being dropped. Based on such distance, the control logic 327 may determine a range of maximum heights (relative to the ground or floor from which the ball 20 bounces) to which the ball 20 should bounce if it is in conformance with the standard. The control logic 327 may then determine whether the ball 20 bounces to a maximum height (hmax) within such range during the bounce. If so, the control logic 327 may determine that the ball is in conformance with the standard and provide an indication of such determination. If not, the control logic 327 may determine that the ball 20 is not in conformance with the standard and provide an indication of such determination. In response, remedial action may be taken.

As an example, the user with the ball 20 not conformance with such standard may acquire another ball or make changes to the ball 20 (e.g., inflate or deflate) the ball 20 such that it is tested to be in conformance. For example, the control logic 327 may be configured to communicate a message to the user device 100 of the user with the ball 20 not in conformance to provide notice to the user. Such message may include a suggestion on how to bring the ball 20 into compliance. As an example, based on the difference between the measured bounce height of the ball 20 (i.e., the height that the ball 20 bounces off of the ground) and the expected range for such height, control logic 327 may estimate an amount of air to be added or removed from the ball 20 to bring it into compliance and may indicate the estimated amount of air to be added or removed.

As noted above, in determining the expected range for the bounce height, the control logic 327 may take into account various factors, such as the actual height that the ball 20 is dropped or released by the user, as measured by trajectory data captured by the system 10. If the user applies a force to the ball 20 when dropping it (e.g., pushes the ball downward), the control logic 327 may measure the acceleration applied to the ball 20 and adjust the expected bounce height range based on the measured acceleration. In this regard, a ball 20 that is released or dropped from a certain height, is expected to bounce higher for a greater amount of downward acceleration applied to the ball 20. The control logic 327 may be configured to increase the range of expected bounce height based on the measured acceleration. In other embodiments, other adjustments to the range for the expected bounce height or other reference parameter may be made based on the measured trajectory of the ball 20 or the motion of the user's body during the test.

In some embodiments, the system 10 may determine whether a given player is using a correct ball size (e.g., width or diameter). For example, based on the images captured by a user device 100 or a tracking device 600, the control logic 327 may measure a size (e.g., width or diameter) of a player's ball 20. Note that such measurement may be based on the depth of the ball 20 from the camera used to capture such images. As noted herein, such cameras may include a depth sensor that permits the depth of each object in an image to determined. As known in the art, an object further from a camera generally appears smaller in an image captured by the camera. The control logic 327 may be configured to convert, based on the measured depth of the ball 20, the diameter (or other dimension of the ball 20) of the ball 20 in the image to the ball's real-world diameter. The control logic 327 may then compare the measured diameter to predefined range to determine whether the diameter is within the predefined range. If so, the control logic 327 determines the size of the ball 20 to conform to a predefined standard within a certain margin of error. If not, the control logic 327 determines that the size of the ball 20 does not conform to the predefined standard.

If the monitored ball features (e.g., size and inflation) are determined to conform with a predefined standard within a certain margin of error, the server 300 or other device of the system 10 may provide a message indicating that the ball features are in conformance. Such information may be displayed or otherwise provided to the players and/or a certain user or set of users, such as a game official. If the monitored ball features are determined not to conform with the standard, the server 300 or other device of the system 10 may provide a message indicating that the ball features are not in conformance. Such information may also indicate the reason for the non-conformance. For example, if the ball 20 is determined to be over or under inflated relative to the acceptable range for the standard, the server 300 or other device of the system 10 may indicate the amount that the ball 20 is over or under inflated. Such information may be useful for a user to make a determination whether the game should continue despite the non-conformance, whether the non-conformance should be addressed prior to gameplay, or whether one or more players should be disqualified from competing in the game.

In block 820, the method can include validating a player. To validate a player, a player's identity may be ascertained. For example, the player may use user device 100 to provide certain identifying characteristics to the system 10, such as registering his/her name and creating an account that can be associated with player characteristics identified by the system 10. For example, upon first use, a player (e.g., a player associated with user device 100A) using system 10 may use camera 116 of user device 100A to provide an image of his/her face to system 10 so that control logic 327 can identify the player based on images captured as camera data 630, 324 and/or image data 126. In some embodiments, the player's facial characteristics can be captured by image sensor 616 of tracking device 600 in lieu of camera 116. In some embodiments, the player may be asked to perform a designated shot or series of shots to generate data that may be stored by control logic 327 so that the system 10 can identify the identity of a particular player in captured image data 126, 638 and/or camera data 324 during a dispersed game. In some embodiments, control logic 327 subsequently to the designated shot or series of shot can be used to specifically identify the player based upon the data generated from the designated shot or series of shots. In this regard, a person's shooting characteristics, including body motions and/or trajectory information, may be sufficiently unique so that the player can be distinguished from other players who have different shooting characteristics. For example, two players who look similar may nevertheless have very different skill levels and, hence, shooting characteristics (e.g., release angle, release speed, entry angle, etc.) such that the system 10 after monitoring just a few shots can determine that a given player is not the same one who generated a set of historical data.

Specifically, to facilitate identification of a first player in block 820, the system 10 may be used to monitor the first player prior to the current game in order generate historical data indicative of the player's shooting characteristics over a number of shots. Such historical data may thereafter be used to confirm the identity of this player. In this regard, the system 10 may be configured to monitor a user purporting to be the same player while the he or she takes some number of shots. If the shooting characteristics (e.g., average release height, release velocity, entry angle, hoop depth, etc.) are sufficiently different than what is indicated by the player's historical data, then the system 10 may be configured to determine that user taking the shots is not the same player who is associated with the historical data. In such a case, the user is not confirmed to be the player associated with the historical data. In some embodiments, the system 10 may use an AI algorithm to identify the player based on how the player's shooting characteristics match the player's historical shooting characteristics.

In some embodiments, the system 10 can confirm a player's identity based on one or more of several factors. For example, the system 10 may store characteristics of the player based on the designated shot or series of shots taken by the player, and such characteristics may include shooting characteristics, such as shooting style, body motions, and ball trajectory information, as well as non-shooting characteristics, such as player height, facial features, or other bodily features, such as hair color, height or skin tone. In one embodiment, the server 300 is configured to determine a score that is weighted based on several identity factors, as described above. If the score is greater than a predefined threshold, then the player's identity may be confirmed.

As an example, the control logic 327 may be configured to store data, referred to herein as "user data," indicating various characteristics of a player. Such user data may be correlated with a player identifier that uniquely identifies the player relative to other players. The user data for a player may include information about the player's bodily features, such as height, skin tone, and hair color, that are observable from a captured image of the player. In some cases, the user data may include an image of the user that can be compared to a captured image of the user at gametime for verifying his or her identity. The user data may also include information indicative of past shot performances of the user, such as an average or range of certain trajectory parameters (e.g., entry angle) that characterize the previous shots, as described above. When a player wishes to be verified for participation in a game, the player may provide his or her player identifier, which is used by the control logic 327 to look up his or her user data. The control logic 327 then compares the user data to information from images of the player and/or the player's shots captured by a user device 100 or a tracking device 600. As an example, the control logic 327 may assess whether the player's height, skin tone, or hair color in a captured image matches such parameters in the user data. For example, the control logic 327 may measure the player's real-world height (based on the depth of the player in the captured image, as described above for assessing the size of the ball 20) and compare the measured height to the stored height to determine whether they match. The control logic 327 may determine the user's hair color or skin tone and compare such parameters to the user data to determine if there is match. In assessing the user's skin tone or hair color, the control logic 327 may compare a captured image of the user to an image stored in the user data. In other examples, facial recognition or fingerprint authentication may be used to assess the identity of the player.

In addition, the user may take one or more shots to a hoop, and the control logic 327 based on sensor data (e.g., captured images) may assess parameters (e.g., entry angle, release height, etc.) that characterize the one or more shots and compare such parameters to the user data to determine whether the player's shot performance is similar to the shot performance indicated by the user data, as described in more detail below. In this regard, such shot performances may be used as a signature that can be used to distinguish the player from other users who may be attempting to masquerade as the player. For example, it is likely that a different user will exhibit different shot characteristics relative to the player whose identity is being confirmed. Thus, by assessing a user's shot characteristics, it is possible to determine whether the user is likely the same player who generated the shot characteristics indicated by the user data. In other examples, yet other techniques may be used to verity a player's identity.

Note that the identification of the player may be multifactor algorithm in which the control logic 327 uses one or more of the factors described herein (e.g., shot characteristics, hair color, height, etc.) to calculate a score that can be compared to a predefined threshold. If the score exceeds the threshold, the user may be authenticated. Otherwise, the system 10 may indicate that the user is not authenticated.

In some examples, block 820 and block 810 can be completed concurrently by having a respective player perform a designated shot or series of shots, during which time the system 10 can capture images using camera 116, image sensor 618, and/or depth sensors 112, 612 to capture player features including player height and facial features, and shot characteristics such as shooting style, body motions, ball trajectory data, and/or shooting results. For example, ball size and bounce height can be evaluated for block 810 based on the shots taken by the user for the purpose of validating the player in block 820.

In block 830, the method can include qualifying the playing area/dispersed court. In some examples, qualifying the playing area can include verifying features of the basketball goal, such as the hoop size, hoop height, hoop tilt, backboard size, etc. using camera 116, image sensor 618, and/or depth sensors 112, 612. For example, verifying the features of the basketball goal can include determining characteristics of the basketball goal including hoop size, hoop height, hoop tilt, backboard size, etc. and comparing these characteristics to predetermined standards previously stored on the system (e.g., information previously stored on analytics database 500, server 300, user device 100, and/or tracking device 600A). In some examples, when the tracking device 600 is implemented as an integrated basketball goal, block 830 may be omitted because tracking device 600 can be constructed to have the standard characteristics of a basketball goal, and thus, may not need to be qualified by the system 10. Other characteristics of the dispersed court can also be qualified by the system. For example, court characteristics, such as the presence and positioning of appropriate court markings (e.g., three-point line, half court line, free throw line, etc.) can be determined using the camera 116, image sensor 618, and/or depth sensors 112, 612. The system may also qualify the court by determining that the dispersed court surface is sufficiently flat based on generated image data 126, 638, camera data 630, 324, depth data 640, 124, etc.

If the monitored court features are determined to conform with a predefined standard within a certain margin of error, the server 300 or other device of the system 10 may provide an output a message indicating that the court features are in conformance. Such information may be displayed or otherwise provided to the players and/or a certain user or set of users, such as a game official. If the monitored court features are determined not to conform with the standard, the server 300 or other device of the system 10 may provide a message indicating that the court features are not in conformance. Such information may also indicate the reason for the non-conformance. For example, if the real-world hoop size (which may be calculated based on the measured size of the hoop 25 in a captured image and measured depth of the hoop 25 from the camera that captured the image) is determined to be larger or smaller than the acceptable range for the standard, the server 300 may indicate that the size of the hoop is non-standard. Such message may include the acceptable range for the standard as well as the measured hoop size (e.g., diameter). Such information may be useful for a user to make a determination whether the game should continue despite the non-conformance, whether the non-conformance should be addressed prior to gameplay, or whether one or more players should be disqualified from competing in the game.

In block 840, the method can include qualifying one or more sensors of the system 10. Qualifying the sensors can include determining the x, y, z coordinates in 3D space of each sensor located on a dispersed court as previously described with respect to camera 116. This process can be repeated for any user device 100 being used to monitor a respective dispersed court. A similar process can be used to qualify the sensors of tracking device 600 when tracking device 600 is used to monitor a respective dispersed court. In some examples, qualifying the sensors can include measuring the ambient light using light sensor 114, 620 to determine whether the dispersed court has sufficient lighting in order to track players and the ball around the dispersed court, and/or determine whether a basket has been made by tracking the trajectory of the ball through the basketball goal. In some examples, in order to qualify the sensors, system 10 may transmit to each participating player an indication (e.g., via a notification to a respective user device 100, connected device 200, and/or tracking device 600) to shoot a designated shot or series of shots (e.g., a shot from the left, a shot from the right, a shot of the backboard, a hook shot, a layup, a floater, a long-distance shot, etc.) in order to qualify that the sensors are able to track the player and the ball under a variety of circumstances over the dispersed court.

As an example, the control logic 327 of the server 300 in some embodiments may evaluate whether one or more sensors are qualified for operation in gameplay. In this regard, the control logic 327 may transmit to a user device 100 a message instructing the user to perform a certain action at a certain location on the court, such as take a jump shot from a free throw line. The user may then perform such action while being monitored by a sensor of a tracking device 600 or user device 100. Based on sensor data from such sensor, the server 300 may determine whether the sensor has sensed the instructed action. For example, for the action of taking a jump shot at a free throw line, the control logic 327 may determine when the user is sensed to have taken a shot toward a hoop. As an example, the trajectory of the basketball may be analyzed to determine when it has a trajectory that is consistent with a basketball shot toward a hoop. The user's location at the time of the shot may be analyzed to determine whether the user is located at the predetermined location of the shot (e.g., at the free throw line) within a certain margin of error. The control logic 327 may also analyze the sensor data to classify the type of shot taken (e.g., a jump shot) and then determine if the type of shot matches the type of shot instructed by the control logic 327. If the shot types match and if the user is determined to be at the predetermined location within a suitable margin of error, the control logic 327 may determine that the sensor is qualified for use in gameplay. The control logic 327 may perform a similar process for other sensors and provide an output (e.g., send a message to a user) to indicate whether the control logic 327 is unable to qualify any of the sensors, thereby enabling a user to determine whether any action should be taken, such as whether a sensor should be replaced or adjusted or whether gameplay should commence. In other embodiments, other processes and techniques for qualifying sensors are possible.

Figure 7A:
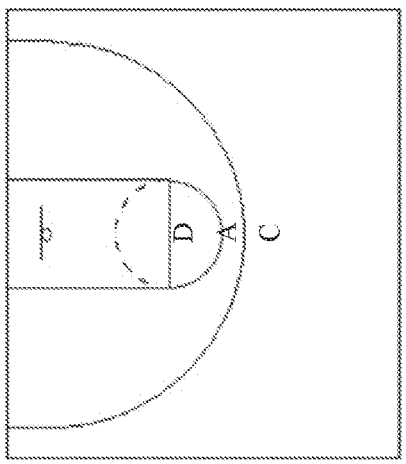
FIGS. 7A-7E illustrate exemplary basketball courts on which basketball games may be played.

FIGS. 7A-7E illustrate an example of the basketball shooting game of knockout, which may be implemented using dispersed game tracking system 10. FIGS. 7A-7E show an example game of knockout with four players. For the purpose of illustration all four players are shown on a single court surface, but as will be understood, each of these players can be located remotely from each other. In the basketball game of knockout, a first player (player A) and a second player (player B) begin shooting from the free throw line at an indicated time to begin the game, while the remaining players (players C and D) await their turn, as shown in FIG. 7A. The object of the game for each player is to make a basket before the other active player. If the first player makes a basket before the second player, the first player remains in the game, moves to the back of the line and passes the ball to the subsequent player (e.g., player C). If the second player makes a basket before the first player makes a basket, the first player is "knocked out" of the game. After the first free throw shot, each player is allowed to take subsequent shots. In some examples, the subsequent shots do not have to be free-throw shots, but can be of any type (e.g., layups, dunks, free-throws, three-pointers, etc.).

Figure 7D:
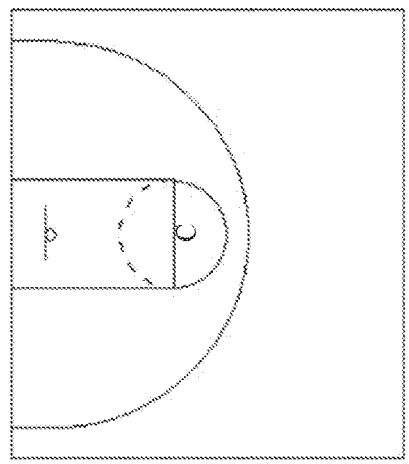
Figure 7B:
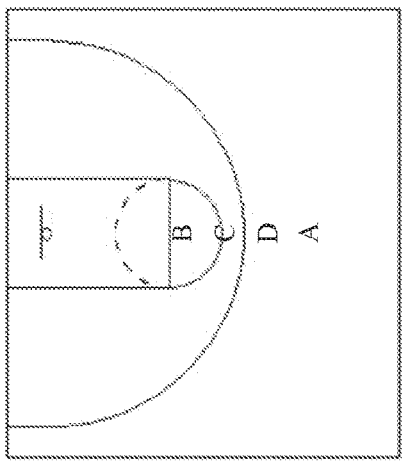

In FIG. 7B, player A has successfully made a basket before player B, and therefore player A remains within the game and moves to the back of the line. At this point, player B continues to shoot as the "first" player, and player C becomes active as the "second" player. Thus, player B may be eliminated if player C is able to make a basket before player B, and player B may remain in the game if he or she is able to score a basket before player C.

Figure 7E:
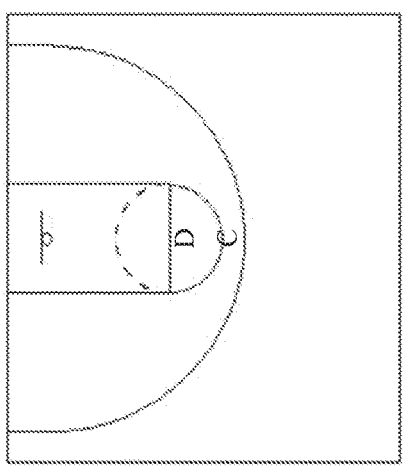
Figure 7C:
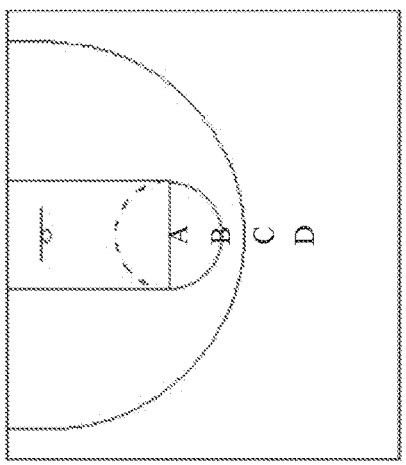

FIG. 7C shows the results subsequent to player C making a basket before player B is able to make a basket. Accordingly, player C has moved to the back of the line while player B is knocked out from the game. As shown in FIG. 7C, once player C has scored, he or she passes the ball to the next player (e.g., player D), who becomes the first active player. Player B, once knocked out, also passes the ball to the subsequent player, who becomes the second active player (e.g., player A). The game continues with player D as the active first player and player A as the active second player.

FIG. 7D shows the results of the first player (e.g., player D) making a basket before the second active player; thus, player D stays within the competition and moves to the back of the line and passes the ball to player C, who becomes the second active shooter. Player A becomes the first active shooter and continues to shoot with the goal of making a basket before player C is able to make a basket.

Figure 7F:
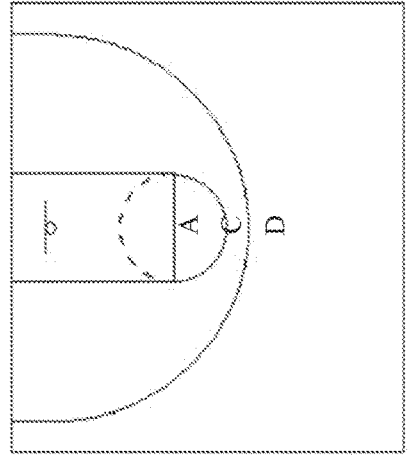

FIG. 7E shows the results of player C scoring a basket before player A is able to make a basket. Accordingly, player A is knocked out of the game and player C moves to the back of the line. Because there only remain two players, player D and player C, both players D and C remain active players for the remainder of the game. Because player C had last made a basket, he moves to the end of the line and thus becomes the second active player. Player D receives the ball from eliminated player A and becomes the first active player. FIG. 7F shows the result of player C making a basket before player D.

Accordingly, player D is eliminated, and player C is the winning player in this example game of knockout.

Facilitating the game of knockout when players are not co-located on a single court presents several technological challenges. For example, in a fast-moving game such as knockout, each player must quickly react to changes in status (e.g., being an active player, being knocked out, knowing when the game begins) and the system must quickly and accurately determine not only whether a respective player makes a basket, but also the timing of the basket to determine whether the first active player or the second active player has made a basket first. On a single court, it can easily be determined which basketball enters the hoop first, but on dispersed courts, such determination is more complex.

As an example, when a shot is determined to be made, such event may be reported to a device (e.g., server 300) that is tasked with determining when shots are made and, thus, which players should be eliminated. However, network latency (which can vary over time) can make it difficult to the system 10 to determine the timing of made shots with sufficient accuracy for the game of knockout for which shots are sometimes made within a just a few seconds or even less than a second of each other. In some embodiments, the system 10 is configured to take into account network latency and other timing factors so that the timing of made shots on disparate courts can be made with a high degree of accuracy. In addition, the system 10 should make determinations sufficiently quickly in order not to slow down the game of knockout, which in its nature is fast paced. These and other considerations are addressed by dispersed game tracking system 10. Suitable machine-learning based methods and other types of methods for determining when a shot meets the criteria for a made shot are disclosed in commonly-assigned U.S. Pat. No. 11,413,514 entitled "Systems and Methods for Evaluating Player Performance" and filed on Jul. 8, 2019, which is incorporated herein by reference.

Figure 8:
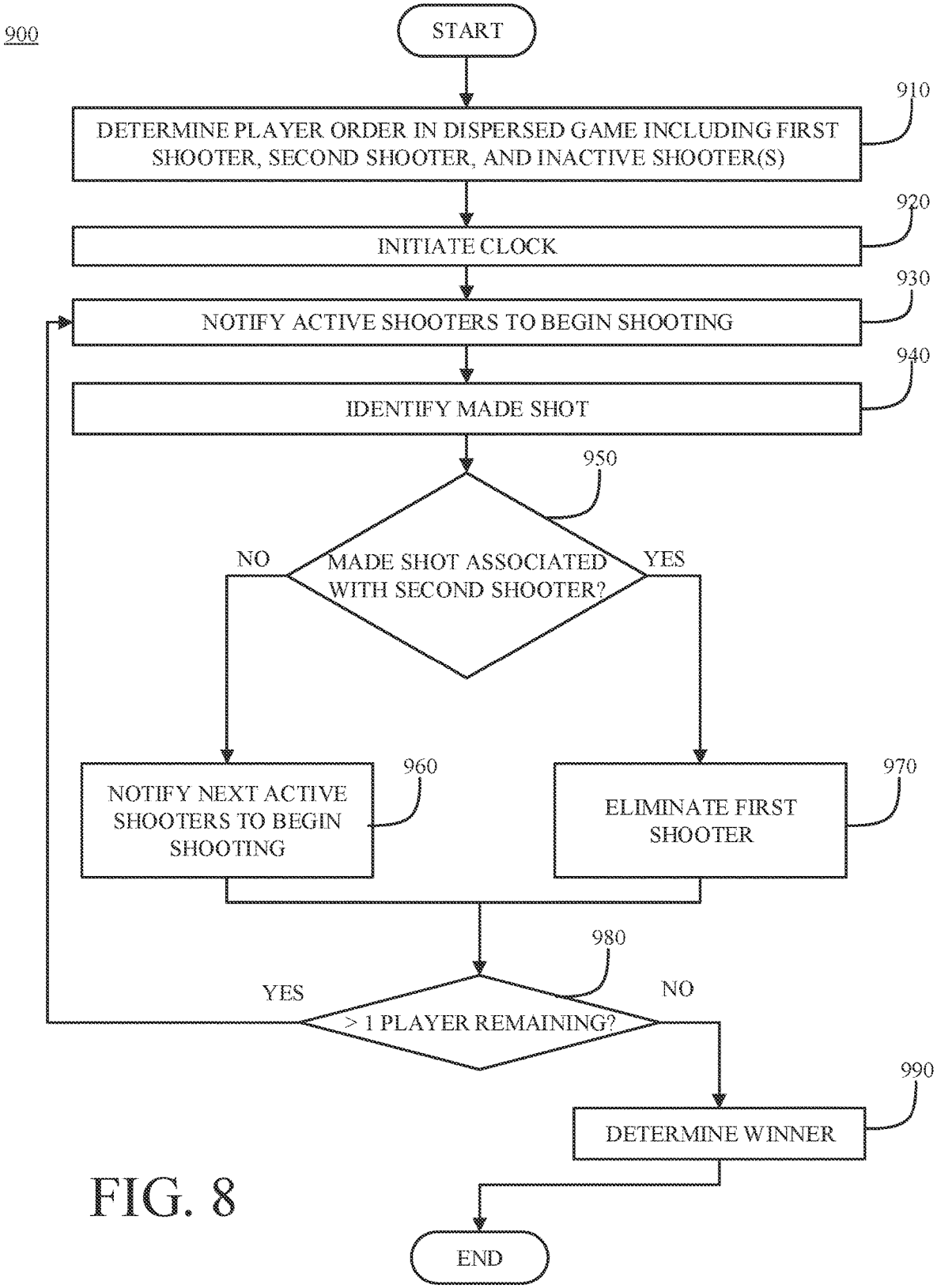
FIG. 8 is a flow diagram of an embodiment of using the dispersed game tracking system to enable playing a dispersed game of knockout.

FIG. 8 depicts a method 900 of using the dispersed game tracking system 10 to enable playing a dispersed game of knockout. In block 910, the method can include determining the player order in the dispersed knockout game. For example, each player (e.g., player A, player B, player C, . . . , player N) may use the or her respective user device 100A, 100B, 100C, . . . , 100N to enter his or her identifying credentials and select to join a respective dispersed game of knockout. Once the validation process of each player, ball, and dispersed court has been completed (e.g., as described with respect to FIG. 6), the system 10 can assign each player an order in the game of knockout. For example, player A may be assigned the role of first active player, player B may be assigned the role of the second active player, player C, may be assigned third (inactive) player, etc. The assignment of player order can be accomplished using any known method. In some examples, the assignment of player order can be random. For example, system 10 can generate a random order for each participating player (e.g., by using processor 304 of server 300). In some examples, the player order can be based on evaluation data 322, 626 stored for each participating player. For example, the players may be ordered based on some performance characteristic stored by system 10, such as percentage of baskets made, total number of game wins, determined skill level based on past performance, number of baskets attempted, etc. In other examples, players may be ordered based on the order they joined the game of knockout.

Note that it is possible for one or more players to be located on the same court. However, for illustrative purposes, unless otherwise indicated, assume that each player is on a different court that is not within direct sight from the other courts. As an example, each court may be in a different city, state, or country relative to the other courts.

In block 920 of the method, the system 10 may initiate a clock. The clock time may be synchronized across all devices being used to track players (e.g., user devices 100, server 300, tracking device 600) on each dispersed court as previously discussed above with respect to FIGS. 2-3 and FIG. 6. In some examples, server 300 may operate as the "host" computing device for the dispersed game and may transmit timing information to the other devices of system 10. In some examples, a single device (e.g., user device 100A, tracking device 600A) may be selected as a host device based on an assessment of network latency. For example, the device having the network connection with the lowest amount of latency can be selected as the "host" device. In such cases, the host device can transmit timing information to the other devices of system 10 in order to keep each device closely synchronized. The synchronization of each device being used to track players in a dispersed game may be used by the system 10 in order to synchronize image data 126, 638, and camera data 324, 630 generated for each dispersed court according to a global time domain.

In block 930, the method can include notifying the active shooters (e.g., player A and player B) to start shooting. Players can be notified in multiple different ways. For example, a player can be notified of both the start of the game and his or her position (first, second, third. etc.) and status (e.g., active player, inactive player, eliminated player) within the game with a written message or audible indication that is transmitted to the user device (e.g., user device 100A, 100B, etc.) associated with the respective player. In some embodiments, some dispersed courts may have more than one player participating in a particular game of knockout (e.g., player A and player B may share the same dispersed court). In such examples, player A may receive an indication through user device 100A and player B may receive an indication through user device 100B, although in some cases only one of user device 100A and user device 100B may be used to capture image and depth data. In some examples when tracking device 600 is present as an integrated smart basketball hoop, players may be notified by the smart basketball hoop displaying the player order and indicated when the game starts directly on the basketball hoop via output interface 608, which can be implemented as a screen integrated into the backboard of the smart basketball hoop. In yet other examples, each player can be notified via a respective connected device (e.g., connected device 200A for player A, connected device 200B for player B, . . . , connected device 200N for player N). Connected device 200 can be a device that is connected to a respective user device 100 via a short-range wireless communication protocol, such as Bluetooth™. Connected devices 200 can include augmented reality headsets, Bluetooth™ headphones or earbuds, virtual reality headsets, and the like. Connected devices 200 can provide an audio or visual cue indicating to each player that start time of the game, and the player status, and the player position. In some examples, additional notifications can be transmitted to the dispersed players, for example to indicate (a) when a respective player can begin actively shooting, (b) when the respective player is one of the two "active" shooting players, (c) when the respective player has been knocked out, (d) the status of the respective player (e.g., active, inactive, or eliminated), and (e) if the player is currently inactive, how many additional inactive players are in front of him/her remaining in the game. It should be noted that notifications can be intermittently forwarded to each player as described above when a player's status and/or position changes throughout the game.

In block 940, the system 10 can use the techniques described with respect to computer vision logic 128, 316, 624 and/or object tracker 136, 326, 636 to identify whenever a basketball shot is made and determine the identity of the player responsible for the made shot. As will be described in further detail with respect to FIG. 9, while the system 10 may require up to several seconds to process whether a shot was made, the system may receive a manual indication from the player responsible for the made shot to indicate that a shot is a made shot, which is subsequently verified by computer vision logic 128, 316, 624 and/or object tracker 136, 326, 636.

In decision block 950, the method can include determining whether the made shot was made by second active shooter or the first active shooter. As described with respect to FIGS. 7A-7E, if the second active shooter makes a basket before the first active shooter, the first active shooter is eliminated as shown in block 970. Subsequent to the elimination, the system 10 may notify the third (inactive) shooter of the elimination of the former first shooter and indicate to the third (inactive) shooter of his or her change in status and position to active first shooter. Similarly, system may indicate to the fourth (inactive shooter) of his or her change in status and position to active second shooter. When the first active shooter makes a basket before the second active shooter, method 900 moves to block 960, in which the system 10 notifies the next active shooter to begin shooting. In the example outlined above, when the first active shooter makes a basket before the second active shooter, the former inactive third shooter becomes the current second active shooter, and the former active second shooter becomes the current active first shooter.

In decision block 980, the system 10 can determine whether more than one player remains active within the game. If more than one player remains within the game, the method moves back to block 930 and the next current first and second active shooters are notified to begin shooting. If only one player remains in the game, the method moves to block 990, in which the system 10 determines the winner as the sole remaining active shooter.

It should be noted that during a game or training session enabled by dispersed game tracking system 10, each player can have access to a video stream associated with other players within the dispersed game, thereby allowing each player to view the performance of the other players during the game or training session. For example, player A can receive one or more video streams to user device 100A and/or connected device 200A that is associated with user device 100A. In some embodiments, when tracking device 600 is in use and implemented as an integrated basketball hoop, a user may be able to view a video stream from the other players directly on an output interface 608 associated with tracking device 600. As described below with respect to viewing device(s) 400 in FIGS. 10-11, each player may have access to a graphical user interface on either user device 100A, connected device 200A, and/or tracking device 600A that allows them to select which player streams they wish to view. In some embodiments, the player can select for active shooters to automatically have his or her streams displayed. Optionally, the stream associated with the next player in line (e.g., third "inactive" shooter) can also be displayed. Because of the difficulty of participating in the game while viewing a stream on user device 100, it may be advantageous for the player to receive the stream over connected device 200. In such examples, connected device may be an augmented reality headset, thereby allowing a player to view a video stream without having to take attention away from the dispersed game or dispersed training session. Being able to view other player's video streams can be especially important during training sessions enabled by dispersed game tracking system 10, and during games like horse, in which a player needs to successfully replicate a shot with specific shot criteria in order to progress through the game. During a training session, a dispersed player may wish to view a video stream in order to improve his or her own technique or replicate an observed technique. During the game of horse, a player may wish to study the shot of another player in order to copy the type of shot (e.g., an underhand shot, a hook shot performed with the left hand, the position of the player on the court while the shot was taken, etc.).

It should also be noted that dispersed courts can be located in close proximity to one another, or separated by an arbitrarily large distance, as previously indicated above. For example, a training facility can include multiple dispersed courts separated only by a few feet that are capable of interconnected play through the dispersed game tracking system 10. However, dispersed courts could also be separated by hundreds or even thousands of miles. The dispersed game tracking system 10 can enable play over dispersed courts regardless of the distance that separates each dispersed court from one another.

Figure 9:
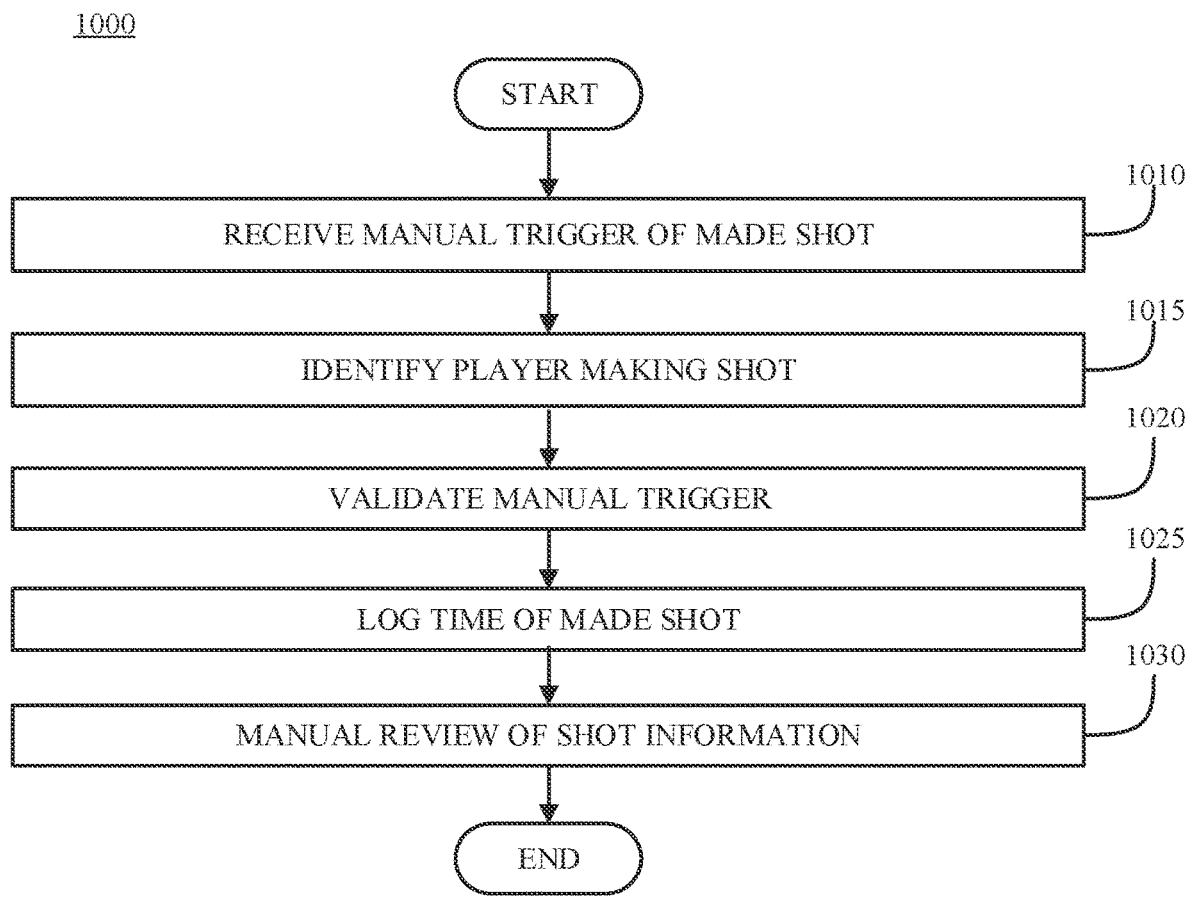
FIG. 9 is a flow diagram of an embodiment of using the dispersed game tracking system to validate a made shot.

FIG. 9 depicts method 1000 of using the dispersed game tracking system 10 to validate a made shot. In block 1010, the method can include, subsequent to a respective dispersed player making a shot, receiving a manual trigger indicative of a made shot. For example, the player can perform a predetermined gesture that can be detected by the sensors of dispersed game tracking system 10 to indicate when the player has made his or her most recent shot. A predetermined gesture can include waving one or both hands, raising a first in the air, throwing a flag into the air, etc. The system 10 can also determine the identity of the person performing the gesture and therefore determine which player made a shot in block 1015. In some examples, the player can provide a predetermined audible signal indicative of a made shot. For example, the player may utter the phrase "made shot," "score," etc. In some examples, the audible signal can be an airhorn, a whistle, etc. that the player activates subsequent to a made shot. In any case, the sensors of dispersed game tracking system 10 can detect the audible signal or other indication of a made shot and can determine the identity of the person performing the gesture and therefore determine which player just made his or her last shot.

In block 1020, the method can include validating the manual trigger. In some embodiments, the validation of a made shot using computer vision logic 128, 316, 624 and/or object tracker 136, 326, 636 can take up to a few seconds, and so the game may continue while the system 10 validates the manual trigger. After validation of the manual trigger, in block 1025, the system can also log the global clock time at which the shot in question was made, so that it can be compared to shots made by other players in the dispersed game. In some embodiments, the system 10 can determine a made shot without the manual trigger, for example when the computer vision logic 128, 316, 624 and/or object tracker 136, 326, 636 are capable of determining whether a basket is made in less than a second. In some examples, when both the manual trigger is received and subsequently validated, the system 10 determines a made shot. In some examples, the manual trigger may indicate a made shot but the system 10 determines that the shot was in fact, not made. In such an example, the system 10 may flag the made shot for manual review. In some examples, when the system determines that a shot was not made but the manual trigger indicated a made shot, the system 10 may disqualify the player that provided the false manual trigger. This disqualification information can be saved to the profile of the respective player (e.g., saved as evaluation data 322, 626, and/or stored on analytics database 500. Repeat offenders may be prevented from further participation in dispersed sporting games enabled by system 10. Optionally, a user (e.g., referee) may manually review the shot information determined in FIG. 9. As an example, the determination of whether or shot was made, which player made the shot, and the time of the made shot may be displayed to a user who can provide feedback indicating whether the information is correct. If there are any discrepancies, the user may provide inputs indicative of the appropriate corrections, and the system 10 may then adjust the information accordingly.

Note that the system 10 is configured to determine that a shot is made when the ball passes through the hoop to which the ball was shot. The system 10 may detect the manual trigger (e.g., predefined gesture) after an amount of time, such as a few second after the ball has passed through the hoop depending on the reaction speed of the player. However, the system 10 has the ability to analyze the trajectory information captured by the sensors in order to determine a precise time that the ball passed through the hoop, even if the determination or confirmation about the outcome of the shot is subsequently made. That is, within the game of knockout (as with other games), there is an acceptable lag between the occurrence of an event (e.g., a made shot that knocks out a player) and notification of the event to the players, including the active players whose status may be affected by the outcome. Although the acceptable notification or confirmation lag may be relatively long (e.g., a few seconds), it is generally more important for the timing of when the ball is determined to pass through the hoop to be accurate. In this regard, the difference in timing between two shots being made may be very short (e.g., less than a second) such that the accuracy in determining the time when a shot has been made is highly important even if this determination occurs or is confirmed several seconds after the ball actually passes through the hoop. Thus, taking a few seconds to assess the shot outcome (e.g., make an accurate determination as to whether a shot has been made), thereby helping to prevent false outcome determinations (e.g., falsely determining that a shot has been made when in fact it has been missed or vice versa), is acceptable provided that the determined time of the made shot is accurate.

Note that the time of a made shot can be defined in various manners as long as the definition is consistently applied to the shots being compared. For example, a shot can be defined to be made at the time when the top of the ball passes below the hoop. Alternatively, the shot can be defined to be made at the time when another point of the basketball, such as the basketball's midpoint, passes through the hoop, or the shot can be defined to be made at the time when any part of the ball enters the hoop. Regardless of the standard used to define the timing of a made shot for comparison to other shots, for a shot to be classified as "made," the entirety of ball should pass through the hoop at some point in time during the trajectory of the shot. In some cases of a missed shot, a ball may partially pass through the hoop but bounce out of the hoop, making it difficult to accurately assess the outcome in some cases. Allowing the system 10 to confirm the outcome of the shot after the shot has actually been made (e.g., based on a manual trigger or other type of confirmation) may help to increase the accuracy of the outcome determination without affecting the time assigned to the made shot for comparison to other shots.

Figure 10:
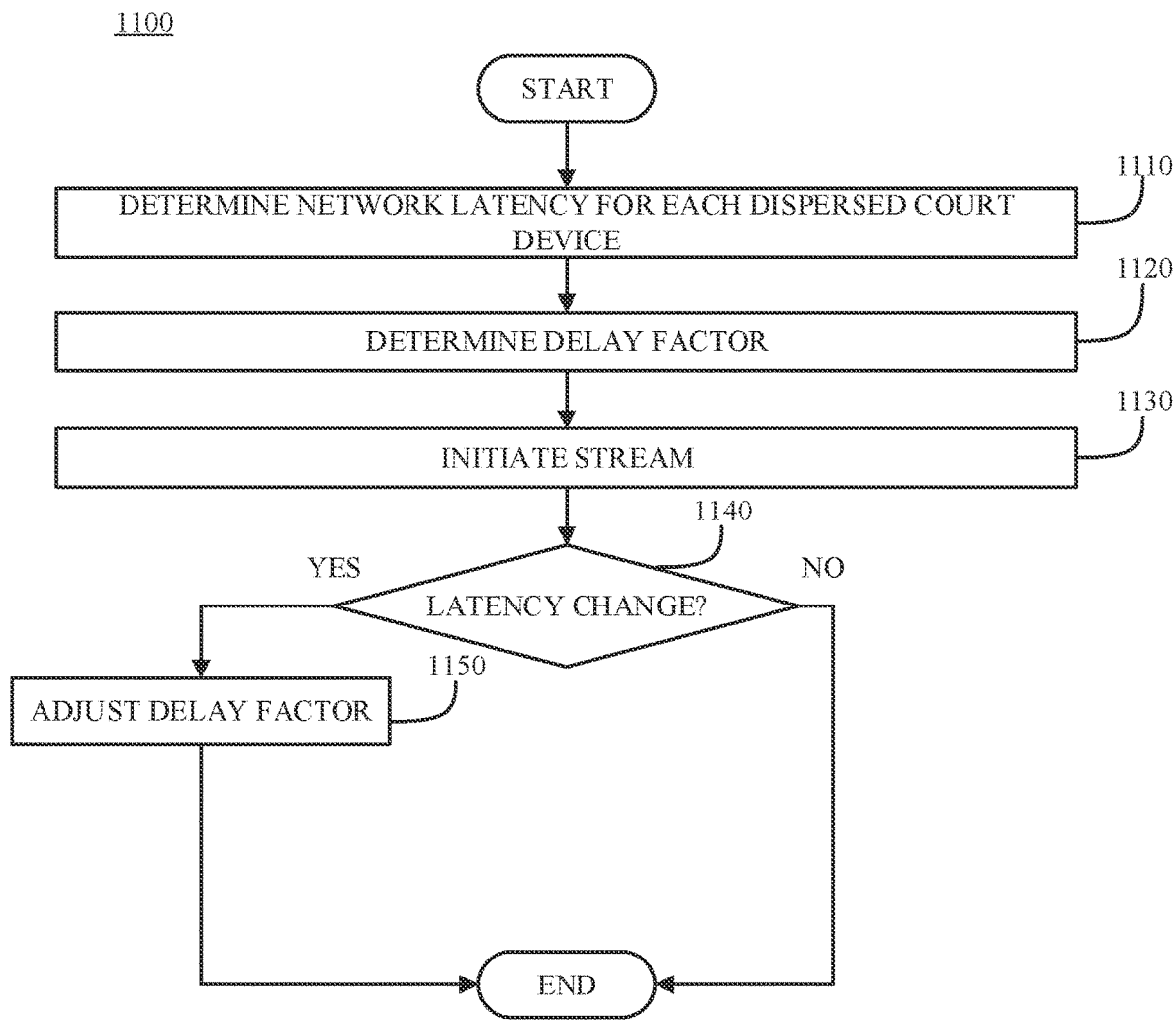
FIG. 10 is a flow diagram of an embodiment of using the dispersed game tracking system to provide a video stream of a dispersed game.

FIG. 10 depicts a method 1100 of using the dispersed game tracking system 10 to provide a video stream of a dispersed game. For example, one or more viewing devices may wish to monitor the dispersed game enabled by the system 10. When a game is taking place on a single court, the audience can spectate the game live in person, or can view a recording or live stream of the event easily. However, in a dispersed game, in order to view the game remotely, spectators may receive a stream from each dispersed court of a plurality of dispersed courts. One problem that system 10 solves is how to display the plurality of streams to a spectator in a way that is synchronized despite timing differences (e.g., network latency) present among user device(s) 100, server 300, and/or tracking device(s) 600.

In block 1110, the method can include determining network latency for each dispersed court device. For example, a first dispersed court may be monitored by user device 100A, a second dispersed court may be monitored by user device 100B, and a third dispersed court may be monitored by tracking device 600A. The system 10 can measure the network latency of each of the active devices (user device 100A, user device 100B, and tracking device 600A). In some configurations, each of user device 100A, 100B, and tracking device 600A may be in communication with server 300, which can act as the "host" device, thus responsible for synchronizing clocks to a global time domain maintained by the server 300 and performing the computer vision and object tracking objectives of system 10 (e.g., using computer vision logic 316 and object tracker 326). In other embodiments, system 10 may not use server 300 as a host device. Rather, returning to the example above, the device having the lowest latency among user device 100A, user device 100B, and tracking device 600A may be selected to "host" the dispersed gaming session in a peer-to-peer fashion. The peer-to-peer host device can be responsible for maintaining the global time domain. In some examples, the host device can perform all the computer vision and object tracking objectives of system 10, while in other examples, each device can perform computer vision and object tracking locally and only send the results of the analysis (e.g., whether a shot was made, the player identity of the shotmaker, and a global time system timestamp referencing when the shot was made) to the peer-to-peer host device.

In block 1120, the method can include determining a delay factor for each dispersed court device. After determining the latency of each device being used to monitor the dispersed game, the system can determine a delay factor which can be applied to each video stream for synchronization such that each of the video streams (e.g., the stream from each of user device 100A, user device 100B, and tracking device 600A) displays images having the same global time stamp simultaneously to one or more viewing device(s) 400. By showing images having the same global timestamp simultaneously, the system can synchronize each available video stream to one another.

As an example, assume that the server 300 is hosting a game involving a user of user device 100A (referred to hereafter as "user A" and a user of user device 100B (referred to hereafter as "user B") where user A and user B are playing a game of knockout on different courts. Further assume that the user device 100A captures a video stream of user A and the user device 100B captures a video stream of user B. In addition, assume that there is a six second latency from the time that a frame is transmitted by the user device 100A until the frame arrives at the server 300. Also assume that there is a two second latency from the time that a frame is transmitted by the user device 100B until the frame arrives at the server 300.

In some embodiments, the control logic 327 of the server 300 may be configured to assign timestamps (relative to the global time domain that is based on the clock 314 of the server 300) to the frames when received by the server 300. Specifically, when a frame is received, the control logic 327 may be configured to assign the current timestamp generated by the clock 314 (FIG. 3) such that the timestamp assigned to the frame indicates the time that it is received by the server 300. However, the control logic 327 may adjust the timestamp to account for the network latency (i.e., delay from the time of transmission by the user device 100A or 100B to the time of reception by the server 300). For example, when the delay associated with user device 100A is six seconds and the delay associated with user device 100B is two seconds, as described above, the control logic 327 may adjust the timestamp assigned to a frame from the user device 100A such that it indicates a time six seconds sooner, and the control logic 327 may adjust the timestamp the timestamp assigned to a frame from the user device 100B such that it indicates a time two seconds sooner. Alternatively, the control logic 327 may not adjust the timestamp assigned to a frame from the user device 100A, and the control logic 327 may adjust the timestamp assigned to a frame from the user device 100B such that it indicates a time four seconds later. Thus, frames captured at the same time by the user device 100A and the user device 100B should be assigned the same timestamp by the control logic 327 at least within a small margin of error.

By analyzing the two video streams, the control logic 327 can be configured to determine the relative timing of events indicated by the video streams. For example, based on the timestamps assigned to the video stream from user device 100A, the control logic 327 can determine the time (relative to the global time domain) when a shot in the video stream is made, and based on the timestamps assigned to the video stream from user device 100A, the control logic 327 can determine the time (relative to the global time domain) when a shot in the video stream is made.

Note that the latency associated with a device may change from time-to-time such that it is desirable to update the delay factor to account for such change. For example, after a stream is initiated from a device (e.g., user device 100A, user device 100B, or tracking device 600A), as shown by block 1130, the system 10 can determine whether the associated latency has changed. This can be accomplished by the handshake process previously described above. When a latency change is detected, the method can include adjusting the delay factor in block 1150.

Also note that the latency adjustment described above is not limited to data streams and may be performed to control the timestamps assigned to events. As an example, rather than sending a video stream to the server 300, the user device 100A may instead be configured to monitor the captured video stream and determine when a shot is made. In response, the user device 100A may transmit a notification of such event to the server 300, which then assigns a timestamp to the notification and adjusts the timestamp to account for the latency associated with the user device 100A, as described above for the video stream from the user device 100A.

In other embodiments, rather than making adjustments for latency at the host device (e.g., server 300), the clock of a device (e.g., user device 100A, user device 100B, or tracking device 600A) may be synchronized with the clock 314 on which the global time domain is based, as previously described above. In this regard, with respect to the user device 100A, server 300 may be configured to transmit timing information from the clock 314 to the user device 100A, which then adjusts its local clock 108 such that it is synchronized with the clock 314. Such timing information may be transmitted from time-to-time so that drift in the clock 108 relative to the clock 314 can be corrected. In such an embodiment, the user device 100A may be configured to assign timestamps to sensor data (e.g., video stream) at the time of capture or to events at the time of occurrence such that the time indicated for such data or events is relative to the global time domain. In such an embodiment, it is unnecessary for the server 300 to adjust the timestamps of the data or notifications received. However, it may be desirable for the user device 100A receiving timing information form the server 300 to use similar techniques, as described above relative to FIG. 10, in order to adjust the received timing information to account for latency between the server 300 and the user device 100A. Note that other devices (e.g., 100B, 600A, 600B, etc.) may be similarly configured to synchronize their local clocks to the clock 314 of the server 300 or other host device.

Note that similar techniques may be used to delay, based on network latency, video streams to be viewed by spectators, for example, using a viewing device 400. For example, the server 300 may receive multiple video streams from multiple user devices 100A, 100B or tracking devices 600A, 600B and forward the video streams to one or more viewing devices 400 for display to one or more spectators. The server 300 may be configured to add the appropriate delay to each incoming video stream so that the video streams arrive at a given viewing device 400 in a synchronized manner. Specifically, the user of the viewing device 400 may view multiple streams or objects from multiple streams (e.g., when objects from multiple streams are superimposed on the same feed) such that the display shows frames or objects captured at about the same time.

For example, assume that two players are simultaneously taking shots at the same approximate time on different courts. One user device 100A may capture images of a first ball shot by one of the players, and another user device 100B may capture images of a second ball shot by the other player. The streams received from the devices 100A, 100B may be appropriately delayed such that when they arrive at and are displayed by a viewing device 400, the images of the first ball and the second ball are synchronized. As an example, the images of the first and second balls may be superimposed on an image of a court (including a hoop), and for a given frame, the first and second balls may appear in the frame at their respective locations at a given instant in time. Thus, by viewing the image, the user of the viewing device 400 can discern the relative locations of the balls shot by the users as if they were both shooting their shots on the same court toward the same hoop at the same time. The user, therefore, by viewing the images, may determine whether each shot was made and, if both shots are made, which shot passed through its respective real-world hoop first. That is, when the ball of the first made shot is shown as passing through the hoop in the displayed image, the other ball is shown at its respective location at the same instant in time so that the user can visually determine that the second ball has not yet reached its respective hoop. Exemplary techniques for synchronizing the display from multiple devices will be described in more detail below.

Note that the ball images superimposed on the image of the court may be controlled such that the ball images do not track the actual trajectory of the real-world ball, such as when the object tracker 326 determines that two real-world balls would have contacted each other had both players been playing on the same court. In this regard, if the object tracker 326 determines that the two balls would have arrived at the same location (relative to the hoop) at the same time had they been shot on the same court such that the two balls would have made contact, then the object tracker 326 may be configured to control the display such that the two balls appear to have been deflected even though the real-world balls represented by the ball images were not actually deflected. In this regard, based on the trajectory of each ball (including weight of each ball (which is known a priori) and the velocity of each ball at the moment of virtual contact), the object tracker 326 can calculate the force vectors that would have been imparted on each ball if they actually made contact. Based on such force vectors, the object tracker 326 can calculate the likely trajectory of each ball after contact, similar to the embodiment described below with respect to FIG. 26 and manipulate the superimposed ball images so that it appears as if the balls made contact and were deflected by such contact.

Figure 11:
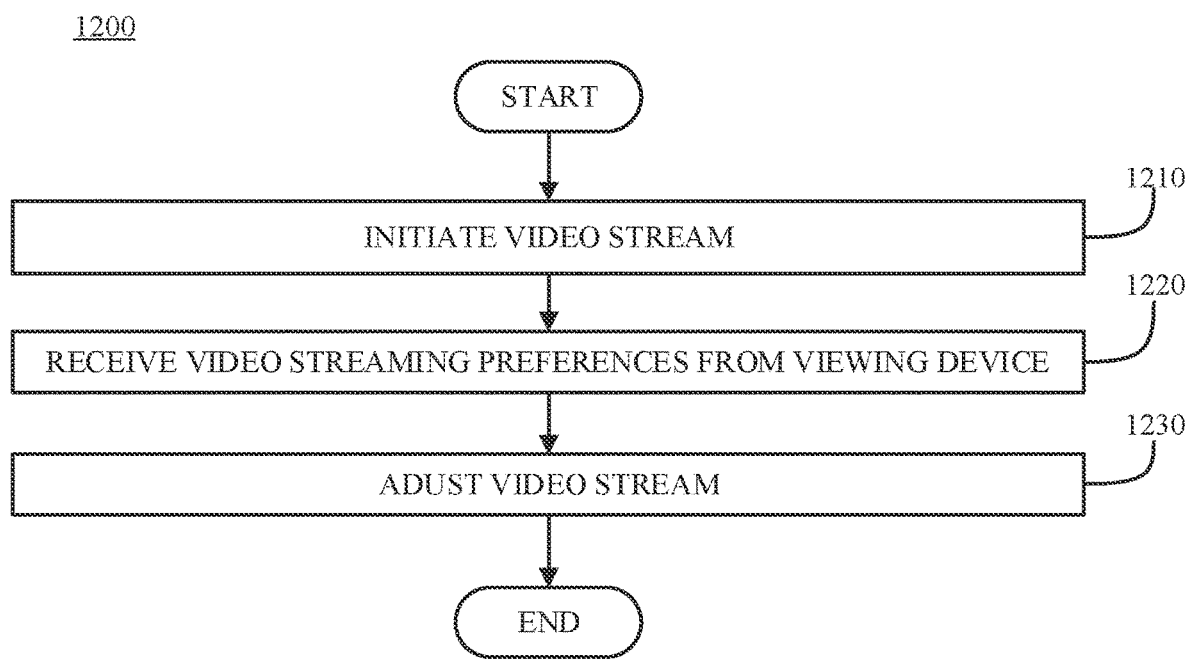
FIG. 11 is a flow diagram of an embodiment of using the dispersed game tracking system to adjust a video stream of a dispersed game.

FIG. 11 is a flow diagram of an embodiment of using the dispersed game tracking system to adjust a video stream of a dispersed game. In block 1210, the method can include initiating a video stream. This step can be substantially similar to block 1130, and a full description is omitted here for brevity. In block 1220, the method can include receiving video streaming preferences from a viewing device 400. For example, a user of viewing device 400 may wish to see the video streams in substantially real time instead of adjusted by a delay factor. Accordingly, the user of viewing device 400 may interact with a graphical user interface associated with system 10 and present on viewing device 400 to input his or her preferences. For example, the user can adjust the video stream to be shown in substantially real-time without a delay factor in which case the video streams could appear out of sync for the viewer. Alternatively, the user could request that a delay factor be used or adjusted. For example, if the user notices that the timing of a video stream appears to be ahead of the others, the user may specify an amount of delay to be added to the stream. As shown by block 1230, the system 10 is configured to adjust a video stream as requested or indicated by the user.

In another example of a video streaming preference, the user of viewing device 400 can choose how the video streams are presented. For example, the user of viewing device can choose for only the two active shooters video streams to be presented. In such example, if player A associated with user device 100A and player B associated with user device 100B are currently the active shooters, the viewing device 400 may only show video streams coming from user device 100A and user device 100B. In some examples, the user of viewing device 400 can select the option to view both active shooters video stream as well as the video stream for the next player up (e.g., the third inactive player). In some examples the video streams can be shown on side-by-side screens, where one video screen is positioned next or otherwise close to the other video screen so that a user can view the screens simultaneously. Thus, the user can visually see when each player makes a shot in order to determine which player makes a shot before the other player. In other examples, the video streams can be overlaid on one another in order to simulate player A and player B playing on a single court. In some examples, when the video streams are overlaid, the viewing device 400 may receive the true video feed of the dispersed game showing players A and B. However, in some examples, system 10 can generate a digital avatar for each player and represent player A and player B with avatars instead of using live video feed. This approach may, for example, reduce the bandwidth necessary to transmit the video feed and possibly reduce network latency.

In some embodiments, a single video stream of player A playing on his or respective court may be shown. Each frame of the video stream of player B playing on a different court may be analyzed to locate the image of player B and the image of player B's ball and cull the frame or otherwise process the frame so that the image of player B and player B's ball are extracted from the frame. The extracted objects (i.e., player B and player B's ball) may then be superimposed on a corresponding frame of the displayed video stream of player A so that the viewer sees the image of player B and player B's ball on the displayed image. Notably, the extracted objects may be located within the frame relative to the displayed hoop at the same locations the extracted objects appear from the hoop in the video of player B. Thus, the displayed image shows player A and player B at their appropriate locations as if they are both competing on the same court at the same time even though player B may be on a different court.

According to some examples, the video streaming preferences can also include whether a user of viewing device 400 wishes for system 10 to adjust the rotation and/or scale of the video feed in order to standardize the perspective of the video streams being received from user device 100A, user device 100B, and tracking device 600A.

According to some examples, the video streaming preferences can also include a menu of options of additional data that can be presented for each player. For example, historical data for each shooter (e.g., historical data 326F) can be overlaid on the respective video stream. In some examples, data associated with each shot attempt can be overlaid on the respective video stream. For example, data determined by object tracker 136, 326, 636, such as shot angle (e.g., release angle or entry angle), shot velocity, shot success percentage, etc. can be overlaid on the respective video stream being displayed by viewing device 400. In some examples, the viewer device 400 can also have the option of showing betting odds for each player within the dispersed game, thus allowing the user of viewing device 400 to place bets on who would win the overall competition, who would win any underlining competition, at what time the next basket would be scored, at what entry angle a particular competitor would shoot the next shot, etc. In some examples, viewing device 400 may provide a user interface that allows users of viewing device 400 to bet directly from the screen or to bet from a second screen which is synced to the same dispersed game. In block 1230, the video stream can be adjusted according to the video streaming preferences selected by a user of viewing device 400. It should be noted that in some examples the user of viewing device 400 can select video streaming preferences using viewing device 400 prior to the video stream being initiated. In addition, the user of viewing device 400 can continuously adjust video stream preferences throughout the dispersed game at any time of his or her choosing.

Figure 12:
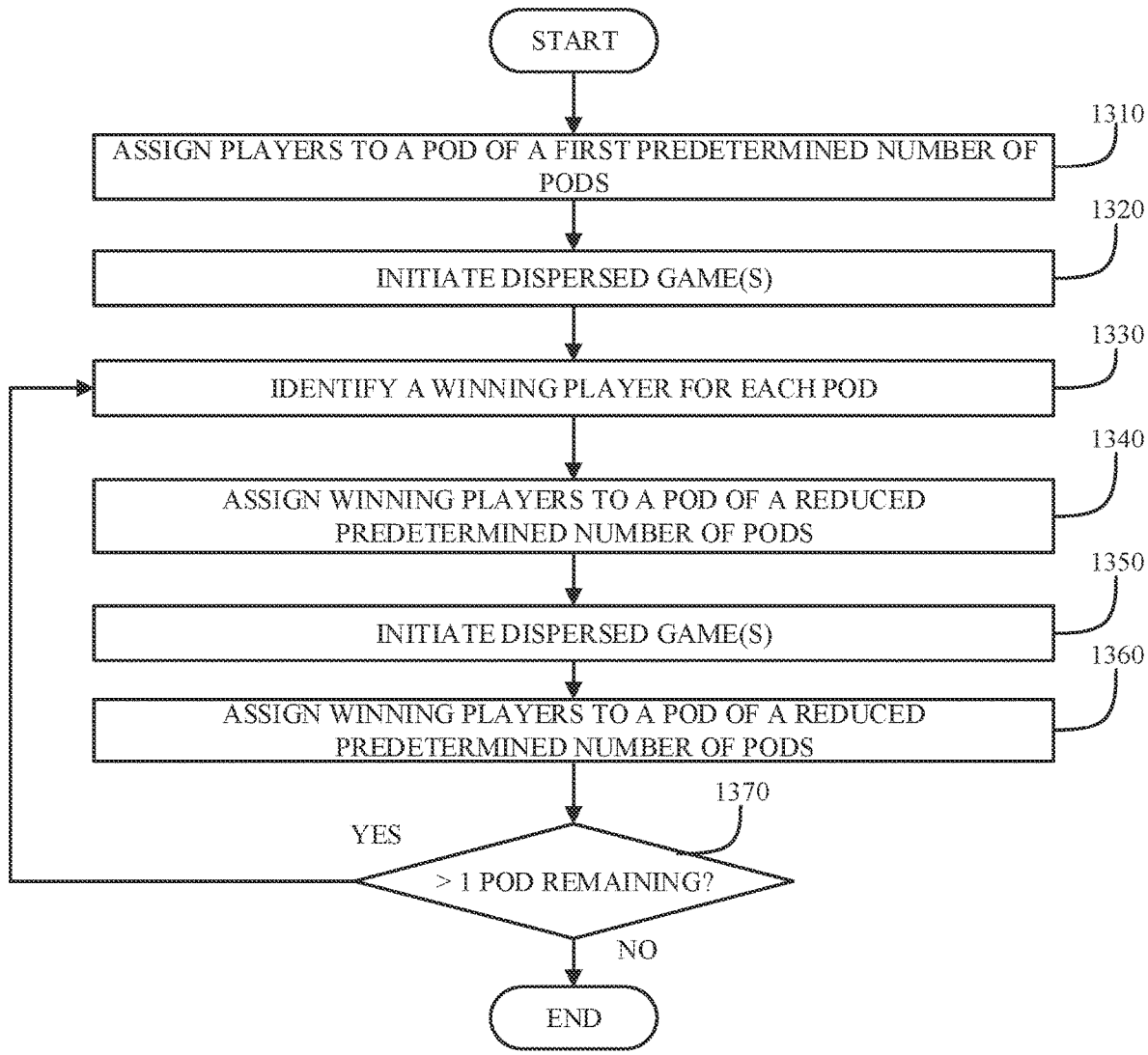
FIG. 12 is a flow diagram of an embodiment of using the dispersed game tracking system to enable tournament-style play of a dispersed game.

FIG. 12 depicts a method 1300 of using the dispersed game tracking system 10 to enable tournament-style play of a dispersed game. For example, if a sufficiently large group of dispersed players want to play a tournament game, it may be advantageous to split the large group of dispersed players into "pods" and organize a bracket in which each winner of a pod progresses into a winner's pod, and the process repeats until a single winning dispersed player is determined. In block 1310, the method can include assigning each dispersed player to a pod of a first predetermined number of pods. For example, 100,000 players be organized into 10,000 pods with each pod having 10 players. However, it should be understood, that the number of pods and number of players within each pod can vary depending on player preferences. Each dispersed player can be randomly or algorithmically assigned to a respective pod. For example, players of like skill (e.g., as determined based on evaluation data 138, 322, 626 and/or historical data 136F, 326F, 636F can be grouped together. In some examples, players can be placed in pods based on other characteristics, such as having similar age, number of games played, height, shot make percentage, etc.

In block 1320, the method can include initiating each of the dispersed games. Returning to the earlier example, each of the 10,000 pods can be initiated. Each dispersed game can proceed as described with respect to FIG. 8 above.

In block 1330, the method can include identifying a winning player for each pod. Subsequent to the identification, the winners (e.g., 1 winning player from each of the 10,000 pods) can be assigned to a reduced predetermined number of pods in block 1340. Continuing the previous example, when each pod size has been set at 10 players, the 10,000 winning players can be assigned to a respective pod out of 1,000 possible pods. The winning players can be assigned randomly or algorithmically, as described above with respect to block 1310.

In block 1350, the method can include initiating the dispersed games now with the reduced predetermined number of pods. Block 1350 can be substantially similar as described with respect to block 1320. In block 1360, the method can include assigning winning players to a pod of a second reduced predetermined number of pods. Continuing the previous example, the 1000 winners can be assigned 100 pods, etc.

In decision block 1370, the method can include determining whether more than one pod is remaining after block 1360. When more than one pod is remaining, the method reverts back to block 1330, and continues until only 1 pod is remaining and a final winner is determined.

In some examples, the losers of each pod can be assigned either randomly or algorithmically to new competition pods. For example, these players from these pods can be assigned to new "losing bracket" pods based on player ranking, player statistics, location, age, sex, etc.

According to some embodiments, a subsequent dispersed game might start as soon as 10 winning dispersed players are identified. In other embodiments, these 10 winners might start their competition at a future designated time which would have the benefit of allowing the competitors to rest and have planned competition times. In some examples, there might be some algorithmic benefit to winning your pod more quickly. For example, a person who wins his or her pod more quickly than others may be allowed to select his or her starting position within a pod, or may otherwise be assigned to start as the second active player (thus giving an immediate opportunity to knock out the first active player and avoid being the first active player at least for the first round).

Figure 13:
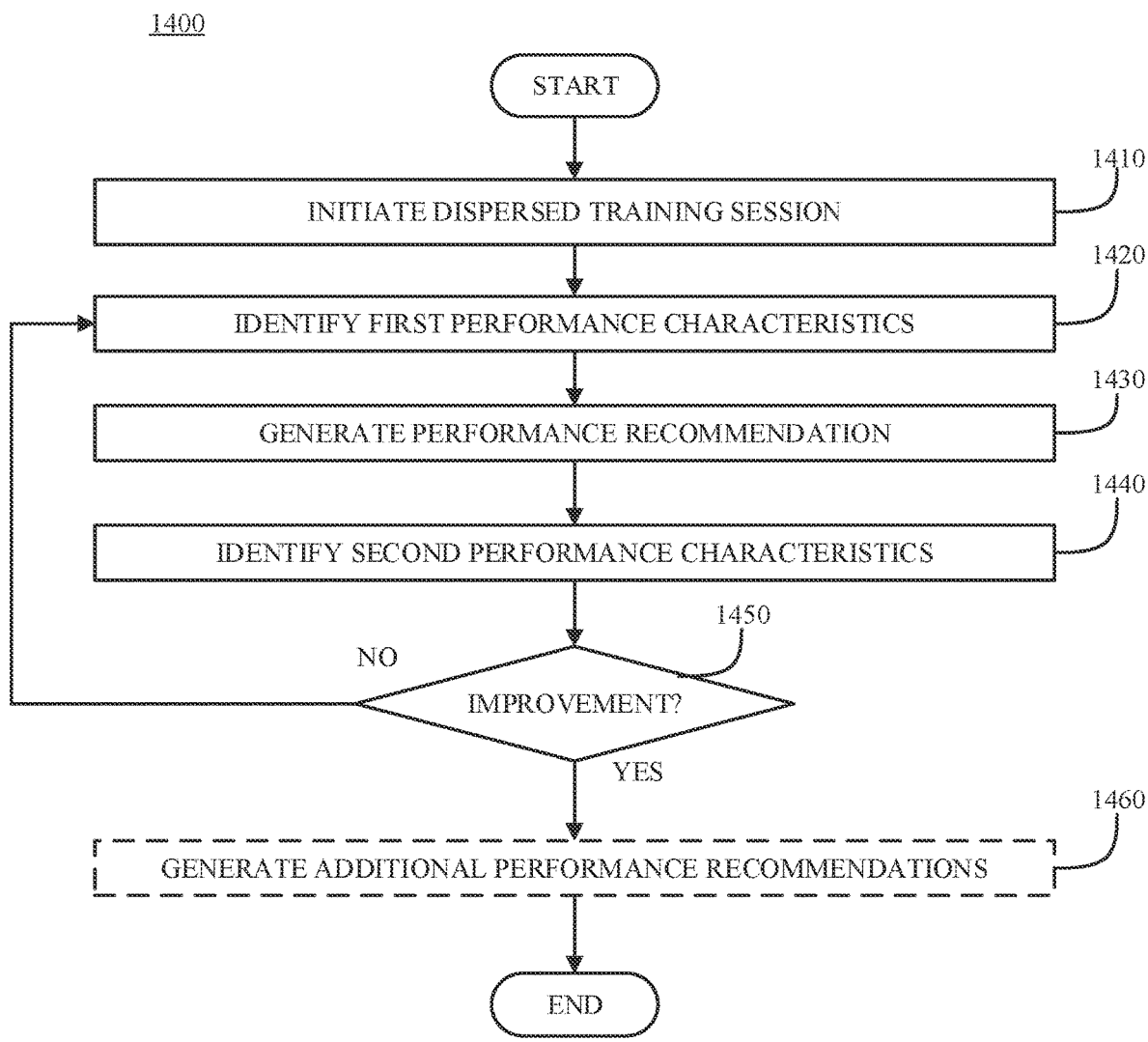
FIG. 13 is a flow diagram of an embodiment of using the dispersed game tracking system for a training session.

FIG. 13 depicts method 1400 of using the dispersed game tracking system 10 for a training session. In some examples, players may wish to participate in training sessions with other players over dispersed courts using dispersed game tracking system 10. In some examples, the dispersed game tracking system 10 may analyze a player's shooting, dribbling, passing, transition from dribbling to passing, and/or transition from dribbling to shooting skills and may identify opportunities to improve the performance and capabilities of the person, shooting, dribbling, and/or passing the ball. In some examples, a host trainer may view (e.g., via a viewing device 400) a training session and provide real-time feedback to the dispersed players. Dispersed players can interact with each other and/or with the coach by transmitting audio and/or written messages via an associated user device 100, a connected device 200, and/or through tracking device 600. It should be understood that a training session can include a player on a single dispersed court, or multiple players over multiple dispersed courts. It should also be understood that during a training session, each player may be working on a different, but complimentary skill. As will be described in more detail with respect to FIG. 14, for example, a first player or set of players could practice shooting skills, while a second player or second set of players could practice defending against the first player or first set of players.

In block 1410, the method can include initiating a dispersed training session. As discussed above, a training session can include just a single dispersed player (e.g., player A), multiple dispersed players on a single dispersed court (e.g., player A and player B participating on a single court), multiple dispersed players each on separate dispersed courts (e.g., player A on a first dispersed court and player B on a second dispersed court) and/or combinations of single players on a dispersed court and multiple players on another dispersed court. Each player can use a graphical user interface present on an associated user device 100, connected device 200, or tracking device 600 to select training parameters and join a training session. In the case of tracking device 600, a player can interact with tracking device by using his or her associated user device 100 which can communicate over network 650 to tracking device 600, or in some cases, can use gestures to select options on the output interface 608 of tracking device 600 directly. Dispersed game tracking system 10 can then automatically find other dispersed players having matching training criteria and match the players together in a session. Training criteria can include choosing to practice shooting skills, dribbling skills, passing skills, defense skills, etc., and also allow the dispersed players to select specific subsets of shooting skills, dribbling skills, passing skills, and/or defense skills that they wish to focus on during the training session. For example, a player may wish to practice three-point shots specifically. Once the training session has begun, each participating player may be instructed on what to do. When a coach is present (e.g., via viewing device), the coach may communicate with the participating dispersed players to provide instruction. In some embodiments, the dispersed game tracking system can also transmit a pre-recorded video to each user device 100, connected device, and/or tracking device 600 that demonstrates the relevant training skills that will be practiced during the training session. In some examples, the dispersed game tracking system 10 can generate a simulated video stream that uses avatars to demonstrate the skills that will be practiced in the training session. For example, server 300 can use information stored under ball path logic 326A, body motion logic 326C, etc. to generate a simulated video stream that demonstrates the relevant skills that will be trained during the training session.

In block 1420, the method can include identifying first performance characteristics. For example, returning to the example of a training session in which a dispersed player A wants to work on three-point shots specifically, player A may be instructed to move to the three-point line of his or her dispersed court and to shoot one designated shot or a series of designated shots from the three-point line. As previously described with respect to FIG. 3, the object tracker 326 and computer vision logic 316 can track the player and the ball and determine the outcome of the training shot (e.g., by utilizing ball path logic 326A, identification logic 326B, measurement logic 326G, scoring logic 326E, and/or improvement logic 326D). It should be understood that object tracker 136 and computer vision logic 128 of user device 100, and/or computer vision logic 624 and object tracker 636 of tracking device 600 can perform similar functions although this method refers to components of server 300. In block 1430, the method can include the dispersed game tracking system 10 generating performance recommendations. For example, the object tracker 326 can identify the characteristics of the training shot and determine areas where the person can improve his or her performance (e.g., by using improvement logic 326D). At this point, the dispersed game tracking system 10 can provide feedback to the dispersed player through written queues, video queues, and/or audio queues (e.g., the dispersed player may be shown a visualization tracking the ball path of his shot compared to a predetermined "preferred" shot that is stored as evaluation data 322). The visualization may include information associated with the shot, such as ball velocity, ball angle, ball spin, etc. that is determined by the dispersed game tracking system 10, and a comparison to the preferred shot, including preferred ball velocity, preferred ball angle, preferred ball spin, etc. The dispersed game tracking system 10 may provide a queue, for example, to improve the three-point shot by increasing the shot angle.

In block 1440, the method can include identifying second performance characteristics. For example, the dispersed player can again be instructed to perform a designated shot or a designated series of shots from the three-point line. Again, the dispersed game tracking system can employ computer vision logic 316 and object tracker 326 on the collected camera data to determine characteristics of the ball trajectory and player motions.

In decision block 1450 the method can include determining whether an improvement in performance was observed in the dispersed player performance.

Determining whether an improvement was observed can include determining whether the made short percentage of the second designated shot or second designated series of shots improved over the first designated shot or first designated series of shots. In some examples, the dispersed game tracking system can determine an improvement even when the made shot percentage did not improve by determining that the characteristics of the shot (e.g., shot angle, shot velocity, ball spin, etc.) have improved even though the second designated shot or second designated series of shot have not improved. This can be due to a change in technique being difficult to initially master although continued use of the new technique is statistically likely to improve player performance. The system may determine that no improvement has been shown when the shot made percentage does not improve and/or the characteristics of the shot have not improved. If the system 10 determines no improvement, then the method may move back to block 1420. If the system determines an improvement, the method may move to optional block 1460. The player may be queued to perform a third designated shot or series of designated shots, and the system 10 may generate additional performance recommendations based on the third designated shot or series of shots, the second designated shot or series of shots, the first designated shot or series of shots, or combinations thereof. In some examples, the performance characteristics determined by the system 10 can be stored as historical data 326F so that the respective player can review his or her comprehensive performance including any improvements made over time by accessing his or her player profile stored by system 10.

According to some embodiments, rather than relying on system 10 to generate recommendations, a coach viewing the training session (e.g., via a viewing device 400) can monitor the player performance and provide his or her own recommendations to the dispersed player. This may enable a coach to train a player or a group of players when the player, group of players, and/or the coach are located in remote locations.

Figure 14:
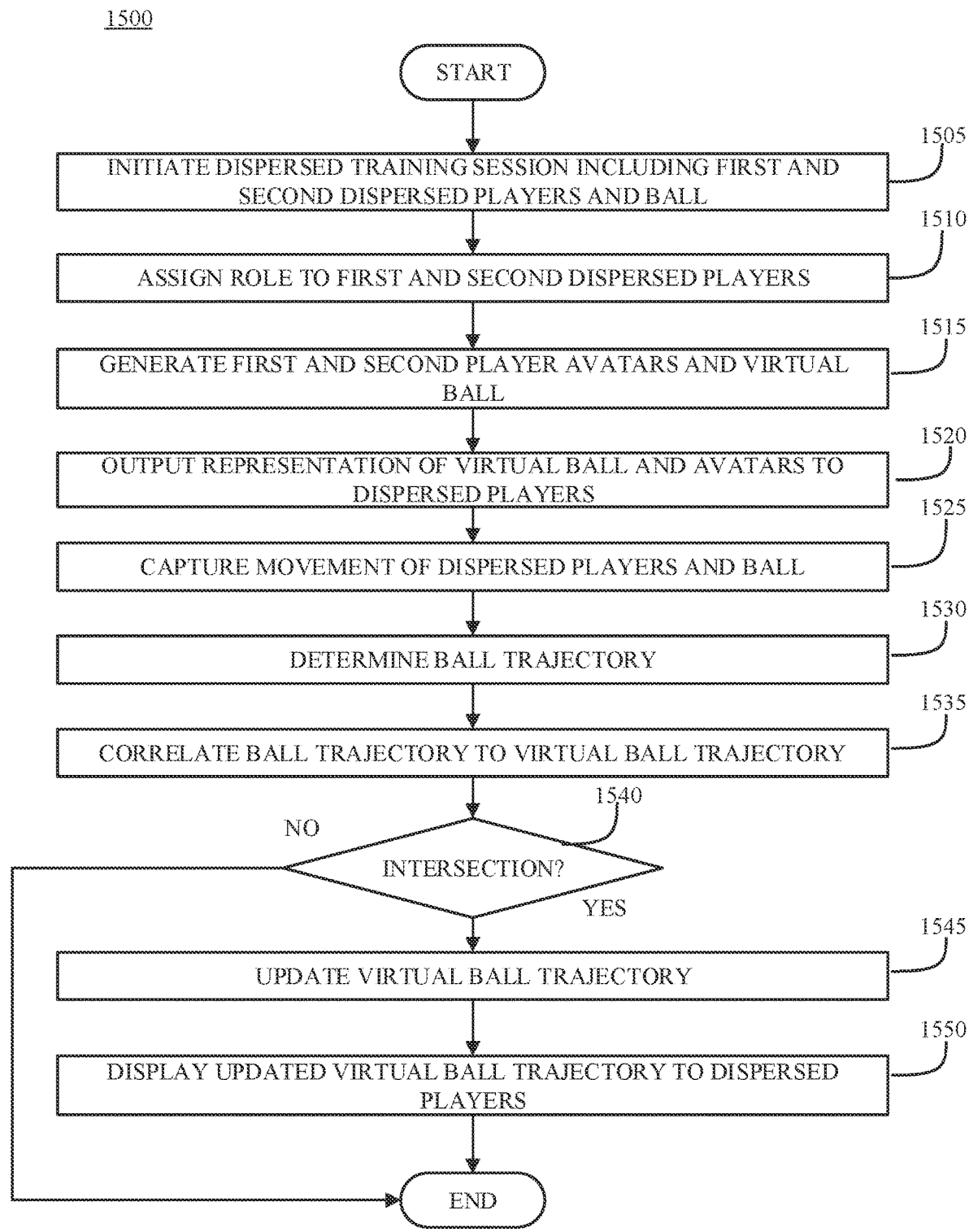
FIG. 14 is a flow diagram of an embodiment of using the dispersed game tracking system to allow dispersed players to train on dispersed courts using a virtual ball.

FIG. 14 depicts a method 1500 of using the dispersed game tracking system 10 to allow dispersed players to train on dispersed courts using a virtual ball. Method 1500 discusses the capability of dispersed game tracking system 10 to facilitate a first dispersed player to practice making a shot while being defended by a second dispersed player located in a remote location relative to the first dispersed player. However, it should be understood that method 1500 is not limited to shooting and shooting defense. In another example, method 1500 can be configured to allow a first dispersed player to practice dribbling, while a second dispersed player practices dribbling defense while in a location remote relative to the first dispersed player. In order to facilitate such practice sessions, the system 10 can use augmented reality devices (e.g., connected devices 200) to allow each dispersed player to see a virtualized avatar of the other dispersed player. The system 10 can analyze the trajectories and body motion of the shooting or dribbling player, defending player, and the ball, and can determine whether an intersection occurs between the relative position of the ball and the defending player to determine whether the defender has succeeded in blocking the shot or dribble.

In block 1505, the method can include initiating a dispersed training session including a first dispersed player on a first dispersed court, and a second dispersed player on a second dispersed court. In block 1510, the method can include assigning a role to the first and second dispersed players. In some cases, the system 10 may randomly assign a shooting role to the first dispersed player and the second dispersed player. In some examples, each of the players may select his or her roles prior to initiating the dispersed training session by interacting with a graphical user interface on a user device 100, connected device 200, and/or tracking device 600. In some examples, only a single player may have a basketball present on the dispersed court, and so the shooting player may be selected based on having a basketball while the defender can lack a basketball. In certain examples, both the first dispersed player and the second dispersed player may be wearing a connected device 200 (e.g., connected device 200A associated with the first dispersed player and connected device 200B associated with the second dispersed player) which can be implemented as an augmented reality device. An augmented reality device may be used in order to display a virtual ball to dispersed players in the training session without interfering with the training session or obscuring the environment of the dispersed court.

In block 1515, the method can include generating a first player avatar to be displayed to the second player via connected device 200B and generating a second player avatar to the be displayed to the first player via connected device 200A. If the first dispersed player has the basketball and has selected or been assigned the role of shooter, the system 10 can generate a virtual ball that may be displayed to the second dispersed player via connected device 200B based on the location of the physical ball. That is, the virtual ball may be shown at a location corresponding the actual location of the physical ball that is represented by the virtual ball. In block 1520, the method can include outputting a representation of the virtual ball and the first avatar to the second dispersed player via connected device 200B and outputting a representation of the second avatar to the first dispersed player via connected device 200A.

In block 1525, the method can include capturing the movement of dispersed players and the physical ball. For example, object tracker 326 (and/or object tracker 136, 636) can track the position of the first dispersed player, the second dispersed player, and the physical ball while the first dispersed player attempts to make a designated shot and the second dispersed player attempts to prevent the avatar representing the first dispersed player from making the designated shot. In block 1530, the method can include determining the ball trajectory of the physical as the first player attempts to make the designated shot.

In block 1535, the method can include correlating the physical ball trajectory to the virtual ball trajectory. Thus, system 10 can output to the second dispersed player a representation of the avatar representing the first dispersed player and a virtual ball that is following the physical ball trajectory via connected device 200B. The second dispersed player can therefore react to the representation of the virtual ball and the first avatar in order to "virtually defend" the first dispersed player.

In decision block 1540, the method can include determining whether there is an intersection between the second dispersed player and the virtual ball (or equivalently, whether there is an intersection between the second avatar and the physical ball). As previously described with respect to ball path logic 326A and body motion logic 326C, object tracker 326 can determine whether an intersection occurs. If an intersection does not occur, the trajectory of the virtual ball and the physical ball remain correlated, and the method may end. The method may be repeated any number of times as long as the training session continues. If the system 10 determines that an intersection occurs, the method may move to block 1545.

In block 1545, the method can include updating the ball trajectory of the virtual ball. For example, the object tracker 326 (e.g., body motion logic 326C) can use image data collected by the system 10 to determine the approximate body movements and acceleration of the body parts that intersected with the virtual ball. System 10 may then utilize ball path logic 326A to determine a projected trajectory for the virtual ball using conventional mathematical and physics principals and equations based on trajectory information extracted from camera data 324. In block 1550, the method can include displaying the updated virtual ball trajectory to both the first dispersed player (e.g., via connected device 200A) and the second dispersed player (e.g., via connected device 200B). In some examples, no physical ball is used at all during a training session. In such examples, the system 10 can determine an estimated trajectory based on the body motion of the player simulating taking a shot and computer vision logic 316 can determine whether the estimated trajectory results in a successful shot attempt. Although method 1500 is discussed with respect to a first player practicing shooting and the second player practicing shooting defense, it should be understood that similar method steps can be used for enabling a first player to practice dribbling or passing, and the second player to practice dribbling or passing defense.

Figure 15:
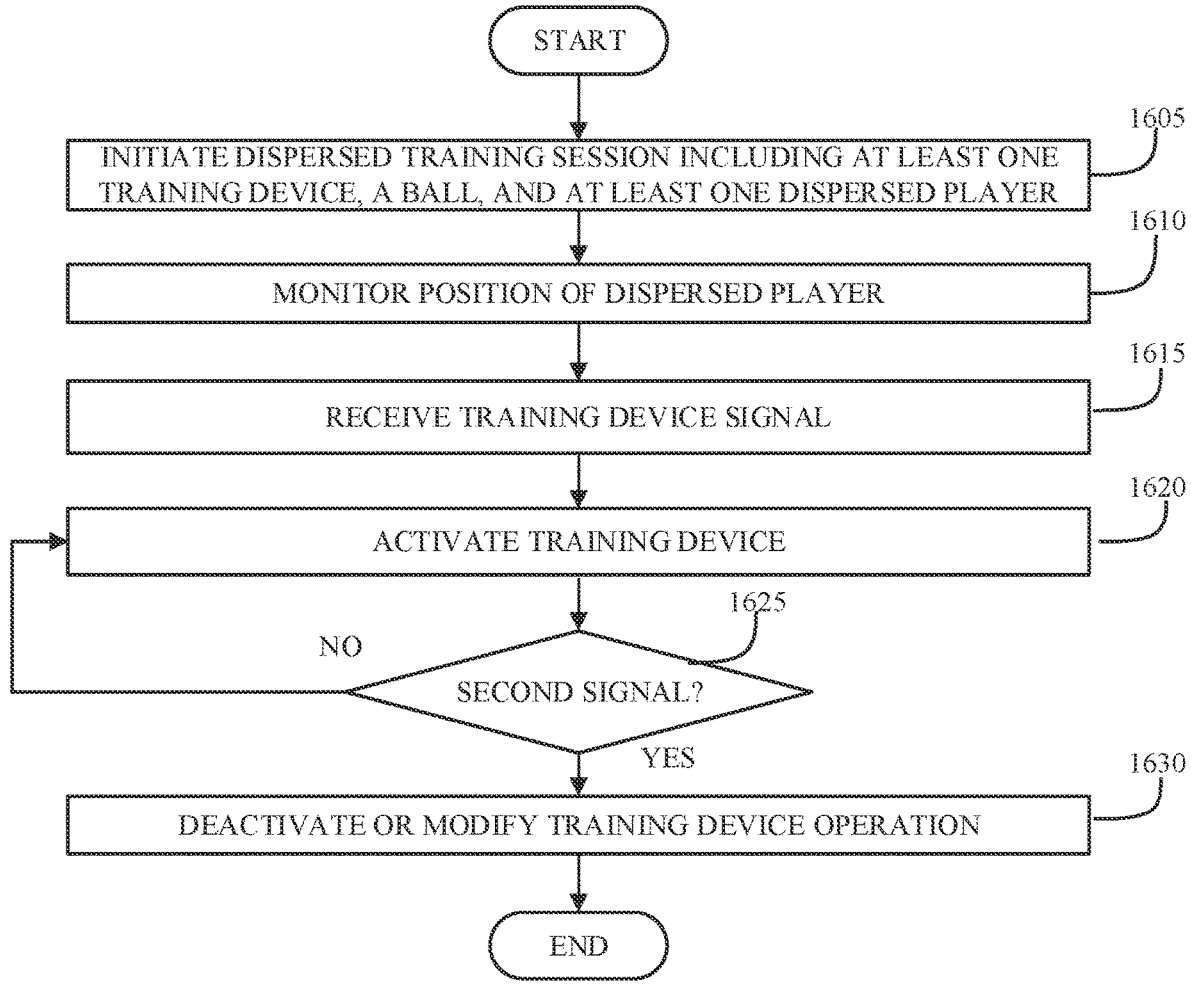
FIG. 15 is a flow diagram of an embodiment of using the dispersed game tracking system to train dispersed players using a training device.

FIG. 15 depicts a method 1600 of using the dispersed game tracking system to train dispersed players using a training device 700. Sometimes in a sports game a training device can be used to enhance the movement of a sports object. For example, in the game of basketball, the training device can be a rebounding and/or passing machine. In baseball the training device can be a pitching machine. In football, the training device can be a passing machine. In tennis, the training device can be a ball machine. Other sports can also benefit from similar training devices as the ones mentioned above. In any case, the usefulness of such training devices can be enhanced when controlled by system 10. For example, the sensors integrated into user device 100 and/or tracking device 600 can be used to determine when to activate or deactivate a training device, or to modify the functionality of the training device based on an appropriate signal detected by one or more sensors. In another embodiment, the training device 700 can include onboard sensors that are capable of identifying an appropriate signal and responding to the signal by changing its function, activating, and/or deactivating.

In block 1605 the method can include initiating a dispersed training session including at least one training device, a ball, and at least one dispersed player. For example, the training session can be a solo training session focused on shooting a designated basketball shot. The training device in such an example can be a passing machine. In block 1610, the method can include monitoring the position of the dispersed player. Monitoring the position of the dispersed player can be accomplished as previously described with respect to object tracker 326 and FIG. 3. In block 1615, the method can include receiving a training device signal. For example, the player may indicate that he or she wishes for the drill to begin by performing a gesture that is detectable by camera 116, and/or image sensor 616. In some examples, the training device signal can be performed by the player by interacting with a graphical user interface of user device 100 or tracking device 600. In some examples, the signal provided may be provided by the player by the player providing an utterance (e.g., a word, sound, or phrase) that is detectable by audio sensor 118 and/or audio sensor 618. In some examples, the start signal may simply be that the player shoots a first basket, thereby signaling to system 10 that training device 700 should be activated. In block 1620, in response to receiving the training signal, the training device 700 can be activated. For example, the training device 700 can begin to pass rebounds to the player. In decision block 1625, the method can include determining whether a second signal has been received. In some examples, the second signal can be a stop signal. For example, one or more sensors of system 10 can determine that the dispersed player in the training session is distracted or otherwise no longer paying attention to the drill. This can be detected by the system by determining that the player has turned away from the goal, for example. In another example, the stop signal can be the system 10 determining that the dispersed player has stopped shooting baskets. In another example, the second signal can be a modification signal. For example, the system 10 can detect that the dispersed player has changed positions on the dispersed court to practice shooting from a different angle. In this case, one or more sensors of system 10 can determine that a modification signal has been detected. In another example, the modification signal can be the system 10 detecting that the time between shots taken by the player has increased or decreased beyond a predetermined threshold. In block 1630, in response to detecting either the stop signal or the modification signal, the system 10 can appropriately either deactivate training device 700 in response to a stop signal or modify the operation of training device 700 responsive to a modification signal. For example, the system 10 (e.g., server 300) can transmit a signal to the training device 700 to rotate so that the ball is returned to the new position of the dispersed player to facilitate shooting practice from a different angle. In another example, the system can cause the training device 700 to rebound the ball to the player at a slower pace or a faster pace as appropriate based on the detected modification signal.

According to some embodiments, dispersed players may participate in certain games enabled by system 10 in which the dispersed players may respond to unexpected changes in the rules or methods of the game. For example, in the basketball game of knockout enabled by dispersed game tracking system 10, a dispersed player may be informed (e.g., via user device 100 or tracking device 600) that now they are required to make two shots rather than one shot and at least one of the shots must be a three-point shot before system 10 considers that the respective player has completed his or her shots. In another example, when system 10 is used to enable the basketball drill "beat-the-ghost" the system could change the scoring such that every missed basket is now worth −3 points instead of −2 points. In another example, when system 10 is used to enable the basketball game of around the world or other game for which it is desirable to track time, a shot clock may be introduced (e.g., displayed by a user device 100 or a connected device 200) which gives each player only two seconds to take his or her next shot, thus speeding up the competition. In another example, if an augmented reality display is used (e.g., connected device 200), the competitor might need to adjust to a virtual defender introduced into the game who may virtually block shots or virtually steal dribbles.

According to some embodiments, an accurate determination of the "type" of shot is necessary in order for the shot to be considered a legitimate made shot. For example, when system 10 is used to enable the basketball game of horse, the system 10 may determine the type of shot being performed by a first shooter and whether the shot was made. For example, object tracker 326 may determine the trajectory of the shot and could track the motion of the dispersed player taking the shot in order to determine one or more "shot criteria" that define the type of shot taken. As an example, the shot criteria could include that the shot must be taken using a left hand. The shot criteria can include that the shot must be taken from the three-point line. The shot criteria can include that the shot should be a hook-shot. The shot criteria can include that the shot was taken while facing away from the basket, etc. When a second dispersed player attempts to recreate the shot, the system 10 can determine whether the shot is made and whether the shot conforms to the one or more identified shot criteria. In some embodiments, a dispersed player can signal the type of shot (e.g., shot criteria) with a physical gesture, with a verbal cue, and/or by touching or clicking a location on a graphical user interface associated with user device 100 and/or tracking device 600. In response, object tracker 326 may determine whether the shot meets the shot criteria. In some examples, if there is a discrepancy between what the player claims as the shot criteria and what object tracker 326 determines as the shot criteria, a human referee (e.g., a referee observing via a viewing device 400) may make a final determination as to whether the shot conformed to the one or more shot criteria. However, in other examples, the system 10 can determine the type of shot without human intervention.

As an example, assume that two players (Player A and Player B) are playing a game of horse on two different courts (Court A and Court B, respectively). Further assume that user device 100A is used to host the game and to monitor the play of Player A on Court A, and a user device 100B is used to monitor the play of Player B on Court B. Further assume that Player A attempts a particular type of shot (e.g., a hook shot) from a particular location on Court A. Before the shot, Player A may signal that a particular type of shot is required. As an example, Player A may verbally say "hook shot" before attempting the shot. User device 100A may detect the words "hook shot" and, in response, determine that the next shot must be a hook shot.

Note that there are various other techniques that may be used to signal the type of shot to user device 100A. As an example, the user device 100A may store a plurality of shot type identifiers (e.g., keywords or phrases) for identifying specific shot types, such as "hook shot" or "jump shot" that the user device 100A is configured to recognize. Each identifier may be associated in memory with data that defines the characteristics of the associated shot type. As an example, characteristics of a hook shot may indicate that the shooter attempting a hook shot is required to launch the ball with a single hand above the head of the shooter on a side of the shooter that is opposite of the hoop. If a type of shot is designated (e.g., by uttering the identifier of the shot type within a predefined time period, such as a few seconds, before attempting a shot), then user device 100A may analyze the sensor data captured for the shot to determine whether it satisfies the indicated requirements for the shot type. Specifically, the user device 100A may compare the sensor data indicative of the shot to the characteristics indicated by the shot type data associated with the shot type identifier indicated by the shooter to determine whether such characteristics are satisfied.

As an example, if a hook shot is identified, as described above, the user device 100A may analyze the sensor data (e.g., video images) to determine whether the shooter launched his or her ball with a single hand above his or her head on a side of the shooter opposite of the hoop, as indicated by the shot type characteristics associated with a hook shot. If so and if the shot is deemed to be made, the user device 100A may determine that a successful shot attempt has occurred in gameplay. In such case, according to the rules of horse, Player B is required to replicate the same shot type from approximately the same location in order to prevent Player A from scoring. However, if Player A fails to make the shot or fails to satisfy the shot type characteristics, then the user device 100A may determine that Player A's shot attempt was unsuccessful in gameplay, and Player B is then permitted to attempt a shot of his or her choosing to try score against Player A according to the rules of horse.

If Player A's shot is determined to be successful, the user device 100A may transmit to user device 100B at Court B of Player B information indicative of the Player A's successful shot. As an example, the location of Player A's shot, and information indicative of Player A's identified shot type may be sent to user device 100B and displayed to Player B. Techniques for indicating the location of Player A's shot and determining whether Player B makes a shot from a corresponding location on Court B are described in more detail below. Note that information indicative of Player A's shot type sent to user device 100B may include the text of the shot type identifier, which can be displayed or otherwise rendered (e.g., an audio output) to Player B by user device 100B. In addition, a video stream of Player A's shot may be sent to and displayed by user device 100B so that Player B can see Player A's shot. Upon receiving such information, Player B may attempt to replicate Player A's shot, and the user device 100A may receive sufficient information from user device 100B regarding Player B's shot to determine whether Player B successfully replicated Player A's shot. If not, the user device 100A may update the gameplay data 325 (which may be stored at user device 100A or elsewhere) to indicate a score for Player A according to the rules of horse.

Note that there may be other ways to identify the shot type that is to be required for a particular shot. For example, rather than speaking the shot type identifier or other verbal cue indicative of the shot type, Player A may provide another type of user input, such as touching a touchscreen of user device 100A or a connected device 200A to select a shot type identifier from a displayed list of shot type identifiers. In addition, the user device 100A may be configured analyze the sensor data captured for Player A's shot to classify the type of shot attempted. As an example, the user device 100A may compare the video images of the shot to the shot type data indicative of characteristics of different shot types to determine whether the characteristics of any such shot types are satisfied. If the characteristics of a particular shot type are satisfied, the user device 100A may automatically correlate the shot with the identified shot type and communicate the shot type requirement to Player B, as described above. In some embodiments, the user device 100A may implement one or more machine learning algorithms that have been trained to recognize certain shot types and use such algorithms to determine whether a shooter is successfully attempting a certain shot type.

In the examples described above, the user device 100A is used to host a game of horse. However, as with other games described herein, it is possible for the game to be hosted by other devices of the system 10, such as the server 300. These other devices (e.g., the server 300) may be configured to perform the functions of the user device 100A described above, such as determining shot type and whether a particular shot satisfies the characteristics of a shot type identified for the shot.

To better illustrate at least some of the concepts described herein, assume that the system 10 is to be used to monitor and coordinate a game of knockout where there are three players (referred to hereafter as Player A, Player B, and Player C) playing on three different courts (Court A, Court B, and Court C, respectively). Further assume that each player has a user device 100 that is positioned to view the player's respective court, including the player while he or she is shooting during the game and the court's hoop 25 at which the player shoots during the game. Further, assume that the user device 100 of each respective player functions as both a user device that provides outputs to the player and a tracking device 600 that tracks the player's shot and gameplay. Also, assume that the server 300 communicates with the user devices 100 at the dispersed courts and manages gameplay, as will be described in more detail below.

Initially, assume that players A and B are the currently active players and player C is currently inactive. At the time that each player transitions to an active status, the server 300 sends a notice, referred to hereafter as "active notice," to the user device 100 of such player to inform him or her that he or she is now active. As an example, Player A may be the first active player, and the server 300 may initially send an active notice to the user device 100 of Player A. In response, such user device 100 of Player A outputs a visual or audible cue to inform Player A that he or she is now active. Such communication could be from the user device 100 directly (e.g., display of a textual message, a color pattern, or other visual notice or emission of a verbal message or distinctive sound), or the communication could be through one or more connected devices 200.

In response to receiving the active notice, Player A attempts a shot from the free throw line. As Player A is shooting, the user device 100 at Court A captures video images of Court A, including the Player A, his or her ball 20, and the hoop 25. The user device 100 also timestamps each frame with a timestamp that is relative to the global time domain maintained by the server 300. In this regard, as described above, the server 300 may from time-to-time send timing information to the user devices 100 to keep them substantially synchronized with the global time domain.

The user device 100 analyzes the captured images to determine that the player being monitored follows the rules of the game and also determine when the player makes a basketball shot. For example, when Player A takes his first shot after becoming active, the user device 100 at Court A may analyze the captured images to determine when Player A takes a shot. Such decision can be based on many factors, such as when the ball 20 leaves the player's hands on a trajectory toward the hoop 25 as well as the body motions of Player A (e.g., body motions that are consistent with a player taking a shot, such as an upward movement of a hand or bending and extension of a player's knees).

The user device 100, based on the captured images, also determines the location of Player A on Court A when the shot is taken. The user device 100 then determines whether such location is within a zone required by the rules of the game. For example, for the first shot after Player A becomes active (i.e., has received an active notice), the user device 100 determines whether Player A takes the shot while positioned in a zone behind the Court A's free-throw line in compliance with the game rules. If so, the user device 100 determines that the user has complied with the requirement for an active player to take a first shot from the free-throw line. Thus, if Player A thereafter makes a shot (e.g., the first shot from the free-throw line or a subsequent shot), the shot is scored as valid and may be used in gameplay to advance the player's status. However, if Player A has not complied with the rule, then even if the player later makes a shot, such shot is not counted as valid for the purposes of advancing the player's status.

Once the user device 100 determines that Player A has complied with the rule of attempting a shot while at the free-throw line, the user device 100 continues to monitor the captured images to determine when a shot is made. Note that the final determination of whether a shot is made does not need to occur the moment that the ball 20 passes through the hoop 25. In this regard, as noted above, some shots may enter the hoop 20 but bounce out. In order to prevent a false determination of a made shot, the user device 100 may be configured to evaluate images for a few seconds after the ball 20 enters the hoop 25 and even passes through the hoop 25 in order to confirm within a high degree of certainty that the shot was in fact made.

Figure 18:
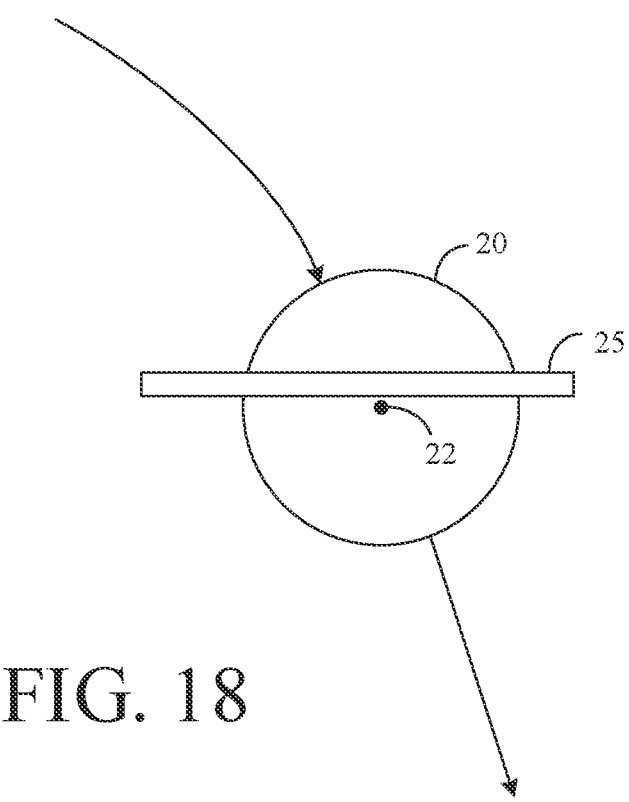
FIG. 18 is a side view of basketball within a basketball hoop for a basketball shot at a point in time when the basketball shot is deemed to be made.
Figure 19:
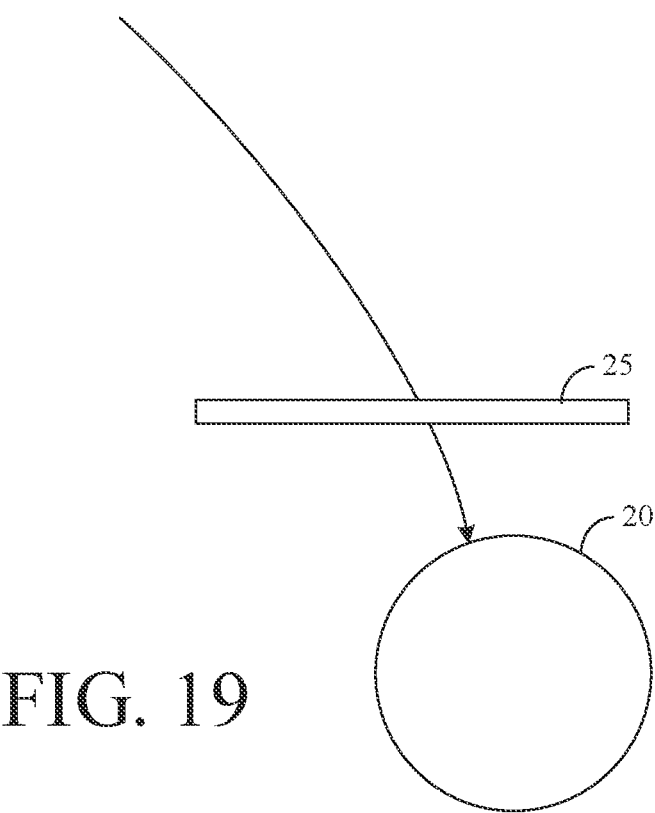
FIG. 19 is a side view of the basketball of FIG. 18 after it has passed completely through the hoop.

As an example, assume that according to game rules a made shot is defined to occur when a midpoint 22 of the ball 20 passes through the hoop 25 (e.g., the midpoint 22 is first determined to be below the bottom of the hoop 25) while on a trajectory that carries the ball entirely through the hoop, as shown by FIGS. 18 and 19. That is, the shot is deemed to be made at the point of the trajectory indicated by FIG. 18 assuming that the ball 20 does in fact travel through and below the hoop 25, as shown by FIG. 19. Even though the ball 20 has reached the point in FIG. 18 at which the shot is to be deemed made for the purpose of comparing the shot to other made shots, such as a shot made by Player B, the user device 100 may nevertheless continue to analyze the ball's trajectory to determine that it is consistent with a made shot before confirming the shot to be made. As an example, the user device 100 may confirm the shot to be made once the entirety of the ball 20 is well below the hoop 25, as shown by FIG. 19. In some cases, as described above, confirmation of a made shot may be based on other factors, such as a predefined gesture or other type of signal from a user at the court of the made shot, as previously described above.

After confirming the shot to be made, even if such confirmation is well after the time that the midpoint 22 of the ball 20 passes through the hoop 25, the user device 100 may nevertheless use the timestamp associated with the earlier frame shown by FIG. 18 (i.e., the frame showing when the midpoint 22 of the ball 20 has just passed through the hoop 25 in the current example) for the purpose of determining when the shot is to be indicated as made for comparison to shots by other players. For example, the user device 100 may transmit to the server 300 a message (referred to hereafter as a "made-shot message") indicating that Player A has successfully made a shot, and such made-shot message may include the foregoing timestamp to indicate the time (relative to the global time domain) that the shot was made.

The user device 100 monitoring Player B may similarly monitor the play and shots of Player B to determine when Player B has successfully made a shot after becoming active according to the game rules. Note that the server 300 may send an active notice to Player B, as described above for Player A, once Player A has attempted his or her first shot. In this regard, the user device 100 at Court A may determine the outcome of the first shot by Player A and report the outcome to the server 300 at which time the server 300 sends an active notice to the user device 100 at Court B such that Player B is notified that he or she is active and should start shooting. For illustrative purposes, assume that Player A misses his first shot such that Player A is knocked out of the game if Player B makes a shot before Player A. As described above for Player A, once a shot by Player B is confirmed to be made, the user device 100 for Court B may transmit to the server 300 a made-shot message that includes a timestamp to indicate the time (relative to the global time domain) that a shot by Player B was made.

The server 300 may then compare the timestamps for the shots made by Player A and Player B to determine which player made his or her respective shot first. If Player A made his or her shot first, then he or she is not knocked out of the game. In such case, the server 300 in response to receiving a made-shot message by either Player A or B may transmit a notice to the user device 100 of Player C to notify Player C that he or she is now active. In response, Player C may begin shooting shots, as described above for Players A and B.

If, however, the server 300 determines that Player B made his or her shot before Player A, then Player A is knocked out of the game according to the game rules. In such a case, the server 300 may still transmit the notice to Player C indicating that he or she is active in response to a made-shot message from either Player A or B, as described above, but the server 300 may also transmit a message, referred to hereafter as "knocked-out message," to the user device 100 of Player A indicating that Player A is knocked out of the game. In response, the user device 100 may communicate such status to Player A, thereby informing Player A that he or she has been eliminated from gameplay. Notably, such communication to Player A does not need to be immediately after Player B has made his or her shot. In this regard, a short delay in reporting a knocked-out status to Player A does not materially affect his or her actions in gameplay. Thus, the system 10 may be configured to take several seconds to confirm the made shots of both Players A and B and to evaluate which player actually made his or her shot first before informing Player A that he or she has been knocked out. Further, such notification can occur well after Player C has been notified of his or her active status. Thus, the game may progress in real-time while notices of when players are knocked out or eliminated occur with slight delays as the system 10 takes time to verify the accuracy of such determinations. Such a process of monitoring active players and notifying players when they are knocked out of the game may continue until conclusion of the game.

In the example described above, a device (e.g., user device 100) at the location of each respective court is used to monitor the player and make decisions about when certain events have occurred, such as when a player attempts a shot from the free-throw line or has made a valid shot. In other embodiments, other devices may perform such functions. As an example, a user device 100 or a tracking device 600 may capture images of a respective court and send a video stream of such images to the server 300, which then analyzes the video stream to make similar determination. Such an embodiment allows remote processing resources to process the video images from any or all of the courts. In some cases, such resources may have greater speed and processing power relative to the devices located at the court. Thus, there may be benefits to having much of the processing performed a central location, such as by the server 300 which is in communication with devices at multiple dispersed courts.

In any event, irrespective of whether occurrence of events (e.g., made shots) are detected by a local device 100, 600 at a respective court or a remote location, the server 300 may be in communication with devices 100, 600 at various courts and compare the data from such devices to make decisions about gameplay. As an example and further described above, the server 300 can compare the time of a made shot for an active player playing on one court to the time of a made shot for an active player playing on a different court to determine which active player made his or her respective shot first and thus whether one of the active players should be eliminated from the game. As described above, in analyzing some events, the system 10 may be configured to make an initial detection of the event and then further analyze data associated with the event in order to confirm that the detection of the event is accurate.

As previously noted above, the system 10 may be configured to detect a made shot at a time t, and thereafter take a finite amount of time (e.g., several seconds) to analyze data associated with the shot to confirm that the shot was indeed successful. In some embodiments, the initial detection may be based on a manual trigger (e.g., a predefined hand gesture or other type of user action, as described above), or the initial detection may be based on an algorithm of a different type relative to the confirmation. For example, the initial detection may be based on a simple algorithm that is fast but somewhat less accurate than the algorithm used for the confirmation. In some embodiments, the initial detection is made when a reference point of the ball (e.g., the ball's midpoint or a top or bottom of the ball has passed a predefined point, such as the hoop), and the confirmation is based on the ball's trajectory for several seconds after the ball enters or passes through the hoop. In other embodiments, the initial detection may be based on an algorithm that analyzes sensor data (e.g., sensor data) without utilizing machine learning whereas the confirmation may be made using a machine-learning algorithm that has been trained to analyze sensor data (e.g., video images).

In order to provide a faster pace, the system 10 can be configured to make decisions about gameplay based on initial detections of events (without waiting on confirmation of those events) and, thereafter, if a confirmation provides a different result for an event, corrective action can be taken to adjust the gameplay. As an example, if a shot is initially determined to be made but thereafter is determined to be missed using a different algorithm for the confirmation, then the system 10 can be configured to adjust the game data to correct for the false detection of the made shot. For example, the time associated with a made shot by a player may be adjusted to a new time after it has been determined that the player has made a subsequent shot. Gameplay decisions made in the interim may then be re-evaluated based on the updated information, and adjustments to gameplay may then be appropriately made. As an example, in the game of knockout, the status of a player previously deemed to be eliminated may be changed such that the player is not eliminated or vice versa. As noted above, while some aspects of knockout are time critical (such as when a shot is made), other aspects (such as when a player receives notification that he or she has been eliminated) are not as time sensitive. By recognizing this aspect of gameplay, the system 10 may be designed to allow for quick decisions about at least some time critical events but also permit the decisions to be further evaluated for robustness and for corrective actions to be taken when initial decisions are deemed to be incorrect without adversely affecting gameplay in a significant manner.

To better illustrate the foregoing, assume that three players (Player A, Player B, and Player C) are playing a game of knockout on three dispersed courts (Court A, Court B, and Court C, respectively). Also assume that Player A and Player B are active such that they are shooting balls 20 at their respective hoops 25 at the same time and that Player A must make a shot before Player B in order to keep from being eliminated according to the applicable gameplay rules. Further, assume that server 300 is receiving information from each court indicating when shots are made relative to the global time domain, as described in various embodiments described above.

Figure 22:
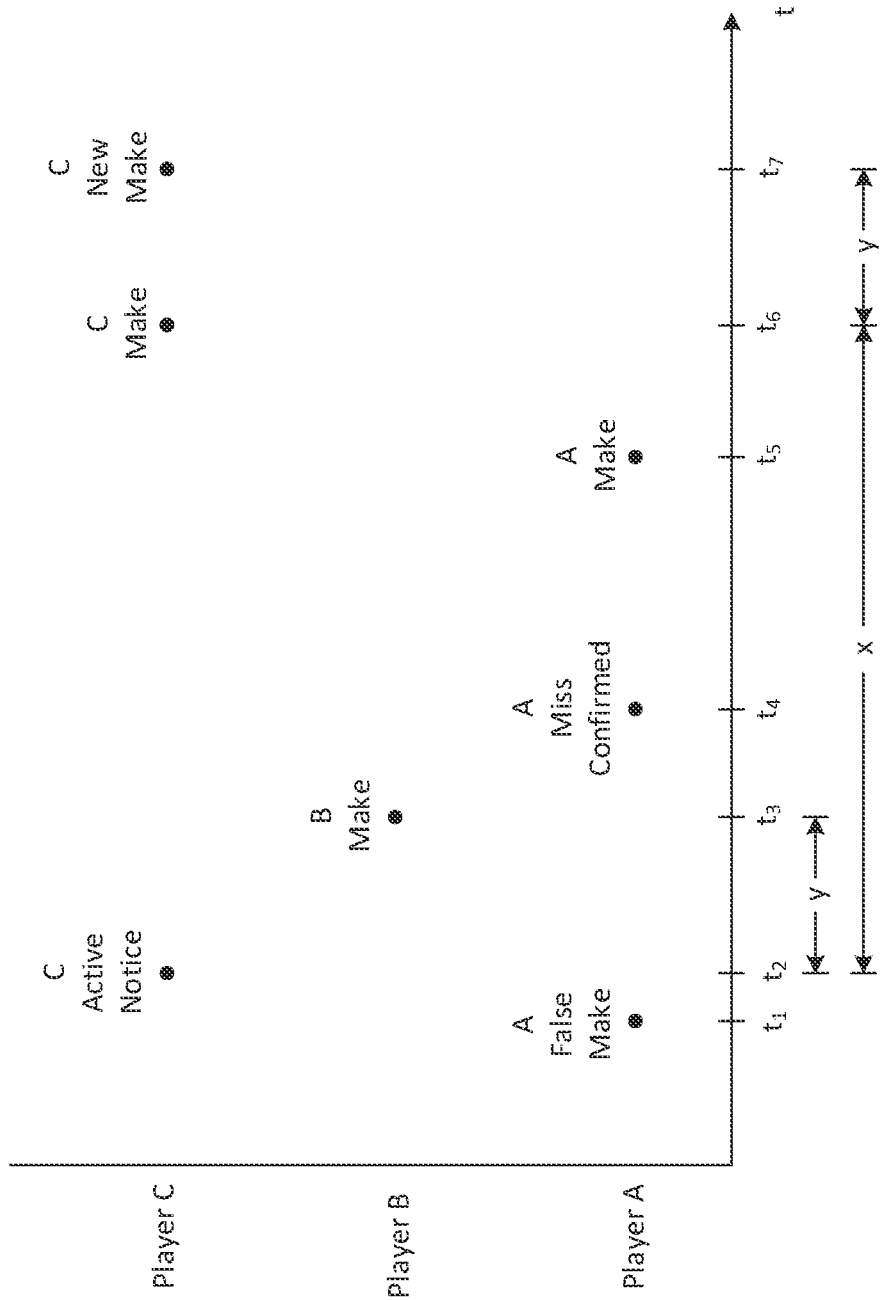
FIG. 22 is timing diagram showing various events detected during a game of knockout.

Referring to FIG. 22, assume that, based on information from a device 100, 600 at Court A, the server 300 falsely determines that Player A made a shot on Court A at time $t_1$. That is, Player A actually missed a shot at time $t_1$, but the system 10 erroneously determines that the shot was made. Further assume that the server 300 correctly determines that Player B made a shot on Court B at time $t_3$, after $t_1$. That is, Player B actually made a shot at time $t_3$, and the system 10 correctly detected this event. Further assume that Player A (who continues attempting shots after $t_1$ since he or she is aware that such shot was missed) makes a subsequent shot at time $t_5$, and the server 300 correctly determines that Player A made a shot at time $t_5$.

When the server 300 erroneously determines that Player A made a shot at $t_1$, the server 300 may take one or more actions on the false assumption that Player A made a shot and that such made shot occurred prior to a made shot by Player B (which occurred at $t_3$). As an example, at about time $t_2$ (between $t_1$ and $t_3$) the server 300 may update gameplay data 325 to indicate that (1) Player A made a shot at time $t_1$ and thus Player A is now inactive and Players B and C are now active. The server 300 at time $t_2$ may also transmit an active notice to Player C indicating that he or she is now active, and in response, Player C may begin taking shots on Court C in the hopes of eliminating Player B by making a shot before Player B. For illustrative purposes, assume that Player C makes a shot a time to after the time $t_5$ when Player A actually makes a shot.

Further assume that at time $t_4$, between $t_3$ and $t_5$ such that the Player C has already been erroneously notified that he or she is active, the server 300 based on the confirmation of the shot by Player A at $t_1$ determines that such shot was in fact missed. That is, the confirmation of the shot initially detected at $t_1$ indicates a different result (i.e., a miss) for the shot relative to what was previously detected at time $t_1$. Upon the confirmation at $t_4$, the server 300 can determine that Player C was erroneously notified that he or she was active at time $t_2$ when, in fact, Player C should have been notified later in response to the make of the shot at time $t_3$ by Player B.

Rather than attempting to notify Player C of the error, the server 300 may be configured to allow Player C to continue shooting unaware that any error has occurred and then adjust the data received for Player C, as well as the gameplay data 325 as appropriate to account for the error. In this regard, upon determining at $t_4$ that Player A missed the shot occurring at $t_1$, the server 300 is aware that Player A should be eliminated since he or she did not make a shot prior to the made shot by Player B at time $t_3$. At such time (or shortly thereafter), the server 300 may update the gameplay data 325 to change the status of Player A to indicate that he or she has been eliminated from the game, and the server 300 may also transmit a notification to Player A indicating that he or she has been eliminated. The fact that Player A is allowed to continue shooting shots from $t_3$ (i.e., the time that Player B actually made a shot) until $t_4$ (i.e., the time that Player A's shot at $t_1$ is confirmed to be missed) does not adversely affect gameplay in any significant manner. That is, the delayed confirmation occurring at time $t_4$ does not cause any uncorrectable error in gameplay with respect to Player A receiving a delayed notice that he or she has been eliminated.

In addition, to account for the error that Player C was notified to start shooting (e.g., received an active notice indicating a change of status from inactive to active) prior to time $t_3$ (i.e., when the status of Player C actually should have changed to active), the server 300 may be configured to adjust the gameplay data 325 for Player C such that it is as if Player C became active and thus started shooting shortly after time $t_3$ rather than at about time $t_2$. In this regard, the server 300 is configured to calculate the delay (y) from $t_2$ (i.e., the time that an active notice was sent to Player C) to $t_3$ (i.e., the time that Player C should have become active) and add this delay y to the time to that Player C was determined to have made a shot. Thus, the server 300 calculates a new time $t_7$ for the shot made by Player C, and the server 300 updates the gameplay data 325 to indicate that Player C made a shot at time $t_7$ rather than at time to when Player C actually made a shot, thereby correcting the gameplay data 325 for the premature start of Player C's active status. Thus, Player C could be eliminated if a player (e.g., a Player D who becomes active in response to the made shot by Player B at time $t_3$) makes a shot prior to time $t_7$, including in particular the time period between to and $t_7$.

As illustrated by the foregoing example, the system 10 can be configured to quickly send notices to players in order to keep pace with the play of the game (e.g., when the quick decisions are not erroneous) and make corrections when such quick decisions are ultimately determined to be erroneous. For example, if the shot detected at time $t_1$ is correctly assessed to have been made at time $t_1$ (i.e., Player A actually makes the shot at $t_1$ instead of missing it), then an active notice is quickly communicated to Player C, even before the shot is confirmed at time $t_4$, thereby reducing delay between the making of a shot by Player A and the change in Player's C status from inactive to active. However, if the shot detected at time $t_1$ is incorrectly assessed to have been made (i.e., Player A actually misses the shot at $t_1$ as described in the above example), then gameplay may continue uninterrupted, and the system 10 may update the gameplay data 325 to account for the error once it is discovered by the confirmation at time $t_4$. Thus, it is possible to reduce latency in the system 10 by making decisions based on unconfirmed events while still providing robust monitoring using algorithms that provide highly accurate confirmations but would otherwise introduce undesirable delays in real time.

In addition, as illustrated above, it is possible for the gameplay data 325 to be updated to account for a premature event, such as a premature detection of the outcome of a shot or a premature active notice being sent to a player. However, it is possible for the gameplay data 325 to be similarly updated for a late event. For example, in the above example, rather than sending an active notice to Player C at time $t_2$, it is possible to wait for the confirmation at time $t_4$ before sending an active notice to Player C. If the shot at time $t_1$ is confirmed to be made (rather than missed), then the gameplay data 325 could be updated such that it is as if an active notice was sent to Player C at time $t_2$. In this regard, the server 300 could be configured to update the gameplay data 325 to indicate that the shot made by Player C occurred at an earlier time than time $t_6$. Specifically, the server 300 may determine the difference between $t_4$ and $t_2$ and subtract such difference from $t_6$. In other embodiments, other types of adjustments may be made.

Note that it is possible for some games, like knockout, to be continued for an extended time after the occurrence of an outcome of an event, such as a made shot, that is uncertain. For example, if there is discrepancy between the initial detection of a shot outcome and the later confirmation of that outcome (e.g., when a manual trigger indicates a made shot but the confirmation based on image analysis of the shot indicates the shot was missed), rather than relying on the confirmation, as described in the above example, the discrepancy could trigger an additional layer of review, such as a human review by an official or some other user.

For example, if a shot is determined to be made by one algorithm (e.g., a manual trigger) but the same shot is determined to be missed by another algorithm (e.g., a machine-learning algorithm), thereby creating a discrepancy in the outcomes of the different algorithms, then the server 300 may be configured to generate an output indicating the discrepancy. In some embodiments, the captured video of the shot may be transmitted or displayed to a user who views the video to decide whether the shot was made. The user may then provide an input indicative of his or her determination, and the server 300 may then make a final determination of the event outcome (e.g., whether or not the shot was made) according to such user input. The server 300 may then update the gameplay data 325 as appropriate to correct any decisions or events contrary to the finalized outcome. As an example, in the above case for which there is a discrepancy in the shot of Player A, the status of Player A (i.e., whether Player A is eliminated) and the timing of the made shot by Player C could be decided a significant amount of time after the shot by Player C, such as after several other players have become active and taken shots. In this regard, retroactively changing the status of Player A or C after the discrepancy of Player A's shot has been resolved should not affect the status of the other players who shoot after Player C according to the rules of knockout. As long as the statuses of Players A and C are resolved before Player A's next turn, then the uncertain statuses of Players A and C should not affect gameplay in a material way.

Note that for some shots tracked by the system 10, the location of the shooter is important for the game being played. As an example, for the game of knockout, a player should be behind the free throw line when he or she takes a first shot after becoming active. In the game of horse, the location of the shooter is also important. When a shooter is to take a shot from a specific location, the system 10 may track the shooter's position as he or she moves around the court and provide feedback when the shooter is determined to be at an acceptable location for attempting a shot, thereby informing the shooter that he or she is at a proper location for taking a shot.

Figure 20:
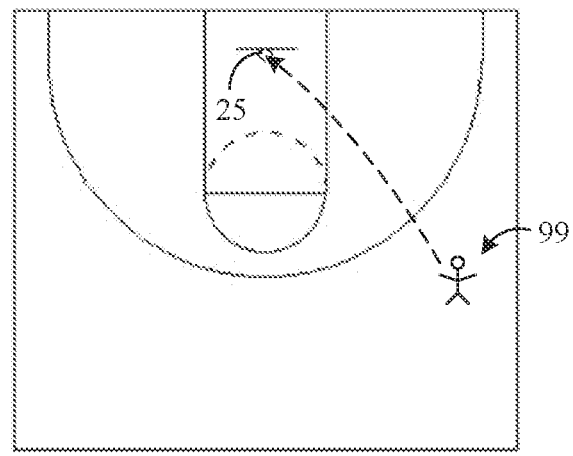
FIG. 20 depicts a player taking a basketball shot during a basketball game, such as horse.

As an example, assume that Players A and B are playing a game of horse on two different courts, Courts A and B, respectively. FIG. 20 shows Player A taking a shot at a location 99 on Court A. Assume that Player A makes such shot so that Player B is now required to take a shot from the same relative location 99. The user device 100 or tracking device 600 at Court A may determine when Player A has taken a shot (e.g., using techniques described above) and then determine Player A's location when the shot is taken. The coordinate system used by the user device 100 or tracking device 600 may be relative to a reference point on Court A. In some embodiments, such reference point is a specific point of the hoop 25 (such as the front of the hoop 25 or a center of the hoop 25), but other reference points are possible.

Figure 21:
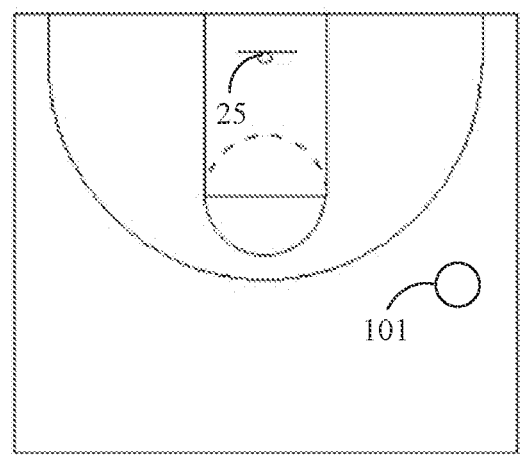
FIG. 21 depicts a display of a basketball showing a location corresponding to the shooter's location for the shot depicted by FIG. 20.

Information indicative of Player's A location 99 may be transmitted to the user device 100 at Court B, which may then provide information on such location to Player B. As an example, the user device 100 may display an image representative of Court B and indicate on the image a zone 101 on Court B from which Player B should attempt a shot, as shown by FIG. 21. For example, as shown by FIG. 21, the image may include an image of a hoop 25 of Court B and position the zone 101 such that the user can visually discern from the display where the zone 101 is on Court B relative to the hoop 25 or other reference point. In addition, such zone 101 displayed for Court B may correspond to the location 99 of Court A. In this regard, the user device 100 may define zone 101 such that it is at the same location relative to hoop 25 of Court B as the location 99 relative to hoop 25 of Court A. Thus, if Player B takes a shot while in the zone 101, Player B should be approximately the same distance and direction from the hoop 25 of Court B as the distance and direction of Player A from the hoop 25 of Court A when Player A made his or her shot.

After viewing the displayed zone 101, Player B may move around Court B in an attempt to position himself or herself within the zone 101. The user device 100 of tracking device 600 of Court B may track Player B as he or she moves on Court B. As an example, video images may be captured and monitored in order to determine Player B's current location on Court B. The user device 101 may compare the player's location to the location of the zone 101 in order to determine whether Player B is in the zone 101 and which direction and distance Player B should move to be within the zone 101.

Based such information, the user device 100 may provide Player B with an indication whether he or she is in the zone 101. Such indication may be visual or audio. As an example, the user device 100 may display one color (e.g., red) or emit one audio message or tone if Player B is out of the zone 101 but then display a different color (e.g., green) or emit a different audio message or tone if Player B is in the zone 101. Thus, Player B is notified once he or she moves into the zone 101, thereby helping Player B to know when it is permissible for him or her to take the next shot.

In some cases, the user device 101 may indicate instructions, cues, or other information to help Player B find the zone 101. As an example, using video or audio output, the user device 100 may inform Player to move left, right, back, or forward in order to move closer to the zone 101. The user device 100 may also indicate that the distance that Player B is to move to reach the zone 101. While visual information can help the player to visualize the location of the zone 101 on Court B, audio feedback helps to provide the player with instructions or information without the player having to look at the user device 100. As an example, the player may be able to keep looking at the hoop 25 while he is moving and listening for direction from the user device 100.

However, having devices (e.g., user devices 100) located at the courts to perform more functions, such as monitoring and classifying shots, may have various advantages. For example, if there are transient network connectivity issues, a device (e.g., user device 100 or tracking device 600) at a respective court may continue monitoring play in real time when communication with the server 300 is disrupted. Rather than receiving a video stream, which can require greater network bandwidth, the server 300 can receive notification of events, such as when a particular player has made a shot, where some delay (e.g., resulting from network connectivity issues) is tolerable, as noted above. For example, as long as a made shot is timestamped by a user device or a tracking device 600, then a short delay in communicating a made-shot message to the server 300 does not necessarily affect gameplay in a material manner.

As noted above, 3D sensors (e.g., cameras equipped with depth sensors) may be used to determine the locations of objects (e.g., players or balls) in 3D space, thereby enabling the trajectory of balls 20 in 3D space to be determined. The ability to detect balls 20 or other objects in 3D space has several advantages, including providing for more accurate determinations regarding whether a shot is made. However, 3D sensors with a sufficiently long range to detect objects at any location on a basketball court can be complex, expensive, and bulky. In some embodiments, 2D sensors (e.g., 2D cameras employed on mobile telephones) may be used, and the system 10 may be configured to process the 2D data from such sensors in order to infer or otherwise determine the locations of sensed objects in 3D space. Exemplary techniques for determining the locations of objects in 3D space based on 2D data from 2D sensors are described in more detail below.

In some sports, such as basketball, gravity is the dominant force that acts on a ball 20 during a shot after it is released and prior to the ball 20 striking an object such as a hoop 25 or backboard. If two points in 3D space of a basketball 20 along its trajectory toward the hoop 25 at or after release can be determined, then the 3D trajectory of the ball 20 between the two points can be calculated using known physics equations. In some embodiments of the present disclosure, the system 10 is configured to determine the 3D location of the ball 20 at or close to the time it is released by the shooter and the 3D location of the ball as it reaches the hoop 25. The system 10 then calculates the trajectory of the ball 20 in 3D space based on these two known locations.

The 3D location of the ball 20 at or close to the time of release can be determined by comparing the location of the ball 20 at the time of a release detection by the system 10 to one or more identifiable reference points in the captured images, such as court markings (e.g., free-throw line, three-point line, court boundaries, half-court line, lane boundaries, etc.) along with the 2D position of the ball in the image frame (i.e., determined by the 2D sensor). That is, the distance of the ball 20 from at least one predefined court marking may provide an additional dimension by which a 3D location can be determined. Alternatively, the ball's height may be estimated knowing the height of the shooter (which information may be predetermined and stored in memory). As an example, the typical height of the ball 20 when the shooter releases it for a certain type of shot being attempted (e.g., a jump shot, free throw, or hook shot) may be predefined and stored in memory, and such height may be used to determine an additional dimension by which a 3D location can be determined. In some embodiments, a combination of estimated ball height and court markings may be used to determine a 3D location of the ball 20 at or close to its release.

The 3D location of the ball 20 at the hoop 25 can be inferred by how the ball 20 interacts with the hoop 25, backboard, or net that hangs from the hoop 25. As an example, a regulation ball 20 striking a specific point on the hoop 25 with a specific entry angle, entry direction, and entry speed should rebound from the hoop 25 in a specific way (angle, direction and speed). A 2D image sensor (or other type of 2D sensor) can be used to collect information about the rebound trajectory in 2D. The system 10 (e.g., an object tracker 136, 326, 636) can infer or otherwise determine the remaining 3D information about the rebound trajectory if the entry angle, entry direction, and entry speed are known. Thus, even though a 2D sensor viewing a basketball shot from the side would be unable to determine if the ball 20 hit the left side or the right side of the hoop 25, an object tracker 136, 326, 636 can use the information described above to determine the point on the hoop 25 contacted by the ball 20, thereby inferring or otherwise determining the 3D location of the ball 20 when it struck the hoop 25. Using this 3D location in combination with the 3D location of the ball 20 when it was released by the shooter, the object tracker 126, 326, 636 may determine the ball's trajectory in 3D space.

In some embodiments, multiple 2D sensors may be used to determine the 3D location of an object (e.g., a player or ball) within the images. For example, each of at least three 2D sensors (e.g., 2D image sensors, such as 2D cameras) positioned at known locations in 3D space may determine the 2D location from a different viewpoint. In this regard, based the 2D location of the object determined from a respective sensor, the object tracker 136, 326, 636 may use such 2D location along with the known location of the sensor to determine the distance of the object from the 2D sensor. Knowing the distances of the object from at least three sensors, an object tracker 136, 326, 636 may then use triangulation, trilateration or some other algorithm to determine the 3D location of the object. In some cases, one or more viewpoints may be provided by a single 2D sensor that is in motion (e.g., attached to a drone or other device capable of moving the sensor). As an example, multiple viewpoints of a scene from the same 2D sensor may be captured at known locations, and triangulation or trilateration may be used to determine the location of an object in 3D space. In other embodiments, yet other techniques may be used to determine the 3D locations of objects from 2D sensors.

In some cases, the size of an object may be known and used to determine the distance of the object from a 2D sensor or other type of sensor. For example, the ball 20 may have predetermined width or diameter. In addition, the height of a player may be predetermined and stored in memory. In general, objects in an image become smaller the further away they are from the sensor that captured the image. Thus, an object tracker 136, 326, 636 may be configured to compare a measured size of an object in at least one dimension (e.g., diameter of a ball or height of a player) to the known real-world size of the object and, based on such comparison, determine the distance of the object from the 2D sensor.

As described above, augmented reality (AR) may be used to enhance the experience of the players participating in a game. As an example, as a player is playing on one court, objects from another court may be displayed to the player via an AR headset so that the player can discern events that are occurring on the other court. As an example, a virtual ball representing the ball 20 being shot by a player on another court may be displayed to a player so that he or she can visually see when the other player makes a shot and the progression of any shot being attempted by the other player. To better illustrate this, an exemplary operation of a system 10 incorporating at least one AR headset will be described in more detail below.

Figure 23:
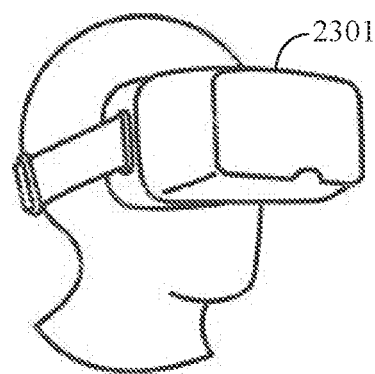
FIG. 23 illustrates a player wearing an augment reality (AR) headset.

As an example, assume that a player, referred to hereafter as "Player A," is playing a game of knockout on Court A against several other players, including a player referred to as "Player B," who is playing on Court B. Further assume that, as shown by FIG. 23, Player A is wearing an AR headset 2301 that is wirelessly connected to a user device 100A at Court A. The AR headset 2301 permits Player A to see his or her surroundings include Court A and the hoop 25 on Court A but also can display to Player A virtual objects that appear to be located within such surrounding environment.

As described above, a user device 100B or other device (e.g., tracking device 600B) may sense Player B and the ball 20 used by Player B and determine the location in 3D space of Player B and his or her ball 20 within Court B. For illustrative purposes, assume that user device 100B is being used to monitor Player B and his or her ball 20. As also described above, the user device 100B may transmit to the server 300 information indicative of the sensed locations of Player B and his or her ball 20 relative to the hoop 25 at Court B or other reference point for Court B. As an example, such information may include a video stream captured by the user device 100B or data (e.g., coordinates of Player B and his or her ball 20). In some embodiments, in addition to using information indicative of the locations of Player B and his or her ball to monitor gameplay (e.g., determine when Player B has made a shot), the server 300 is configured to transmit such information to the user device 100A of Player A. Note that this information could be relative to the hoop of Court B or other reference point of Court B, or the server 300 may translate such location information into the coordinate system used by the user device 100A. If the reference point used by user device 100A relative to Court A is the same (e.g., a specific point on the hoop 25 of Court A) as the reference point used by user device 100B relative to Court B (e.g., the same specific point on the hoop 25 of Court B), then a translation may be unnecessary. In this regard, in such an embodiment, a set of coordinates for a point in Court B should be the same coordinates for the corresponding point of Court A.

Figure 24:
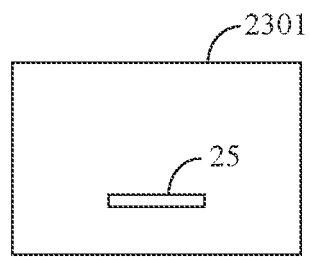
FIG. 24 illustrates an exemplary view through the AR headset of FIG. 23 for which a virtual player and a virtual ball, representing a player and ball on another court, is displayed by the AR headset.
Figure 24:
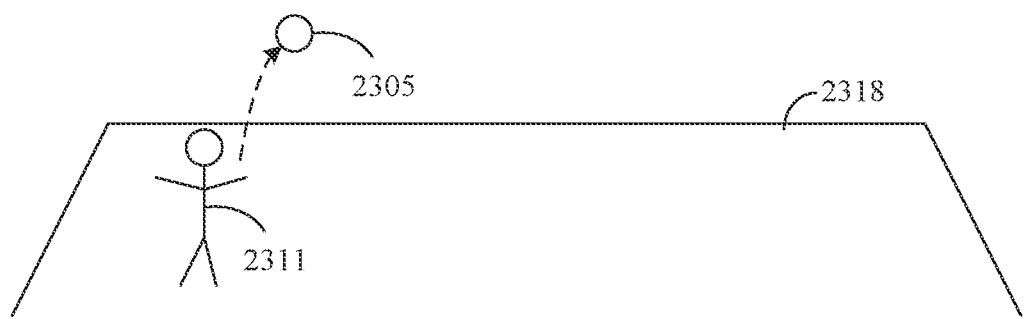

Upon receiving location information for Player B and his or her ball, the user device 100A may communicate with the AR headset 2301 such that it displays to Player A a virtual player 2311 and a virtual ball 2305, representing Player B and Player B's ball 25, respectively, as shown by FIG. 24. In this regard, through the AR headset 2301, Player A is able to see various real-world objects, such as the hoop 25 of Court A, a backboard 2316 for the hoop 25 of Court A, and the floor 2318 of Court A (which may include markings, such as boundary lines and a free-throw line). In addition, as shown by FIG. 24, the AR headset 2301 displays virtual player 2311 and virtual ball 2305. Notably, such virtual player 2311 and virtual ball 2305 appear to be shown at a location in the environment of Court A such that (1) virtual player 2311 appears to be the at the same location in Court A (relative to the hoop 25 of Court A) as is Player B in Court B (relative to the hoop 25 of Court B) and (2) virtual ball 2305 appears to be the at the same location in Court A (relative to the hoop 25 of Court A) as is Player B's ball 20 in Court B (relative to the hoop 25 of Court B). Thus, by viewing virtual player 2311 and virtual ball 2305, Player A can discern where Player B and his or her ball are located in Court B.

In addition, the aforementioned process can be repeated for many image frames such that the virtual player 2311 and virtual ball 2305 appear to move within the environment of Court A as do Player B and his or her ball 2305 within the environment of Court B. Thus, by viewing virtual player 2311 and virtual ball 2305 over time, Player A can see how Player B and his or her ball 25 are moving on Court B and specifically when Player B makes a shot. In this regard, when Player B makes a shot on Court B, the virtual ball 2305 seen by Player A in the environment of Court A should appear to pass through the hoop 25 of Court A.

Notably, Player A may use the virtual objects presented to him or her in order to make gameplay decision as he or she would as if Player B was competing on the same Court A with Player A. For example, by viewing the virtual objects 2305 and 2311, Player A can see when Player B is about to take a shot, and in response, Player A may attempt to shoot quicker than he or she otherwise would to try to make a basket before the ball 20 of Player B reaches the hoop 25 of Court B.

Note that the virtual player 2311 and virtual ball 2305 may be images of real-world objects (e.g., an image of Player B and an image of Player B's ball 20, respectively) or animations of real-world objects. For example, for each frame reported to the server 300, the user device 100B may be configured identify Player B and his or her ball 25 and cull the background of the frame in order to extract an image of Player B and an image of Player B's ball 20. The user device 100B may transmit such images to server 300, which then provides the images to the user device 100A for display by the AR headset 2301. Thus, the virtual player 2311 may be an image of Player B captured by the user device 100B, and the virtual ball 2305 may be an image of Player B's ball 20 captured by the user device 100B. However, in other embodiments, the virtual player 2311 may be an animated avatar generated by the AR headset 2301 and the virtual ball 20 may be an animated object generated by the AR headset 2301. Using animated objects may help to reduce the amount of data transmitted through the network 650. For example, if animated objects are displayed, then it is possible to display the virtual player 2311 and virtual ball 2305 by communicating the location of Player B and his or her ball 25 without necessarily having to communicate additional data representing Player B and his or her ball 25.

Note that, using the same techniques described above, Player B may similarly wear an AR headset 2301 and similarly see a virtual player and a virtual ball representing Player A and Player A's ball 25. In addition, it is possible for the AR headset 2301 to display other objects. For example, additional players and balls on Court B may be displayed to Player A, or additional players and balls on other courts (e.g., Court C) may be displayed to Player A.

In some games, the presence of objects in the game may affect the movement of other objects. As an example, a defender guarding a shooter may block the shooter from moving in a certain direction or block a shot attempted by the shooter. In some embodiments, the system 10 is configured to use AR in order to account for actions and movements by objects on one court in the gameplay occurring on a different court.

As an example, in the foregoing embodiment in which Players A and B are playing on two different courts and are being monitored by user devices 100A and 100B, respectively, assume that a game is being played for which one player may guard the other player. In such embodiment, both Players A and B may be equipped with AR headsets 2301 so that Player A may see a virtual player representing Player B within the environment of Court A, and Player B may see a virtual player representing Player A within the environment of Court B.

Figure 25:
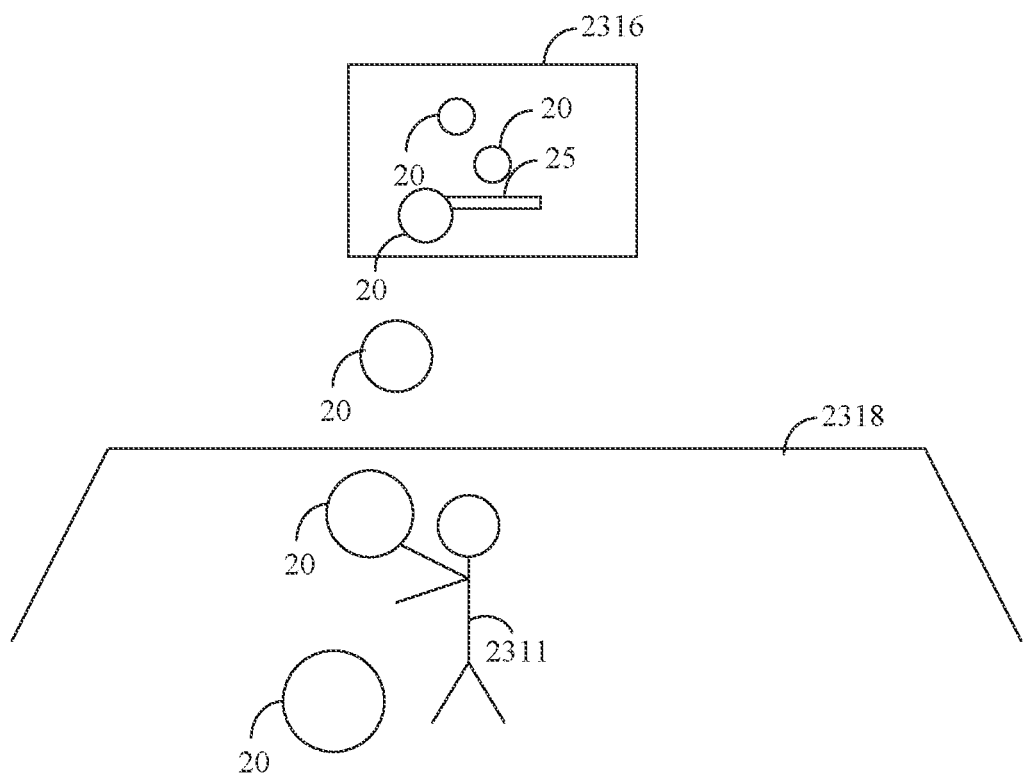
FIG. 25 illustrates an exemplary view through the AR headset of FIG. 23 for which a virtual player appears to be attempting to block a shot by the player wearing the headset.

FIG. 25 shows a view seen by Player A through the AR headset 2301 over time as a real-world ball 20 shot by Player A progresses toward the hoop 25 on Court A. In FIG. 25, the ball 25, the hoop 25, and the backboard 2316 are real-world objects seen by Player A. The AR headset 2301 worn by Player A displays a virtual player 2311 representing Player B who is on Court B. Virtual player 2311 appears at the same location in Court A (relative to the hoop 25 of Court A) as is Player B in Court B (relative to the hoop 25 of Court B). Notably, Player B may similarly see a virtual player representing Player A and attempt to guard Player A in gameplay by guarding the virtual player displayed to Player B by the AR headset worn by Player B.

The server 300 may be configured to control gameplay based on the relative locations of Players A and B on their respective courts. For example, if Player A moves (e.g., dribbles) toward the virtual player 2311 representing player B such that, based on the respective locations of Player A and Player B, Player A would have contacted Player B if they were on the same court, then the server 300 may take an action to affect gameplay. For example, the server 300 may transmit to the user device 100A instructions for causing the AR headset to display the virtual player 2311 such that the virtual player 2311 appears to be knocked to the ground by contact from the Player A even though Player B on Court B is not actually knocked to the ground and, thus, remains upright. In addition, the server 300 may change the gameplay such that a foul is effectively called on Player A for having virtually initiated contact with Player B, even though actual contact between the players did not occur since they were on different courts.

In FIG. 25, the virtual player 2311 is shown as attempting to block the shot by Player A. In this regard, Player B while viewing the virtual player representing Player A may see that Player A is attempting a shot and attempt to block Player A's shot by raising his or her hand toward the virtual object representing Player A's ball. In response to Player B's movements on Court B, the virtual player 2311 displayed by the AR headset 2301 worn by Player A may control the virtual player 2311 to show its hand being raised to try to block Player A's shot.

Based on information about the trajectory of Player A's ball from user device 100A and information about the body motions of Player B from user device 100B, the server 300 may determine whether Player B makes virtual contact with Player's A ball 20 during Player A's shot. That is, the server 300 determines whether the actions of Player B would likely have blocked Player A's shot if Player A and Player B were competing on the same court. Such determination may be based on a comparison of the location of Player B's hand to the trajectory of Player A's ball 20. Specifically, if it is determined that Player's B hand is at a location that would have resulted in contact with Player's A ball if Player A and Player B were actually on the same court, the server 300 may be determine that Player's A shot is virtually blocked. If not, the server 300 may determine that Player's A shot is not virtually blocked and control the AR headset 2301 such that Player A is able to see his or her ball 20 as it approaches the hoop 25, as shown by FIG. 25.

Figure 26:
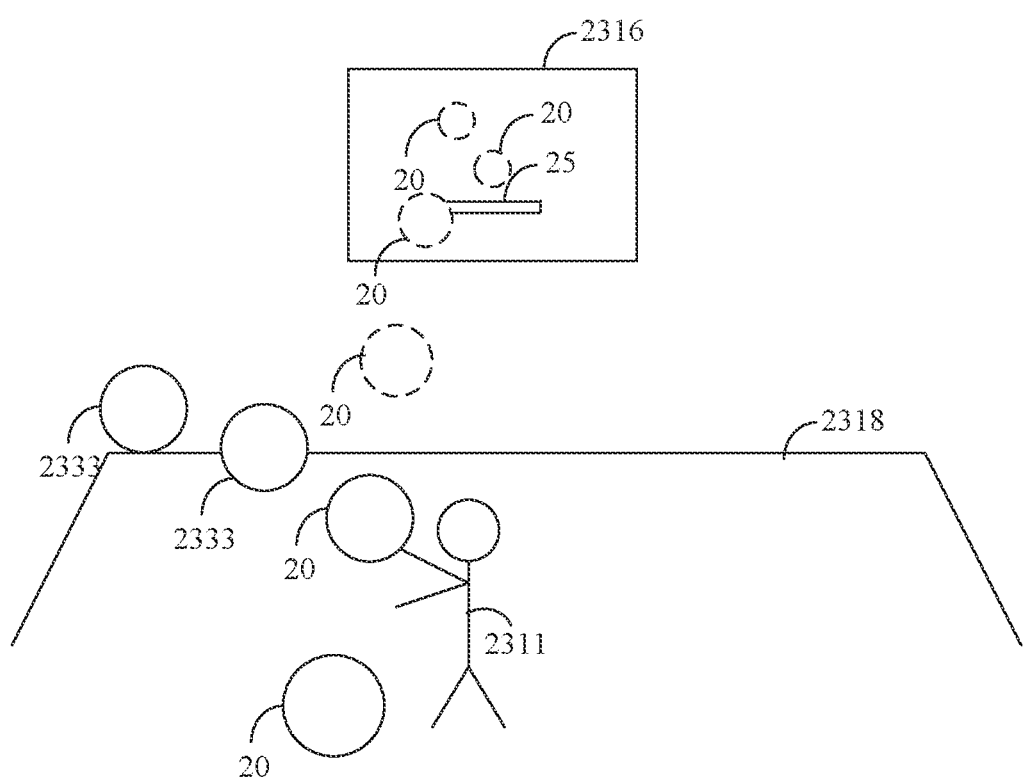
FIG. 26 illustrates an exemplary view through the AR headset of FIG. 23 for which a virtual player is shown as virtually blocking a shot by the player wearing the headset.

However, assume that the server 300 determines that Player A's shot is blocked. In such case, the server 300 controls the AR headset 2301 so that the display is changed relative to what is shown by FIG. 25. As an example, as shown by FIG. 26, the server 300 controls the AR headset 2301 such that it appears as if the ball 20 is deflected by virtual player 2311 and travels in a different direction relative to what would have been viewed if the shot were not blocked.

Specifically, the AR headset 2301 hides from Player A the real-world ball 20 from the point on the trajectory at which it is determined to be blocked. Thus, Player A is prevented from seeing the ball 20 as it approaches the hoop 25 (e.g., from the point on the trajectory at which the shot is determined to be blocked to the hoop). Such hiding of the ball 20 is illustrated by dashed lines for the ball 20 in FIG. 26.

Note that there are various techniques that may be used to hide the ball 20 in a given frame displayed to Player A. In some embodiments, the AR headset 2301 is instructed to display a virtual object (e.g., a virtual ball having a size corresponding to the size of the actual ball 20 that would be viewed by Player A) at the determined location of the ball 20. Such virtual ball may be colored according to the surrounding scenery so that the virtual ball appears to blend with the surrounding scenery. For example, if the background around the actual ball 20 is blue sky, the virtual object displayed over the ball 20 by the AR headset 2301 may be of a blue color in an attempt to match the background sky. In other embodiments, other techniques for hiding the ball 20 from the view of Player A wearing the AR headset 2301 are possible.

In addition to hiding the ball 20 from the point of virtual contact with the virtual player 2311, the server 300 may also control the headset 2301 such that it displays a virtual ball 2333 that travels along a trajectory consistent with the blocked shot such that the virtual ball 2333 travels in a different direction relative to the trajectory of the actual ball 20. Thus, even if the actual shot by Player A is made such that the actual ball 20 passes through the hoop 25, Player A does not see the ball 20 pass through the hoop 25 but rather sees the virtual ball 2333 traveling along a trajectory that does not pass through the hoop 25, thereby showing the shot to have been missed and, more specifically, blocked by the virtual player 2311 representing Player B.

In some embodiments, the server 300 is configured to determine the trajectory of the virtual ball 2333 based on the detected motion of the ball 20 and the detected motion of Player B and, specifically, the motion of Player B's body part (e.g., hand) that virtually contacts the ball 20. Based on the motion of Player B's body part, the server 300 may be configured to estimate the force vectors that would be imparted on the ball at the time of virtual contact with Player B as if Player B actually made contact with the ball 20. Such force vectors may be based on many factors, including gravity, the speed, acceleration, and direction of motion of the ball 20, and the speed, acceleration, and direction of motion of Player B's body part that would have made contact with the ball 20 if Player B would have been on Court A instead of Court B. Based on such force vectors, the server 300 may estimate the likely trajectory of the ball 20 had the ball 20 in fact been contacted by Player B, and then cause the AR headset 2301 to display the virtual ball 2333 so that it appears to travel along such trajectory.

Note that similar techniques may be used when other virtual objects are deemed to contact the ball 20. As an example, rather than the ball 20 being deflected by a Player B, assume that Player B takes a shot on a different court with a second ball. As an example, such a situation could arise when Players A and B are taking shots at the same time on dispersed courts in a game of knockout, as described above. Based on the ball trajectories, the object tracker 326 may determine that the two balls, if on the same court, would have made contact (e.g., arrived at the same location in time). In such case, based on the trajectory of each ball (including weight of each ball (which is known a priori) and the velocity of each ball at the moment of contact), the object tracker 326 can calculate the force vectors that would have been imparted on each ball if they actually made contact. Based on such force vectors, the object tracker 326 can calculate the likely trajectory of each ball after virtual contact, similar to the embodiment described above for which Player B is determined to make virtual contact with ball 20), and manipulate the image displayed to each player so that it appears as if the balls made contact and were deflected by such contact.

Note that it is possible to use a virtual reality (VR) headset to be used in place of the AR headset 2301 described above. In such embodiments, the real-world objects (e.g., ball 20, hoop 25, backboard 2316, and floor 2318) may appear as virtual objects generated by the headset or otherwise. Other than displaying such virtual objects rather than permitting the user to view the real-world objects, the system 10 may operate in the same way as described above for AR headset 21. In such embodiment, a user device 100 or other device (e.g., tracking device 600) may determine the locations of the real-world objects (e.g., ball 20, hoop 25, backboard 2316, and floor 2318) on the same court as a player, and virtual objects representing such real-world objects may be displayed to the player.

In some embodiments, a ball feeder 52 (FIG. 1) may be used to feed balls to a player participating in a game or practice. Such a ball feeder 52, similar to other conventional ball feeders, may be loaded with balls and launch the balls from time-to-time to a location where a player is to catch the ball. As an example, consider a situation in which a player desires to practice shooting basketballs from a particular location such as the free throw line or a three-point shot. The player may position the ball feeder 52 such that it launches the basketball to the desired location for taking a shot. The ball feeder 52 may be configured with a clock to track time and launch the basketballs based on time. As an example, the ball feeder 52 may be configured to automatically launch a basketball every four seconds (or other amount of time). Thus, the player is able to repetitively receive basketballs at the desired location and use the basketballs to shoot toward a hoop. Shortly after each shot, the player may receive another basketball and take another shot. Thus, the player is able to take a large number of shots in a relatively short time period and to also practice taking the shot after receiving a pass without having another user throwing basketballs toward the player.

In the system 10 shown by FIG. 1, the server 300 may be configured to communicate with the ball feeder 52 through the network 650 for controlling the ball feeder 52. In other embodiments, other components of the system 10 may be configured to control the ball feeder 52, as described herein. As an example, the ball feeder 52 may communicate with a user device 100 at the same court of the ball feeder 52 so that the user device 100 may control the ball feeder 52. In such an example, the user device 100 may communicate with the ball feeder 52 without communicating through the network 650. As an example, the user device 100 may communicate with the ball feeder 52 via Bluetooth or some other wireless protocol or be physically connected to the ball feeder 52 for communication. In other embodiments, the ball feeder 52 may include the control logic (e.g., software running on one or more processors) that is used to control the ball feeder 52 as described herein. Yet other configurations for controlling the ball feeder 52 are possible in other embodiments. For illustrative purposes, it will be assumed hereafter that the ball feeder 52 operates under the control of the server 300.

In some embodiments, the server 300 is configured to control the ball feeder 52 based on observations about the player who is on the court and receiving balls from the ball feeder 52. As an example, the timing of when the ball feeder 52 launches a ball to the player may be controlled based on movements or posture of the player. In this regard, before launching a ball to the player, the object tracker 326 may be configured to analyze images of the player from the camera data 324 or the sensor data 320 to determine when the player is ready to receive the ball from the ball feeder 52. Once the object tracker 326 determines that the player is now ready, the object tracker 326 may then control the ball feeder 52 such that it launches a ball toward the player.

Note that the determination of when the player is ready to receive the next ball may be based on many factors. For example, the object tracker 326 may monitor the player's eyes to determine when he or she is looking at the ball feeder 52 for receiving the next ball and then determine that the player is ready to receive the next ball when he or she is looking at the ball feeder 52. In another example, the object tracker may monitor the player's hands or other body part to determine when it is in a posture for receiving the next ball. For example, the player holding up his hands relatively close to one another at a specific area (e.g., around the player's waist or chest) may indicate that he or she is expecting the next ball from the ball feeder 52. In some examples, the object tracker 326 may make a decision about whether the player is ready to receive the next ball based on the orientation of the player's body. For example, if the front of the player's body is facing the hoop (or a direction other than the ball feeder 52), the object tracker 326 may assume that the player is not expecting the next ball. However, when the player turns toward the ball feeder 52 such that the front of his or her body is facing the ball feeder 52, the object tracker 326 may determine that the player is now ready to receive the next ball.

In some embodiments, the player may make a predefined body gesture or audible call to indicate when he or she is ready for the next ball. As an example, the object tracker 326 may determine that the player is ready for the next ball when he or she raises a hand above his or her head (or other body part) after taking the previous shot. Alternatively, the object tracker 326 may determine that the player is ready for the next ball after detecting a predefined audible call from the player (e.g., a verbal word or phrase, such as "ball") or the blowing of a whistle. In other embodiments, yet other techniques for determining when the player is ready for the next ball are possible.

In addition, it is possible for the object tracker 326 to make such determination based on any combination of factors described herein. As an example, the object tracker 326 may determine that the player is ready to receive the next ball only after the player is determined to be facing the ball feeder 52 with his or her eyes looking in a direction toward the ball feeder 52 and with his or her hands raised in a certain posture for receiving a ball. In some cases, each factor may be weighted and/or combined to a derive a score indicating a likelihood that the player is ready to receive the next ball, and the object tracker 326 may instruct the ball feeder 52 to launch the next ball when the score reaches or exceeds a predefined threshold. In other embodiments, artificial intelligence may be used to analyze the player and assess when the player is ready to receive a ball.

There are many advantages that may be obtained by controlling the ball feeder 52 based on observations of the player. As an example, the player's timing between shots may vary, and the object tracker 326, by monitoring the player, may provide balls to the player in a more optimal manner that allows the player to effectively control the rate of balls launched to him or her. As an example, for one shot, the player may immediately (i.e., well before the ball reaches the hoop) look to the ball feeder 52 to receive the next ball, hold his hands in a posture for receiving the next ball, or otherwise indicate that he or she is ready to receive the next ball. However, for the next shot, the player may continue looking at the trajectory of the ball until it reaches the hoop (e.g., to observe whether the previous shot was made) or other location before indicating that he or she is ready to receive the next ball. In such situations, the object tracker 326 can automatically adjust to the player's behavior so that it feeds balls to the player more likely at times when the player desires to receive them from shot-to-shot. In addition, using such techniques, balls may be fed to the player at an overall rate that is faster than conventional approaches that feed balls to players based solely on elapsed time (e.g., feeding a ball periodically), thereby increasing the number of shot repetitions for the player over a given time frame.

Controlling the ball feeder 52 based on the monitored behavior of the player can also enhance safety by preventing the ball feeder 52 from launching a ball to the player when he or she is not expecting a ball. For example, after taking a shot, the player may become distracted for a variety of reasons. In such an example, the player may become injured as his or her feet land on the court after taking a shot, the player may look away from the ball feeder 52 to have a conversation with another person, or the player may simply follow the ball of the previous shot for a longer than expected amount of time, such as when the ball bounces several times on the hoop or rolls around the hoop. In such situations, the object tracker 326 is able to sense that the player is not ready to receive a ball and thus extend the time before the next launch until the player is deemed to be ready, thereby possibly preventing an injury that could occur by the launched ball striking the player when he or she is not ready to receive it.

In addition, the object tracker 326 may be configured to control the ball feeder 52 based on activity sensed during a basketball game being played on the court. For example, as described above, during the game of knockout, an inactive player is transitioned to an active player and may begin shooting once a previous active player makes a shot (noting that such previous active player may be on a different court). In addition, when a previously inactive player becomes active, he or she takes a shot from the free throw line. The ball feeder 52 may be positioned such that it launches a ball toward the free throw line when a newly-activated player is to take his or her first shot, and when the object tracker 326 determines that the player on the same court as the ball feeder 52 is transitioned to an active player, the object tracker 326 may cause the ball feeder 52 to launch a ball so that the newly-activated player may receive the ball and begin shooting. Thus, by controlling the ball feeder 52, the object tracker 326 can better coordinate gameplay whereby a player is prevented from taking shots until he or she receives a ball from the ball feeder 52.

In some embodiments, the direction of launch by the ball feeder 52 may be controlled by the object tracker 326 during gameplay based on observations of the gameplay. In such an example, the direction of launch of the ball feeder 52 may be electronically controlled so that the object tracker 52 is able to control such direction of launch. As an example, the ball feeder 52 may be equipped with a motor (not shown) that operates under the direction and control of the object tracker 326 (or other component of the system) in order to turn the ball feeder 52 as appropriate so that it launches a ball in a desired direction, as described in more detail below.

Figure 28:
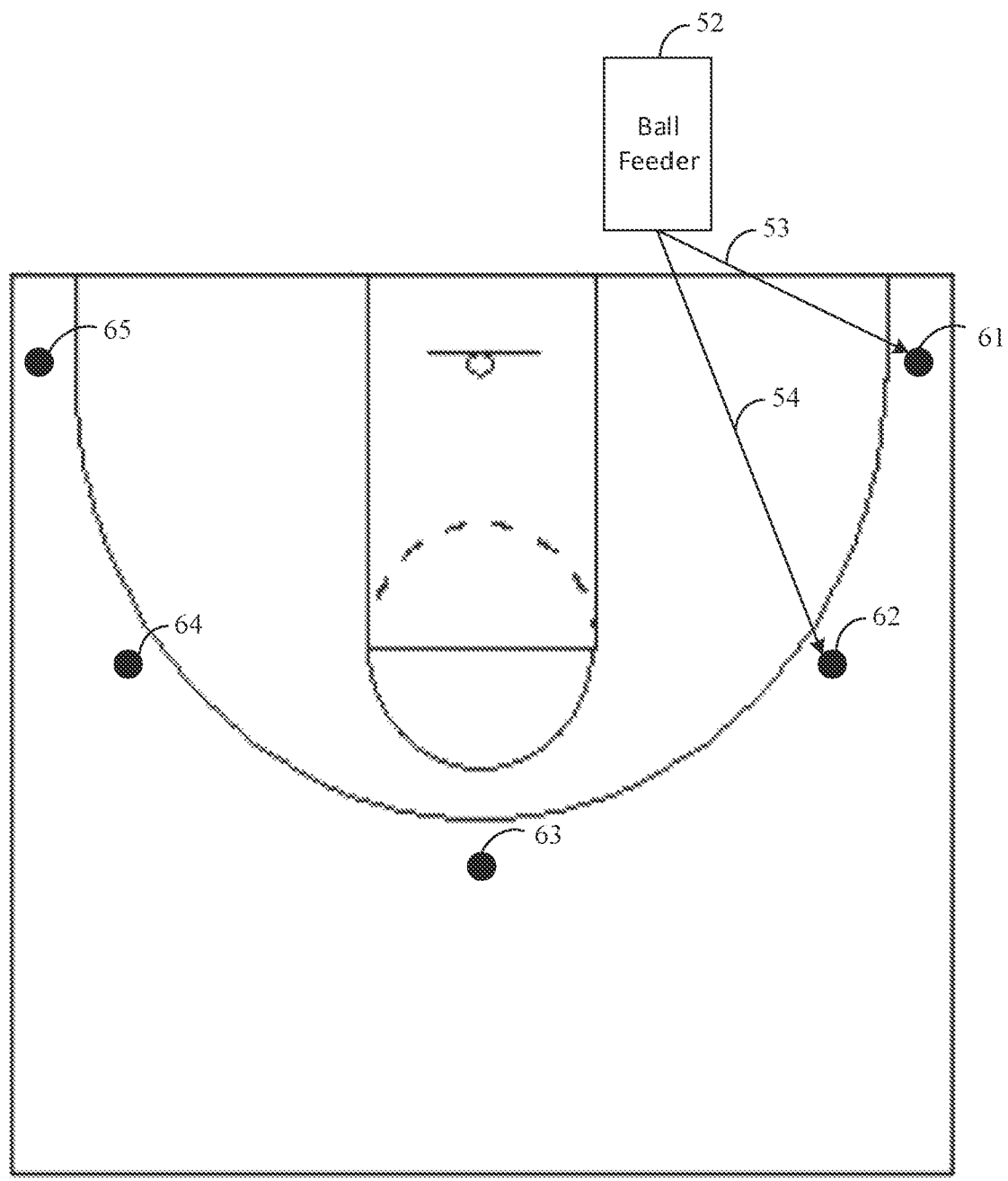
FIG. 28 illustrates an exemplary basketball court for which a ball feeder is used to feed basketballs to at least one player on the basketball court.

To better illustrate the foregoing, assume that a player on a court shown by FIG. 28 is playing a game of "around the world" against at least one other player (who may be on the same court or a different court). In such game, a player must make shots from each of the locations 61-65. Specifically, a player begins at location 61 and continues taking shots from that point until a shot is made at which time he or she begins taking shots from the next location 62. The player continues taking shots for the locations 61-65 in order. Once a shot is made at location 65 (after making shots at each of the other locations 61-64), the player repeats the process except that he or she begins at location 65 and continues progressing through the locations 61-65 in the opposite order. The first player to make two shots from each respective location 61-65 is deemed to be the winner.

In such a game, the ball feeder 52 may be initially positioned to launch a ball toward point 61 (e.g., along reference arrow 53 in FIG. 28). When the player receives the ball and shoots toward the hoop, the object tracker 326 is configured to monitor the shot, according to the techniques described above, to determine whether the shot is made. If the shot is not made, the object tracker 326 instructs the ball feeder 52 to launch the next ball without adjusting the direction of launch. Thus, the ball feeder 52 should launch the next ball to location 61 (e.g., along reference arrow 53) so that the player can take another shot from location 61. Note that, as described above, the object tracker 326 may observe the player to determine when he or she is ready for the next ball and instruct the ball feeder 52 to launch the next ball when the object tracker 326 deems the player to be ready for the next ball.

Once the object tracker 326 determines that the player has made a shot from location 61, the object tacker 326 instructs the ball feeder 52 to adjust its direction of launch so that it is positioned or otherwise configured to launch the next ball to location 62 (e.g., along reference arrow 54 in FIG. 28). When the object tracker 326 determines that the ball feeder 52 has been so positioned or otherwise configured and that the player is ready for the next ball (e.g., that the player has moved to location 62 and indicated that he or she is ready to receive a ball while at the location 62), the object tracker 326 instructs the ball feeder 52 to launch the next ball. Thus, the ball feeder 52 should launch the next ball toward location 62 so that the player can attempt a shot from location 62.

The object tracker 326 may similarly control the ball feeder 52 for each location 61-65 so that as the game progresses the player receives each ball at the appropriate location for taking a shot according to the applicable game rules. Thus, as the game progresses, the object tracker 326 observes the actions of the player (including the location of the player on the court) and the outcome of the shots to decide when and where the next ball should be launched. In other games and situations, the object tracker 326 may be configured to similarly control the ball feeder 52 according to the applicable game rules and player behavior.

Note that, in any of the embodiments described above in which a ball feeder 52 or other type of training device is used, it is possible for the system to be configured to monitor the performance of the player and provide feedback indicative of the player's performance. As an example, in an embodiment for which the ball feeder 52 is used, the sensor data used to control the ball feeder 52 (or other sensor data captured by the system) may also be used to analyze the performance of the player using the ball feeder 52. For example, the trajectories of the shots taken by the player may be determined and analyzed to determine various trajectory parameters indicative of the quality of the shot, such as entry angle (e.g., the angle at which the ball enters the hoop of the basketball goal), entry position (e.g., the location relative to the hoop that a portion (e.g., the center) of the ball enters the hoop of the basketball), whether the shot is made, etc. Feedback indicative of such parameters or other performance metrics or assessments based on such parameters may then be provided to the player (e.g., displayed or otherwise rendered by a user device 100). Exemplary performance parameters (e.g., trajectory or shot parameters) and techniques for determining and reporting feedback are described in commonly-assigned U.S. Pat. No. 9,283,431, entitled "Trajectory Detection and Feedback System" and filed on Dec. 4, 2012, which is incorporated herein by reference. Further, such performance information may also be determined and reported in embodiments for which no training device is used.

A system in accordance with an embodiment of the present disclosure may enable a dispersed sporting game played by multiple players at different venues. Such as system may comprise a first device, a second device, and a server. The first device has a first sensor configured to capture first images of a first player playing the dispersed sporting game on a first court or field, and the first device is configured to transmit the first images. The second device has a second sensor configured to capture second images of a second player playing the dispersed sporting game on a second court or field, and the second device configured to transmit the second images.

The server may be configured to receive the first images and the second images from a network and to analyze (1) the first images for detecting a first gameplay event associated with the first player occurring at the first court or field and (2) the second images for detecting a second gameplay event associated with the second user occurring at the second court or field. The server may also be configured to determine a change in gameplay of the dispersed game based on a comparison of information related to the detected first gameplay event and information related to the detected second gameplay event. The server may be further configured to transmit at least one message for instructing at least one of the first player or the second player to play the dispersed game in accordance with the change in gameplay.

In some embodiments, the server may be further configured to determine a player order associated with the dispersed sporting game and a plurality of players participating in the dispersed sporting game, including at least the first player and the second player. The server may also be configured to indicate the player order to the plurality of players, and the change in gameplay may be a change in the player order. In addition, the at least one message indicates the change in the player order.

In some embodiments, the information related to the detected first gameplay event may include a first time of the detected first gameplay event, and the information related to the detected second gameplay event may include a second time of the detected second gameplay event. In addition, the comparison may comprise a comparison of the first time and the second time. Note that the first time and the second time may be relative to a reference time domain, and the server may be configured to determine a delay for a communication path between the first device and the server. The server may also be configured to determine the first time based on the delay and at least one timestamp received from the first device.

In some embodiments, the server may be configured to determine whether the first player launches a first object through a goal at the first court or field, and the first gameplay event may be detected by the server based on whether the first player is determined to launch the first object through the goal at the first court or field. In addition, the server may be configured to determine whether the second player launches a second object through a goal at the second court or field, and the second gameplay event may be detected by the server based on whether the second player is determined to launch the second object through the goal at the second court or field. The server may also be configured to determine a first time that the first object passes through the goal at the first court or field and a second time that the second object passes through the goal at the second court or field. The server may be configured then to compare the first time and the second time and to determine the change in gameplay based on comparison of the first time and the second time. In some embodiments, the first time and the second time may be relative to a reference time domain, and the server may be configured to determine a delay for a communication path between the first device and the server. The server may also be configured to determine the first time based on the delay and at least one timestamp received from the first device.

In some embodiments, the server may be configured to determine a first location from which the first object is launched by the first player at the first court or field and a second location that the second object is launched by the second player at the second court or field. The server may be further configured to compare the first location and the second location and to determine the change in gameplay based on comparison of the first location and the second location.

In some embodiments, the server may be configured to determine a first shot type associated with the first player launching the first object at the first court or field and a second shot type associated with the second player launching the second object at the second court or field. The server may be further configured to compare the first shot type and the second shot type and to determine the change in gameplay based on comparison of the first shot type and the second shot type.

In many embodiments described above, the system 10 is used in the context of a game of basketball. However, it should be emphasized that the system 10 may be used to detect and track other games (e.g., football, baseball, hockey, soccer, etc.), including other types of objects launched in such games (e.g., footballs, baseball, hockey pucks, soccer balls, etc.) using techniques similar to those described herein for basketball.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices, and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A player monitoring system for compensating for network delays, comprising:
   a first device having a first sensor configured to capture first images of a first player playing a dispersed sporting game on a first court or field, the first device configured to transmit the first images through a network;
   a second device having a second sensor configured to capture second images of a second player playing the dispersed sporting game on a second court or field, the second device configured to transmit the second images through the network; and
   a server configured to:
      receive the first images and the second images from the network;
      transmit a first ping through the network to the first device;
      receive a first reply to the first ping transmitted from the first device through the network;
      transmit a second ping through the network to the second device;
      receive a second reply to the second ping transmitted from the second device through the network;
      determine, based on the first reply, a first delay for a communication path between the first device and the server;
      determine, based on the second reply, a second delay for a communication path between the second device and the server;
      analyze the first images to detect a first event occurring for the dispersed game at the first court or field;
      analyze the second images to detect a second event occurring for the dispersed game at the second court or field;
      based on the first delay, determine a first time of the first event relative to a reference time domain;
      based on the second delay, determine a second time of the second event relative to the reference time domain;
      compare the first time and the second time;
      determine a change in gameplay of the dispersed sporting game based on comparison of the first time and the second time; and
      transmit information indicative of the change.

2. The system of claim 1, wherein the first event is a first physical object launched by the first player passing through a goal at the first court or field, and wherein the second event is a second physical object launched by the second player passing through a goal at the second court or field.

3. The system of claim 1, wherein the server is further configured to determine a player order associated with the dispersed sporting game and a plurality of players participating in the dispersed sporting game, including at least the first player and the second player, wherein the server is configured to indicate the player order to the plurality of players, wherein the change in gameplay is a change in the player order, and wherein the information indicates the change in the player order.

4. The system of claim 1, wherein the first event is associated with a first timestamp generated by the first sensor, and wherein the server is configured to determine the first time relative to the reference time domain based on the first timestamp and the first delay.

5. The system of claim 4, wherein the second event is associated with a second timestamp generated by the second sensor, and wherein the server is configured to determine the second time relative to the reference time domain based on the second timestamp and the second delay.

6. The system of claim 2, wherein the server is configured to determine, based on comparison of the first time and the second time, whether the first physical object passes through the goal at the first court or field before the second physical object passes through the goal at the second court or field, and wherein the change is based on the whether the first physical object is determined to pass through the goal at the first court or field before the second physical object passes through the goal at the second court or field.

7. A player monitoring method for compensating for network delays, comprising:
   receiving, at a server, first images of a first player playing a dispersed sporting game on a first court or field, the first images captured by a first sensor and transmitted by a first device through a network to the server;
   receiving, at the server, second images of a second player playing a dispersed sporting game on a second court or field, the second images captured by a second sensor and transmitted by a second device through a network to the server;
   transmitting, by the server, a first ping through the network to the first device;
receiving, at the server, a first reply to the first ping transmitted from the first device through the network;
   transmitting, by the server, a second ping through the network to the second device;
receiving, at the server, a second reply to the second ping transmitted from the second device through the network;
   determining, by the server based on the first reply, a first delay for a communication path between the first device and the server;
   determining, by the server based on the second reply, a second delay for a communication path between the second device and the server;
   analyzing, by the server, the first images to detect a first event occurring for the dispersed game at the first court or field;
   analyzing, by the server, the second images to detect a second event occurring for the dispersed game at the second court or field;
   determining, by the server based on the first delay, a first time of the first event relative to a reference time domain;
   determining, by the server based on the second delay, a second time of the second event relative to the reference time domain;
   comparing, by the server, the first time and the second time;
   determining, by the server, a change in gameplay of the dispersed sporting game based on comparison of the first time and the second time; and
   transmitting, by the server, information indicative of the change.

8. The method of claim 7, wherein the first event is a first physical object launched by the first player passing through a goal at the first court or field, and wherein the second event is a second physical object launched by the second player passing through a goal at the second court or field.

9. The method of claim 7, further comprising:
   determining, by the server, a player order associated with the dispersed sporting game and a plurality of players participating in the dispersed sporting game, including at least the first player and the second player; and
   indicating, by the server, the player order to the plurality of players, wherein the change in gameplay is a change in the player order, and wherein the information indicates the change in the player order.

10. The method of claim 7, wherein the first event is associated with a first timestamp generated by the first sensor, and wherein determining the first time relative to the reference time domain is based on the first timestamp and the first delay.

11. The method of claim 10, wherein the second event is associated with a second timestamp generated by the second sensor, and wherein the determining the second time relative to the reference time domain is based on the second timestamp and the second delay.

12. The method of claim 8, further comprising determining, by the server based on the comparing, whether the first physical object passes through the goal at the first court or field before the second physical object passes through the goal at the second court or field, and wherein the determining the change is based on the determining whether the first physical object passes through the goal at the first court or field before the second physical object passes through the goal at the second court or field.

* * * * *